United States Patent
Suzuki et al.

(10) Patent No.: US 10,652,801 B2
(45) Date of Patent: May 12, 2020

(54) NETWORK MANAGEMENT SYSTEM, AND NETWORK MANAGEMENT METHOD

(71) Applicant: Hitachi, Ltd., Chiyoda-ku, Tokyo (JP)

(72) Inventors: Toshiaki Suzuki, Tokyo (JP); Taro Ogawa, Tokyo (JP); Tomoko Motohashi, Tokyo (JP); Jun Nakajima, Tokyo (JP); Takatoshi Kajiwara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 16/123,454

(22) Filed: Sep. 6, 2018

(65) Prior Publication Data

US 2019/0230577 A1     Jul. 25, 2019

(30) Foreign Application Priority Data

Jan. 19, 2018   (JP) .................................. 2018-006886

(51) Int. Cl.
| | |
|---|---|
| *H04W 48/02* | (2009.01) |
| *H04W 76/30* | (2018.01) |
| *H04W 28/10* | (2009.01) |
| *H04W 36/22* | (2009.01) |
| *H04L 12/26* | (2006.01) |

(Continued)

(52) U.S. Cl.
CPC ........... *H04W 48/02* (2013.01); *H04L 41/042* (2013.01); *H04L 43/0876* (2013.01); *H04L 47/2483* (2013.01); *H04L 63/0227* (2013.01); *H04L 63/1425* (2013.01); *H04W 28/10* (2013.01); *H04W 36/22* (2013.01); *H04W 76/30* (2018.02); *H04W 12/08* (2013.01); *H04W 36/165* (2013.01); *H04W 88/12* (2013.01)

(58) Field of Classification Search
CPC ..... H04W 48/02; H04W 76/30; H04W 28/10; H04W 36/22; H04W 36/165; H04W 12/08; H04W 88/12; H04W 12/1201; H04W 76/32; H04L 41/042; H04L 43/0876; H04L 63/0227; H04L 63/1425; H04L 47/2483

See application file for complete search history.

(56) References Cited

U.S. PATENT DOCUMENTS

| | | | |
|---|---|---|---|
| 2007/0223420 A1* | 9/2007 | Hori ..................... | H04W 40/36 370/331 |
| 2009/0280813 A1* | 11/2009 | Bavois .................. | H04W 76/18 455/436 |

(Continued)

FOREIGN PATENT DOCUMENTS

JP      2009-253461 A    10/2009

*Primary Examiner* — Pao Sinkantarakorn
*Assistant Examiner* — Kabir U Jahangir
(74) *Attorney, Agent, or Firm* — Crowell & Moring LLP

(57) ABSTRACT

A network management system includes a plurality of server units. A first management server included in a first server unit transmits a disconnection setting request for disconnecting an abnormal flow to each of a communication node connected to a self-region covered by the first management server, and one or more second server units covering one or more primary adjacent regions adjacent to the self-region. Disconnection setting is executed in response to the disconnection setting request. Each of a plurality of regions includes two or more areas each of which is covered by corresponding one of two or more base stations connected to an identical communication node.

16 Claims, 36 Drawing Sheets

(51) Int. Cl.
*H04L 29/06* (2006.01)
*H04L 12/851* (2013.01)
*H04L 12/24* (2006.01)
*H04W 12/08* (2009.01)
*H04W 88/12* (2009.01)
*H04W 36/16* (2009.01)

(56) References Cited

U.S. PATENT DOCUMENTS

2016/0302120 A1* 10/2016 Draznin ................ H04W 36/12
2017/0317942 A1* 11/2017 Chen .................... H04W 28/10

* cited by examiner

FIG. 8A

| SELF-REGION ID (801) | BS ID (802) | CN ID (803) | PORT ID (804) |
|---|---|---|---|
| R1 | B1 | N1 | P11 |
| | B2 | N1 | P12 |

| SELF-REGION ID (801) | BS ID (802) | CN ID (803) | PORT ID (804) |
|---|---|---|---|
| R2 | B3 | N2 | P21 |
| | B4 | N2 | P22 |

FIG. 8C

| SELF-REGION ID (801) | BS ID (802) | CN ID (803) | PORT ID (804) |
|---|---|---|---|
| R3 | B5 | N3 | P31 |
| | B6 | N3 | P32 |

FIG. 9A

| SELF-REGION ID (901) | PRIMARY ADJACENT REGION ID (902) | MS ID (903) | SECONDARY ADJACENT REGION ID (904) | MS ID (905) |
|---|---|---|---|---|
| R1 | R2 | SV2 | R1 | SV1 — 911 |
|  |  |  | R3 | SV3 — 912 |

FIG. 9B

| SELF-REGION ID (901) | PRIMARY ADJACENT REGION ID (902) | MS ID (903) | SECONDARY ADJACENT REGION ID (904) | MS ID (905) |
|---|---|---|---|---|
| R2 | R1 | SV1 | R2 | SV2 |
|  | R3 | SV3 | R2 | SV2 |

FIG. 9C

| SELF-REGION ID (901) | PRIMARY ADJACENT REGION ID (902) | MS ID (903) | SECONDARY ADJACENT REGION ID (904) | MS ID (905) |
|---|---|---|---|---|
| R3 | R2 | SV2 | R1 | SV1 |
|  |  |  | R3 | SV3 |

FIG.10A

| 1001 | 1002 | 1003 | 1004 | 1005 | 1006 | 1007 | 1008 | 1009 |
|---|---|---|---|---|---|---|---|---|
| DISCONNECTION FLOW ID | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | PROTOCOL NUMBER | PREVIOUS REGION ID | CURRENT REGION ID | CONNECTION PORT ID |
| F1 | s1 | d1 | sp1 | dp1 | pr1 | – | R1 | P11 |

FIG.10B

| 1001 | 1002 | 1003 | 1004 | 1005 | 1006 | 1007 | 1008 | 1009 |
|---|---|---|---|---|---|---|---|---|
| DISCONNECTION FLOW ID | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | PROTOCOL NUMBER | PREVIOUS REGION ID | CURRENT REGION ID | CONNECTION PORT ID |
| F1 | s1 | d1 | sp1 | dp1 | pr1 | R1 | – | – |

FIG.14

| 1401 | 1402 | 1403 | 1404 | 1405 | 1406 | 1407 | 1408 |
|---|---|---|---|---|---|---|---|
| CONTROL ID | DISCONNECTION FLOW ID | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | PROTOCOL NUMBER | PREVIOUS REGION ID |
| 1 | F1 | s1 | d1 | sp1 | dp1 | pr1 | R1 |

FIG.15

| 1501 | 1502 |
|---|---|
| CONTROL ID | DISCONNECTION FLOW ID |
| 2 | F1 |

FIG.16

| 1601 | 1602 | 1603 | 1604 | 1605 | 1606 | 1607 |
|---|---|---|---|---|---|---|
| CONTROL ID | DISCONNECTION FLOW ID | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | PROTOCOL NUMBER |
| 11 | F1 | s1 | d1 | sp1 | dp1 | pr1 |

FIG.17

| 1701 | 1702 |
|---|---|
| CONTROL ID | DISCONNECTION FLOW ID |
| 12 | F1 |

FIG.18

| 1801 | 1802 | 1803 |
|---|---|---|
| CONTROL ID | DISCONNECTION FLOW ID | CONNECTION PORT ID |
| 15 | F1 | 21 |

FIG.20A

| SELF-REGION ID | PRIMARY ADJACENT REGION ID | MANAGEMENT SERVER ID | SECONDARY ADJACENT REGION ID | MANAGEMENT SERVER ID |
|---|---|---|---|---|
| R1 | R2 | SV2a | R1 | SV1a |
| | | | R3 | SV3a |

FIG.20B

| SELF-REGION ID | PRIMARY ADJACENT REGION ID | MANAGEMENT SERVER ID | SECONDARY ADJACENT REGION ID | MANAGEMENT SERVER ID |
|---|---|---|---|---|
| R2 | R1 | SV1a | R2 | SV2a |
| | R3 | SV3a | R2 | SV2a |

FIG.20C

| SELF-REGION ID | PRIMARY ADJACENT REGION ID | MANAGEMENT SERVER ID | SECONDARY ADJACENT REGION ID | MANAGEMENT SERVER ID |
|---|---|---|---|---|
| R3 | R2 | SV2a | R1 | SV1a |
| | | | R3 | SV3a |

FIG. 21A

| SELF-REGION ID (901) | PRIMARY ADJACENT REGION ID (902) | MANAGEMENT SERVER ID (903) | SECONDARY ADJACENT REGION ID (904) | MANAGEMENT SERVER ID (905) |
|---|---|---|---|---|
| R1 | R2 | SV2b | R1 | SV1b |
|  |  |  | R3 | SV3b |

FIG. 21B

| SELF-REGION ID (901) | PRIMARY ADJACENT REGION ID (902) | MANAGEMENT SERVER ID (903) | SECONDARY ADJACENT REGION ID (904) | MANAGEMENT SERVER ID (905) |
|---|---|---|---|---|
| R2 | R1 | SV1b | R2 | SV2b |
|  | R3 | SV3b | R2 | SV2b |

FIG. 21C

| SELF-REGION ID (901) | PRIMARY ADJACENT REGION ID (902) | MANAGEMENT SERVER ID (903) | SECONDARY ADJACENT REGION ID (904) | MANAGEMENT SERVER ID (905) |
|---|---|---|---|---|
| R3 | R2 | SV2b | R1 | SV1b |
|  |  |  | R3 | SV3b |

FIG.25A

| 1001-1006 | CONNECTION REGION ID (2501) | CONNECTION PORT ID (2502) | CONNECTION TIME (2503) | AVERAGE MOVING SPEED [km/h] (2504) | |
|---|---|---|---|---|---|
| ... | R1 | P11 | T1 | — | 2511 |
| | R1 | P12 | T2 | 48 | 2512 |

FIG.25B

| 1001-1006 | CONNECTION REGION ID (2501) | CONNECTION PORT ID (2502) | CONNECTION TIME (2503) | AVERAGE MOVING SPEED [km/h] (2504) |
|---|---|---|---|---|
| ... | R1 | P12 | T2 | 48 |

FIG.26A

| SELF-REGION ID (2601) | BS ID(a) (2602) | PORT ID(a) (2603) | BS ID(b) (2604) | PORT ID(b) (2605) | DISTANCE BETWEEN BS [km] (2606) |
|---|---|---|---|---|---|
| R1 | B1 | P11 | B2 | P12 | 10 |
|    | B2 | P12 | B3 | P21 | 10 |

| SELF-REGION ID (2601) | BS ID(a) (2602) | PORT ID(a) (2603) | BS ID(b) (2604) | PORT ID(b) (2605) | DISTANCE BETWEEN BS [km] (2606) |
|---|---|---|---|---|---|
| R2 | B2 | P12 | B3 | P21 | 10 |
|    | B3 | P21 | B4 | P22 | 10 |
|    | B4 | P22 | B5 | P31 | 10 |

FIG.26C

| SELF-REGION ID (2601) | BS ID(a) (2602) | PORT ID(a) (2603) | BS ID(b) (2604) | PORT ID(b) (2605) | DISTANCE BETWEEN BS [km] (2606) |
|---|---|---|---|---|---|
| R3 | B4 | P22 | B5 | P31 | 10 |
|    | B5 | P31 | B6 | P32 | 10 |

FIG.28A

| SELF-REGION ID (801) | BS ID (802) | CN ID (803) | PORT ID (804) |
|---|---|---|---|
| R1 | B1 | N4 | P41 |
| R1 | B2 | N4 | P42 |
| R2 | B3 | N4 | P43 |
| R2 | B4 | N4 | P44 |

FIG.28B

| SELF-REGION ID (801) | BS ID (802) | CN ID (803) | PORT ID (804) |
|---|---|---|---|
| R3 | B5 | N5 | P51 |
| R3 | B6 | N5 | P52 |

FIG.29A

| SELF-REGION ID ~901 | PRIMARY ADJACENT REGION ID ~902 | MS ID ~903 | SECONDARY ADJACENT REGION ID ~904 | MS ID ~905 |
|---|---|---|---|---|
| R1 | R2 | SV4 | R1 | SV4 |
|  |  |  | R3 | SV5 |
| R2 | R1 | SV4 | R2 | SV4 |
|  | R3 | SV5 | R2 | SV4 |

FIG.29B

| SELF-REGION ID ~901 | PRIMARY ADJACENT REGION ID ~902 | MS ID ~903 | SECONDARY ADJACENT REGION ID ~904 | MS ID ~905 |
|---|---|---|---|---|
| R3 | R2 | SV4 | R1 | SV4 |
|  |  |  | R3 | SV5 |

FIG.30A

| 3001 | 3002 | 3003 | 3004 | 3005 | 3006 | 3007 | 3008 | 3009 | 3010 |
|---|---|---|---|---|---|---|---|---|---|
| DISCONNECTION FLOW ID | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | PROTOCOL NUMBER | PREVIOUS REGION ID | CURRENT REGION ID | CONNECTION PORT ID | CURRENTLY DISCONNECTED REGION ID |
| F1 | s1 | d1 | sp1 | dp1 | pr1 | R1 | R2 | P43 | R1, R2, R3 |

FIG.30B

| 3001 | 3002 | 3003 | 3004 | 3005 | 3006 | 3007 | 3008 | 3009 | 3010 |
|---|---|---|---|---|---|---|---|---|---|
| DISCONNECTION FLOW ID | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | PROTOCOL NUMBER | PREVIOUS REGION ID | CURRENT REGION ID | CONNECTION PORT ID | CURRENTLY DISCONNECTED REGION ID |
| F1 | s1 | d1 | sp1 | dp1 | pr1 | R2 | R3 | P51 | R2, R3 |

NETWORK MANAGEMENT SYSTEM, AND NETWORK MANAGEMENT METHOD

INCORPORATION BY REFERENCE

This application claims priority based on Japanese patent application, No. 2018-006886 filed on Jan. 19, 2018, the entire contents of which are incorporated herein by reference.

BACKGROUND

The present invention generally relates to network management.

An abnormal dataflow is produced in a communication network in some cases by transmission of a large volume of data or improper data different from normal data. The abnormal dataflow thus produced is a phenomenon which causes malfunction of services provided via the communication network. It is therefore demanded to securely continue services even in the presence of the abnormal dataflow.

A technology described in JP-2009-253461-A is an example of the background technology in the present field. An object of the technology in JP-2009-253461-A is to provide a network capable of disconnecting improper communication based on physical hierarchies for both wired connection and wireless connection. For achieving this object, a network 1 described in JP-2009-253461-A includes, as mutually connected elements, a wired switch 800 to which a computer device 700 is connectable by wired connection, a wireless controller 500 to which the computer device 700 is connectable by wireless connection, a security monitoring device 300 which records an internet protocol (IP) address of the computer device 700 in a communication log when the computer device 700 performs improper communication, and a communication management device 100 which specifies the computer device 700 performing improper communication. The communication management device 100 includes a device search unit 130 which specifies a media access control (MAC) address of the computer device 700 associated with the IP address extracted from the communication log. Each of the wired switch 800 and the wireless controller 500 refuses connection with the device having the specified MAC address.

However, the technology described in JP-2009-253461-A provides no disclosure and suggestion about disconnection in accordance with movement of a terminal executing improper communication or a terminal influenced by improper communication in the communication network including wired and wireless communication.

It is preferable that unnecessary consumption of network resources is avoided when an abnormal dataflow is present in the communication network. Particularly when an object transmitting an abnormal dataflow moves, disconnection of the abnormal dataflow needs to continue even after movement of the object. However, an enormous amount of network resources are consumed to set disconnection of the dataflow for all communication nodes in the communication network. Accordingly, a problem of inefficiency is caused.

In addition, there is still a problem of a heavy processing load in processing of disconnection of an abnormal dataflow produced in a large-scale communication network.

SUMMARY

The present invention has been developed in consideration of the aforementioned problems. An object of the present invention is to reduce consumption of network resources and a processing load required for continuing disconnection of an abnormal dataflow even when an object transmitting the abnormal dataflow moves in a communication network.

An aspect of the present invention is directed to a network management system including a plurality of server units connected to a plurality of communication nodes, the communication nodes connected to a network and a plurality of base stations each of which covers corresponding one of a plurality of communication areas. Each of the plurality of server units includes one or more management servers. For a self-covered region that is a region included in a plurality of regions and covered by a first management server included in a first server unit, and for one or more primary adjacent regions that are one or more regions adjacent to the self-region, in order for disconnecting an abnormal flow transmitted from a mobile object that has moved to one of the self-covered region and one or more regions adjacent to the self-region, the first management server transmits a first disconnection setting request for disconnecting the abnormal flow to a communication node connected to the self-region, and transmits a second disconnection setting request for disconnecting the abnormal flow to each of one or more second server units that cover the one or more primary adjacent regions. A second server of the second server unit having received the second disconnection setting request executes disconnection setting for disconnecting the abnormal flow, and transmits a first disconnection setting request for disconnecting the abnormal flow to a communication node connected to the corresponding second server unit. The communication node having received the first disconnection setting request executes disconnection setting for disconnecting the abnormal flow. Each of the plurality of regions includes two or more communication areas each of which is covered by corresponding one of two or more base stations connected to an identical communication node.

According to the present invention, reduction of consumption of network resources and a processing load required for continuing disconnection of an abnormal flow is achievable even when a mobile object transmitting the abnormal dataflow (dataflow considered abnormal) moves in a communication network.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 8A is a diagram illustrating an example of region management data for a management server 1 according to the first embodiment.

FIG. 8B is a diagram illustrating an example of region management data for a management server 2 according to the first embodiment.

FIG. 8C is a diagram illustrating an example of region management data for a management server 3 according to the first embodiment.

FIG. 9A is a diagram illustrating an example of adjacent region management data for the management server 1 according to the first embodiment.

FIG. 9B is a diagram illustrating an example of adjacent region management data for the management server 2 according to the first embodiment.

FIG. 9C is a diagram illustrating an example of adjacent region management data for the management server 3 according to the first embodiment.

FIG. 10A is a diagram illustrating an example of disconnection setting management data for the management server 1 according to the first embodiment.

FIG. 10B is a diagram illustrating an example of disconnection setting management data for the management server 2 according to the first embodiment.

FIG. 14 is a diagram illustrating an example of disconnection setting request data handled between the management servers according to the first embodiment.

FIG. 15 is a diagram illustrating an example of disconnection cancellation request data handled between the management servers according to the first embodiment.

FIG. 16 is a diagram illustrating an example of disconnection setting request data from the management server to the communication node according to the first embodiment.

FIG. 17 is a diagram illustrating an example of disconnection cancellation request data from the management server to the communication node according to the first embodiment.

FIG. 18 is a diagram illustrating an example of abnormal flow connection notification data from the communication node to the management server according to the first embodiment.

FIG. 20A is a diagram illustrating an example of adjacent region management data for a management server 1a according to the second embodiment.

FIG. 20B is a diagram illustrating an example of adjacent region management data for a management server 2a according to the second embodiment.

FIG. 20C is a diagram illustrating an example of adjacent region management data for a management server 3a according to the second embodiment.

FIG. 21A is a diagram illustrating an example of adjacent region management data for a management server 1b according to the second embodiment.

FIG. 21B is a diagram illustrating an example of adjacent region management data for a management server 2b according to the second embodiment.

FIG. 21C is a diagram illustrating an example of adjacent region management data for a management server 3b according to the second embodiment.

FIG. 25A is a diagram illustrating an example of disconnection setting management data for the management server 1a according to the third embodiment.

FIG. 25B is a diagram illustrating an example of disconnection setting management data for the management server 2a according to the third embodiment.

FIG. 26A is a diagram illustrating an example of base station distance management data for the management server 1a according to the third embodiment.

FIG. 26B is a diagram illustrating an example of base station distance management data for the management server 2a according to the third embodiment.

FIG. 26C is a diagram illustrating an example of base station distance management data for the management server 3a according to the third embodiment.

FIG. 28A is a diagram illustrating an example of region management data for a management server 4 according to the fourth embodiment.

FIG. 28B is a diagram illustrating an example of region management data for a management server 5 according to the fourth embodiment.

FIG. 29A is a diagram illustrating an example of adjacent region management data for the management server 4 according to the fourth embodiment.

FIG. 29B is a diagram illustrating an example of adjacent region management data for the management server 5 according to the fourth embodiment.

FIG. 30A is a diagram illustrating an example of disconnection setting management data for the management server 4 according to the fourth embodiment.

FIG. 30B is a diagram illustrating an example of disconnection setting management data for the management server 5 according to the fourth embodiment.

DETAILED DESCRIPTION OF THE EMBODIMENTS

Figure 1:
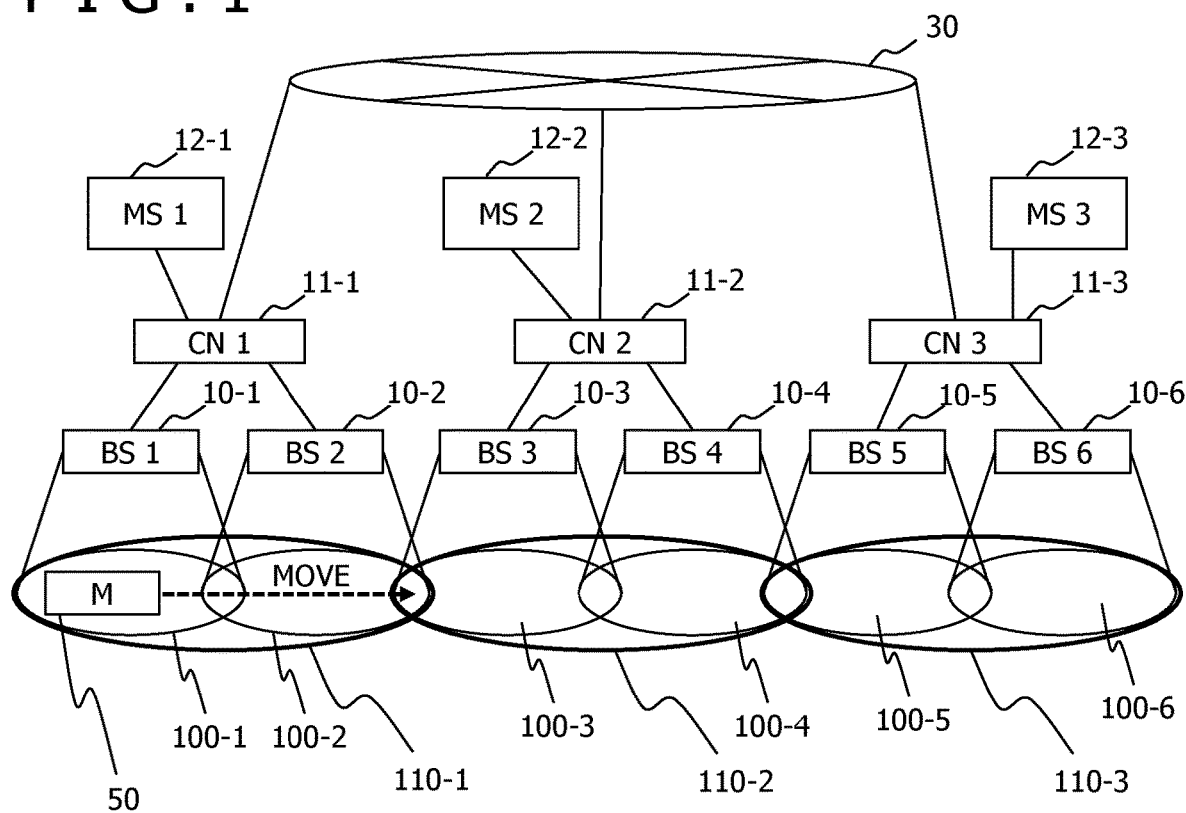
FIG. 1 is an example of a network system configuration diagram according to a first embodiment.

Embodiments are described in detail with reference to the drawings. It is not intended that the present invention be interpreted only based on specific contents described in the respective embodiments described herein. It is easily understood for those skilled in the art that specific configurations may be modified without departing from the spirit or scope of the present invention.

Positions, numbers, sizes, shapes, ranges and the like of respective configurations shown in the drawings or the like are presented only for easy understanding of the invention, and therefore do not coincide with actual positions, numbers, sizes, shapes, ranges and the like in some cases. Accordingly, positions, numbers, sizes, shapes, ranges and the like of the present invention are not necessarily limited to those disclosed in the drawings or others.

In the following description, an "interface unit" may be constituted by one or more interfaces. The one or more interfaces may be one or more communication interface devices of the same type (e.g., one or more network interface cards (NICs), or two or more communication interface devices of different types (e.g., NIC and host bus adapter (HBA)).

In the following description, a "memory unit" may be constituted by one or more memories, typically main storage devices. At least one of the memories included in the memory unit may be a volatile memory or non-volatile memory.

In the following description, a "PDEV unit" may be constituted by one or more PDEVs, typically auxiliary storage devices. A "PDEV" refers to a physical storage device, typically a non-volatile storage device.

In the following description, a "storage unit" is constituted by at least either the memory unit or the PDEV unit (typically at least memory unit).

In the following description, a "processor unit" is constituted by one or more processors. At least one of the processors may be typically a microprocessor such as central processing unit (CPU), or other types of processor such as a graphics processing unit (GPU). At least one of the processors may be of a single core or a multi core. At least one of the processors may be a processor in a broad sense, such as a hardware circuit which performs apart or all of processing (e.g., field-programmable gate array (FPGA) or application specific integrated circuit (ASIC)).

In the following description, a "program" is a grammatical subject of a sentence which describes a process in some cases. However, a program is executed by the processor unit to perform a determined process while appropriately using the storage unit and/or the interface unit, for example. Accordingly, the processor unit (or device such as controller including this processor unit) may be the grammatical subject of the process. The program may be installed in a device such as a computer from a program source. The program source may be a recording medium (e.g., non-transitory recoding medium) readable by a program distributing server or a computer, for example. In the following description, two or more programs may be implemented as one program, or one program may be implemented as two or more programs.

In the following description, elements of the same type are each expressed by only a common part of reference signs of these elements in some cases when no distinction is needed between the respective elements in the description. On the other hand, elements of the same type are each expressed by respective whole reference signs (or identifiers (IDs) of elements) in some cases when distinction is needed between the respective elements in the description. For example, when describing management servers without particular distinction therebetween, these management servers are expressed as "management servers (12)." When distinction is needed between the management servers, the management servers are expressed in such a manner as "management server 1 (12-1)" and "management server 2 (12-2)" in some cases.

Respective embodiments according to the present invention are hereinafter described with reference to FIGS. 1 to 41.

In each of the embodiments described herein, disconnection of an abnormal dataflow produced from a mobile object continues in a large-scale communication network. This disconnection of the abnormal dataflow (hereinafter referred to as abnormal flow) follows movement of the mobile object, and achieves reduction of consumption of network resources and a processing load. The "large-scale" refers to such a scale containing at least a region other than a primary adjacent region and a secondary adjacent region with respect to a region where the mobile object is present. The region, the primary adjacent region, and the secondary adjacent region will be described below.

First Embodiment

According to an example described in the present embodiment, a range of a plurality of combined areas (communication areas) covered by respective base stations in a wireless network is managed as a region. A plurality of management servers shares control of disconnection setting for disconnecting abnormal flow (data stream) in units of region. Described hereinafter with reference to FIGS. 1 to 18 are a configuration of a network system, and operations of components constituting the system according to a first embodiment.

FIG. 1 is an example of a network system configuration diagram according to the first embodiment. In all of the figures, a management server is expressed as "MS," a base station is expressed as "BS," a communication node is expressed as "CN," and a mobile object is expressed as "M." Generally, the "base station" is a device which includes an antenna for communicating with a mobile object (typically wireless communication terminal such as cellular phone), and has a communication area in a range (cell) of several kilometers to a dozen of kilometers around. However, various types of devices providing wireless communication relay, such as an access point, may be interpreted as the "base station."

As illustrated in FIG. 1, the network system according to the present embodiment includes management servers 1 (12-1) to 3 (12-3), base stations 1 (10-1) to 6 (10-6), communication nodes (11-1) to 3 (11-3), a network (30) connecting the respective communication nodes (11), and a mobile object (50) executing wireless communication. The mobile object (50) connects to any one of the base stations 1 (10-1) to 6 (10-6) by wireless connection. Each of the base stations (10) connects to the corresponding communication node (11) which transfers received data to the different base stations (10). For example, the base station 1 (10-1) connects to the communication node 1 (11-1). Similarly, each of the base stations 2 (10-2) to 6 (10-6) connects to the corresponding one of the communication nodes 2 (11-2) and 3 (11-3). Communication via the network (30) is performed via the communication node (11) corresponding to a transmission source and the communication node (11) corresponding to a transmission destination.

Each of the management servers 1 (12-1) to 3 (12-3) manages an "area" which is a range wirelessly connectable to the corresponding one of the base stations (10). For example, a range having a radius of n Km (n>0) around the corresponding base station (10) is managed as an area. According to the example in FIG. 1, a range wirelessly connectable to the base station 1 (10-1) is indicated as an area (100-1). Similarly, ranges wirelessly connectable to the base stations 2 (10-2) to 6 (10-6) are indicated as areas (100-2) to (100-6), respectively. In addition, each of the management servers 1 (12-1) to 3 (12-3) constitutes a region (110) which is a range of a plurality of the combined areas (100) to manage disconnection of an abnormal flow. According to the present embodiment, the management server 1 (12-1) manages a region 1 (110-1) as a range of the combined areas 1 (100-1) and 2 (100-2). Similarly, the management server 2 (12-2) manages a region 2 (110-2) as a range of the combined areas 3 (100-3) and 4 (100-4). The management server 3 (12-3) manages a region 3 (110-3) as a range of the combined areas 5 (100-5) and 6 (100-6).

When the mobile object (50) connects to the base station 1 (10-1) and starts transmission of an abnormal flow, the management server 1 (12-1) executes setting for disconnecting the abnormal flow from the mobile object (50) for the communication node 1 (11-1) connecting to the base station 1 (10-1) and the base station 2 (10-2) within the region 1 (110-1) to which the mobile object (50) belongs based on disconnection setting input from an administrator. According to the present embodiment, disconnection setting is executed in response to disconnection setting input from the administrator as a start point. However, a flow consuming a bandwidth of a predetermined threshold or larger may be detected by the communication node and set as an abnormal flow. The management server 1 (12-1) also requests the management server 2 (12-2), which manages the region 2 (110-2) adjacent to the region (110-1) to which the mobile object (50) belongs, to set disconnection of the abnormal flow. The management server 2 (12-2) executes setting for disconnecting the abnormal flow from the mobile object (50) for the communication node 2 (11-2) present within the region 2 (110-2) managed by the management server 2 (12-2) based on the received disconnection setting for disconnecting the abnormal flow.

Suppose that the mobile object (50) transmitting the abnormal flow moves from the region 1 (110-1) to the region 2 (110-2). When the mobile object (50) transmitting the abnormal flow wirelessly connects to the base station 3 (10-3) within the region 2 (110-2), the communication node 2 (11-2) detects connection to the region 2 (110-2) by the mobile object (50) transmitting the abnormal flow. The communication node 2 (11-2) also notifies the management server 2 (12-2) about connection to the communication node 2 (11-2) by the mobile object (50), whereby the management server 2 (12-2) detects connection to the region 2 (110-2) by the mobile object (50) transmitting the abnormal flow. The management server 2 (12-2) having received the notification from the communication node 2 (11-2) about connection to the communication node 2 (11-2) by the mobile object (50) requests the management server 3 (12-3), which manages the adjacent region 3 (110-3), to set disconnection of the abnormal flow. The management server 3 (12-3) executes setting for disconnecting the abnormal flow from the mobile object (50) for the communication node 3 (11-3) present within the region 3 (110-3) managed by the management server 3 (12-3) based on the received disconnection setting for disconnecting the abnormal flow. Setting for disconnecting the abnormal flow from the mobile object (50) has been already executed for the communication node 1 (11-1) within the region 1 (110-1). Accordingly, the management server (12-2) does not request the management server 1 (12-1) to repeatedly set disconnection of the abnormal flow.

Suppose that the mobile object (50) transmitting the abnormal flow further moves from the region 2 (110-2) to the region 3 (110-3). When the mobile object (50) transmitting the abnormal flow wirelessly connects to the base station 5 (10-5) within the region 3 (110-3), the communication node 3 (11-3) detects connection to the region 3 (110-3) by the mobile object (50) transmitting the abnormal flow. The communication node 3 (11-3) also notifies the management server 3 (12-3) about connection to the communication node 3 (11-3) by the mobile object (50), whereby the management server 3 (12-3) detects connection to the region 3 (110-3) by the mobile object (50) transmitting the abnormal flow. The management server 3 (12-3) requests the management server 1 (12-1), which manages the region 1 (110-1) not adjacently disposed, to cancel disconnection setting for disconnecting the abnormal flow from the mobile object (50).

Each of the management servers (12) manages abnormal flow setting for the management server (12) which manages the region (primary adjacent region) (110) disposed adjacent to the region (covered region) (110) covered by the corresponding management server (12). Each of the management servers (12) also manages abnormal flow disconnection cancelling setting for the management server (12) which manages the region (secondary adjacent region) (110) disposed adjacent to the adjacent region (110) disposed adjacent to the covered region (110). Accordingly, each of the management servers (12) needs to control cancellation of abnormal flow disconnection setting for the covered region (110), the primary adjacent region (110), and the secondary adjacent region (110). However, each of the management servers (12) does not control cancellation of abnormal flow disconnection setting for the other regions (110). Accordingly, a larger-scale network system (e.g., system to which at least either base station (10) or communication node (11) has been added) is handleable.

As described above, disconnection of the abnormal flow transmitted from the mobile object (50) is managed in units of the region (110) as a plurality of the combined areas (100). Accordingly, control of abnormal flow disconnection is achievable without a delay when the mobile object (50) moves and connects to the adjacent base station (10) even at a high moving speed of the mobile object (50). One region may be constituted by one area. However, it is preferable that one region is constituted by a plurality of areas as in the present embodiment for reasons described in this paragraph.

A resource consumed by disconnection of the abnormal flow (e.g., consumed storage capacity) can decrease by cancellation of disconnection setting for the region (110) not disposed adjacent to the region (110) connected to the mobile object (50) transmitting the abnormal flow.

Management of the plurality of regions (110) is shared by the plurality of management servers (12). Accordingly, scalable disconnection of abnormal flow is achievable even in a large-scale network system.

Figure 2:
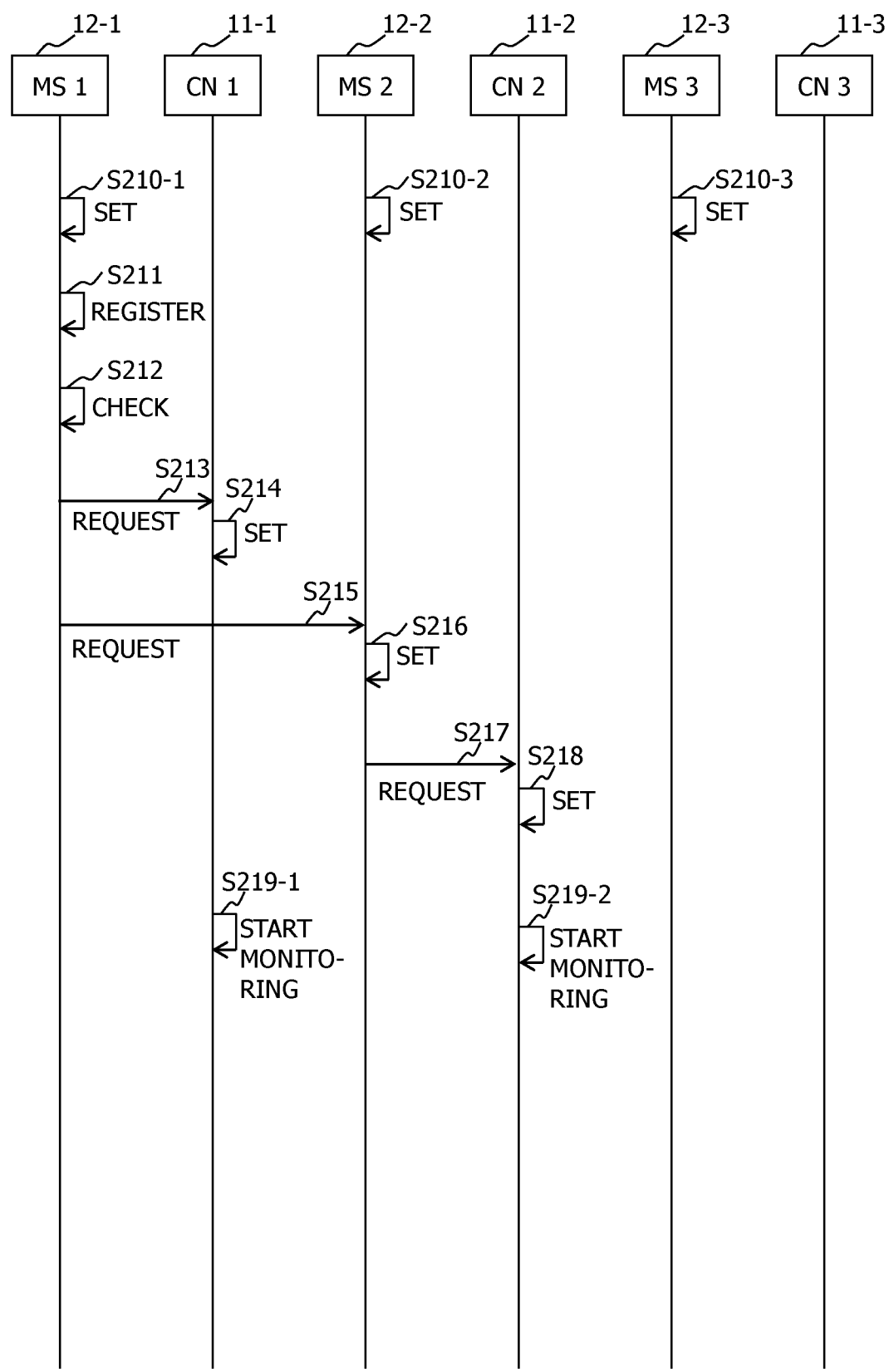
FIG. 2 is an example of an initial setting sequence diagram according to the first embodiment.

FIG. 2 is an example of an initial setting sequence diagram according to the first embodiment.

Each of the management servers 1 (12-1) to 3 (12-3) executes initial setting of data concerning the self-managed region (110), and initial setting of data concerning the adjacent region (primary adjacent region) (110), and the region adjacent to the primary adjacent region (110) (secondary adjacent region) (110) based on input from the administrator (steps S210-1 to S210-3). These initial settings will be detailed below. A relationship between the regions (110) and the base stations (10) included in the regions (110) is defined by input from the administrator of the network system. However, this relationship may be described in a file for setting and read from the file.

The management server 1 (12-1) registers information concerning an abnormal flow which needs to be disconnected based on input from the administrator (step S211). More specifically, the management server 1 (12-1) registers anyone of, or a combination of an identifier (ID) of the abnormal flow, a transmission source IP address of the mobile object (50) transmitting the abnormal flow, a transmission destination IP address, a transmission source port number, a transmission destination port number, and a protocol number of data transfer (for example, see FIG. 10A). The management server 1 (12-1) also registers a port identifier (ID) of the communication node 1 (11-1) receiving the abnormal flow. The management server 1 (12-1) may use identifiers other than the foregoing identifiers. Information such as the transmission source IP address for specifying the abnormal flow is defined based on input from the administrator of the network system. However, the information may be described in a file for setting and read from the file.

After execution of step S211 in response to a request from the administrator, the management server 1 (12-1) checks a configuration of the region (110), and specifies the communication node 1 (11-1) for which abnormal flow disconnection needs to be set, and the management server 2 (12-2) for which disconnection of the abnormal flow is requested (step S212).

The management server 1 (12-1) transmits a request containing request data for disconnection setting of the abnormal flow (hereinafter referred to as disconnection setting request) to the communication node 1 (11-1) specified in step S212 (step S213). The disconnection setting request transmitted from the management server (12) to the communication node (11) is an example of a first disconnection setting request.

The communication node 1 (11-1) executes setting for disconnecting the abnormal flow in response to the disconnection setting request received from the management server 1 (12-1) (step S214). For example, data set for the communication node (11) in response to the disconnection setting request is data (1602) to (1607) described below and included in request data contained in the request (e.g., see FIG. 16).

The management server 1 (12-1) transmits a disconnection setting request containing request data for abnormal flow disconnection setting to the management server 2 (12-2) specified in step S212 (step S215). The disconnection setting request transmitted from the management server (12) to the different management server (12) is an example of a second disconnection setting request.

The management server 2 (12-2) executes setting for disconnecting the abnormal flow in response to the disconnection setting request received from the management server 1 (12-1) (step S216). For example, data set for the management server (12) in response to the disconnection setting request is data (1402) to (1408) described below and included in request data contained in the request (e.g., see FIG. 14). The data (1402) to (1408) is set as disconnection setting management data (623) described below.

When receiving the disconnection setting request from the management server 1 (12-1), the management server 2 (12-2) transmits a disconnection setting request to the communication node 2 (11-2) connected to the self-covered region 2 (110-2) (step S217).

The communication node 2 (11-2) executes setting for disconnecting the abnormal flow in response to the disconnection setting request received from the management server 2 (12-2) (step S218).

The communication node 1 (11-1) and the communication node 2 (11-2) start monitoring whether or not data has been received from the mobile object (50) transmitting the abnormal flow for which disconnection has been set (step S219-1 to S219-2).

Figure 3:
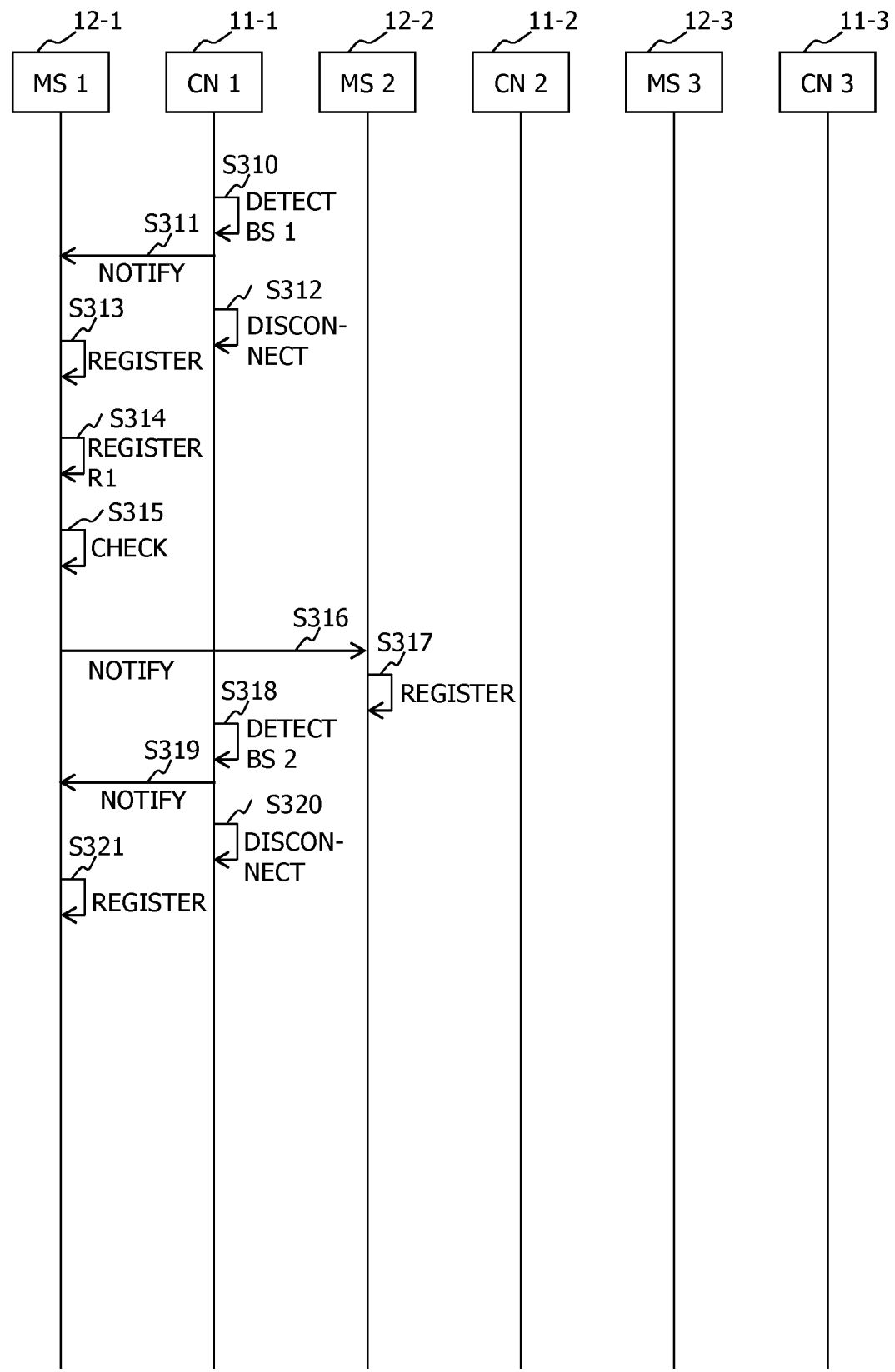
FIG. 3 is an example of abnormal flow disconnection sequence diagram according to the first embodiment.

FIG. 3 is an example of abnormal flow disconnection sequence diagram according to the first embodiment.

When the mobile object (50) transmitting an abnormal flow wirelessly connects via the base station 1 (10-1) and transmits the abnormal flow, the communication node 1 (11-1) detects reception of the abnormal flow from the mobile object (50) transmitting the abnormal flow (step S310).

The communication node 1 (11-1) having detected connection by the mobile object (50) transmitting the abnormal flow (connection to communication node 1 (11-1)) issues, to the management server 1 (12-1) connected to the communication node 1 (11-1), a notification containing connection information which indicates connection by the mobile object (50) transmitting the abnormal flow (step S311). "Port connection information" according to the present embodiment is a port ID which is an ID of a port connected to the mobile object (50) (port of communication node (11)). The notification issued from the communication node (11) to the management server (12) is a notification containing abnormal flow connection notification data (see FIG. 18) as notification data about connection by the mobile object (50) transmitting the abnormal flow.

The communication node 1 (11-1) having transmitted, to the management server 1 (12-1), the notification containing the port connection information indicating port connection by the mobile object (50) transmitting the abnormal flow executes disconnection of the received abnormal flow (step S312).

The management server 1 (12-1) specifies and registers a port ID of the communication node 1 (11-1) associated with the base station 1 (10-1) receiving the abnormal flow based on the port connection information contained in the notification from the communication node 1 (11-1) (step S313).

For example, the port ID is herein registered in disconnection setting management data 1 (623-1) described below as a connection port ID (1009) (see FIG. 10A).

The management server 1 (12-1) registers connection to the self-region (covered region) 1 (110-1) by the mobile object (50) transmitting the abnormal flow based on the connection information contained in the notification received from the communication node 1 (11-1) (step S314). For example, "R1" corresponding to an ID of the self-region 1 (110-1) is herein registered in the disconnection setting management data 1 (623-1) described below as a current region ID (1009). The region n is expressed as "Rn" (n: natural number) in some cases in FIG. 3 and subsequent figures.

The management server 1 (12-1) executes processing in step S315. More specifically, the management server 1 (12-1) checks whether or not connection to the self-region 1 (110-1) by the mobile object (50) transmitting the abnormal flow is first connection. The management server 1 (12-1) further checks whether or not the communication node 11 for which abnormal flow disconnection needs to be set, and the adjacent management server 12 for which disconnection needs to be requested are present. According to the present embodiment, the abnormal flow disconnection notification to the communication node 1 (11-1), and the disconnection setting request for the management server 2 (12-2) covering the primary adjacent region (110-2) have been already executed in step S213 and step S215 in FIG. 2. Accordingly, these notification and request need not be repeatedly executed.

When determining that connection to the self-region 1 (110-1) by the mobile object (50) transmitting the abnormal flow is first connection, the management server 1 (12-1) transmits, to the management server 2 (12-2) covering the primary adjacent region (110-2), a notification containing region connection information indicating that the mobile object (50) transmitting the abnormal flow has connected to the self-covered region 1 (110-1) (step S316). In step S316, the management server 1 (12-1) may notify the management server 2 (12-2) about the region 1 (110-1) connected to the mobile object (50) transmitting the abnormal flow in an identifiable manner based on a base station ID of the base station 1 (10-1) connected to the mobile object (50) transmitting the abnormal flow, and a port ID of the port (port of communication node 1 (11-1)) connected to the mobile object (50), as well as the region ID of the region 1 (110-1) connected to the mobile object (50) transmitting the abnormal flow.

The management server 2 (12-2) registers a region ID indicated by the region connection information contained in the notification from the management server 1 (12-1) (step S317). For example, an ID "R1" of the region 1 (110-1) is registered herein in disconnection setting management data 2 (623-2) described below as a previous region ID (1007) (see FIG. 10B).

When the mobile object (50) subsequently moves and wirelessly connects via the base station 2 (10-2), the communication node 1 (11-1) detects reception of the abnormal flow from the mobile object (50) transmitting the abnormal flow via a port different from the previous port (step S318).

The communication node 1 (11-1) transmits, to the management server 1 (12-1), a notification about reception of the abnormal flow from the mobile object (50) transmitting the abnormal flow via the port different from the previous port (notification containing port connection information indicating port ID of different port) (step S319).

The communication node 1 (11-1) having transmitted, to the management server 1 (12-1), the notification containing the port connection information indicating port connection by the mobile object (50) transmitting the abnormal flow executes disconnection of the received abnormal flow (step S320).

The management server 1 (12-1) specifies the port ID of the communication node 1 (11-1) receiving the abnormal flow based on the port connection information contained in the notification from the communication node 1 (11-1), and updates registration (step S321).

Figure 4:
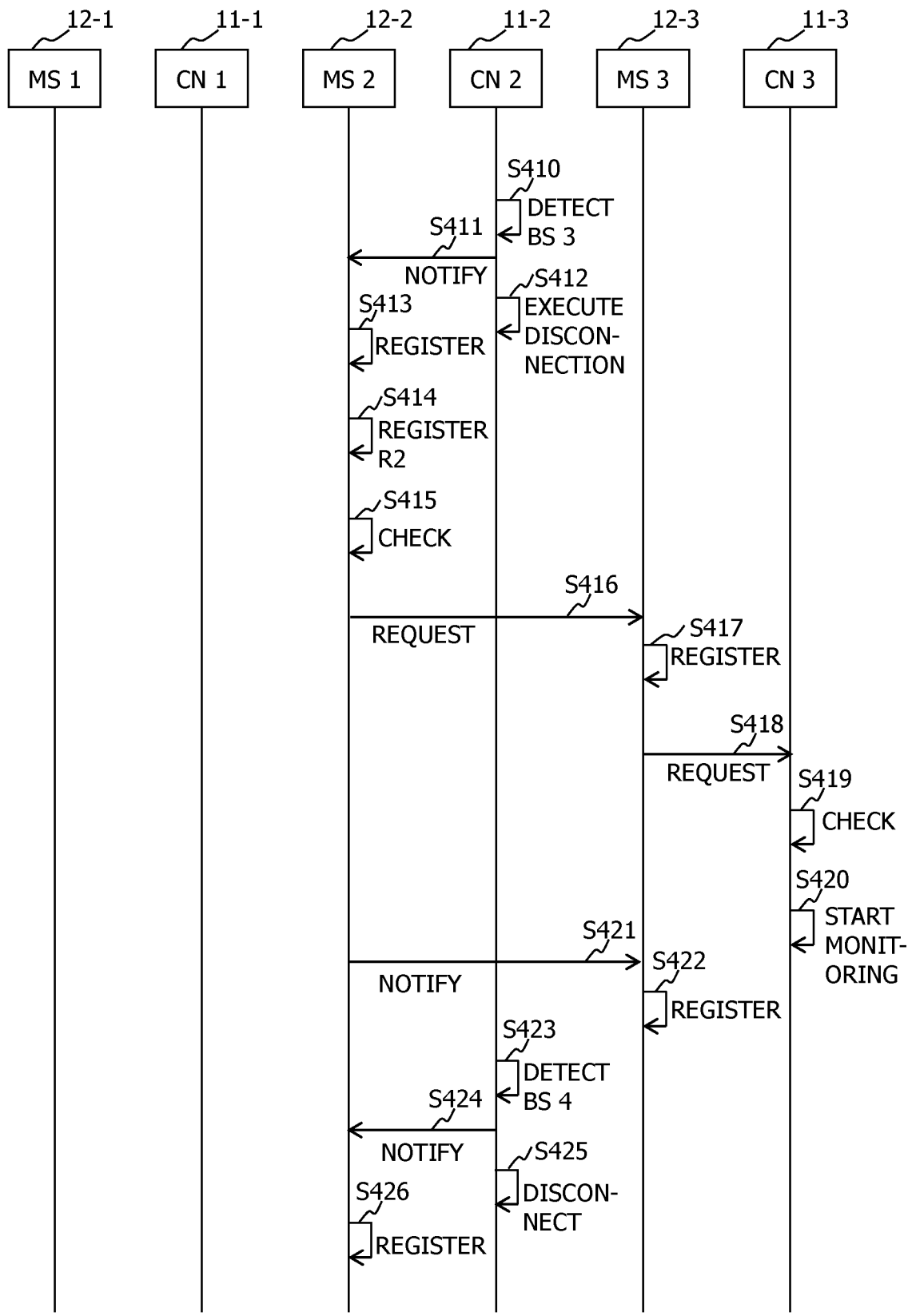
FIG. 4 is an example of a region movement control sequence diagram according to the first embodiment.

FIG. 4 is an example of a region movement control sequence diagram according to the first embodiment.

When the mobile object (50) subsequently moves and wirelessly connects via the base station 3 (10-3), the communication node 2 (11-2) detects reception of the abnormal flow from the mobile object (50) transmitting the abnormal flow (step S410).

The communication node 2 (11-2) transmits, to the management server 2 (12-2) connected to the communication node 2 (11-2), a notification about reception of the abnormal flow from the mobile object (50) transmitting the abnormal flow (notification containing port connection information indicating port ID connected to mobile object (50) transmitting abnormal flow) (step S411).

The communication node 2 (11-2) having transmitted, to the management server 2 (12-2), the notification containing the port connection information indicating port connection by the mobile object (50) transmitting the abnormal flow executes disconnection of the received abnormal flow (step S412).

The management server 2 (12-2) specifies and registers a port ID of the communication node 2 (11-2) associated with the base station 3 (10-3) receiving the abnormal flow based on the port connection information contained in the notification from the communication node 2 (11-2) (step S413). For example, the specified port ID is herein registered in the disconnection setting management data 2 (623-2) described below as a connection port ID (1009).

The management server 2 (12-2) having received the notification from the communication node 2 (11-2) registers connection to the self-region 2 (110-2) by the mobile object (50) transmitting the abnormal flow (step S414). For example, "R2" corresponding to an ID of the self-region 2 (110-2) is herein registered in the disconnection setting management data 2 (623-2) described below as a current region ID (1008).

The management server 2 (12-2) executes processing in step S415. More specifically, the management server 2 (12-2) checks whether or not connection to the self-region 2 (110-2) by the mobile object (50) transmitting the abnormal flow is first connection. The management server 2 (12-2) further checks whether or not the communication node (11) for which abnormal flow disconnection needs to be set, and the adjacent management server (12) for which disconnection needs to be requested are present. More specifically, concerning the communication node 2 (11-2) within the region 2 (110-2) covered by the management server 2 (12-2), notification about the abnormal flow disconnection has been already issued to the communication node 2 (11-2) within the region 2 (110-2) covered by the management server 2 (12-2) in step S217 in FIG. 2. Accordingly, the notification is not repeatedly needed. Concerning the adjacent management server (12) for which disconnection needs to be requested, the management server 2 (12-2) compares a first region list (e.g., list of region IDs) constituted by the self-covered region 2 (110-2) and the one or more adjacent regions disposed adjacent to the region 2 (110-2), with a second list (e.g., list of region IDs) constituted by the region 1 (110-1) connected to the mobile object (50) transmitting the abnormal flow before movement to the region 2 (110-2), and the one or more adjacent regions adjacent to the region 1 (110-1), and determines whether the region (110) for which a disconnection setting request is needed is present, and whether the region (110) for which a disconnection cancellation request is needed is present. Concerning the region (110) for which a disconnection setting request is needed, the management server 2 (12-2) checks whether the region (added region) (110) contained in the first region list but not contained in the second region list is present. When the added region (110) is present, a disconnection setting request is needed for the added region (110). In this case, the management server 2 (12-2) specifies the management server (12) covering the added region (110). On the other hand, concerning the region (110) for which a disconnection cancellation request is needed, the management server 2 (12-2) checks whether the region (reduced region) (110) not contained in the first region list, but contained in the second region list is present. When the reduced region (110) is present, a disconnection cancellation request is needed for the reduced region (110). In this case, the management server 2 (12-2) specifies the management server (12) covering the reduced region (110).

When determining that the adjacent management server 3 (12-3) to which a disconnection setting request needs to be transmitted is present, the management server 2 (12-2) transmits a disconnection setting request, which is a request for abnormal flow disconnection setting, to the management server 3 (12-3) covering the region 3 (110-3) for which abnormal flow disconnection setting is needed (step S416).

The management server 3 (12-3) executes setting for disconnecting the abnormal flow in response to the disconnection setting request received from the management server 2 (12-2) (step S417). For example, data set for the management server (12) in response to the disconnection setting request is data (1402) to (1408) described below and included in request data contained in the request (e.g., see FIG. 14). The data (1402) to (1408) is set for the disconnection setting management data (623) described below.

The management server 3 (12-3) having received the disconnection setting request from the management server 2 (12-2) transmits a disconnection setting request, which contains a disconnection flow ID contained in the received disconnection setting request, to the communication node 3 (11-3) connected to the self-covered region 3 (110-3) (step S418).

The communication node 3 (11-3) executes setting for disconnecting the abnormal flow in response to the disconnection setting request received from the management server 3 (12-3) (step S419).

The communication node 3 (11-3) starts monitoring whether or not data has been received from the mobile object (50) transmitting the abnormal flow for which disconnection has been set (step S420).

When determining that connection to the self-region 2 (110-2) by the mobile object (50) transmitting the abnormal flow is first connection in step S415, the management server 2 (12-2) transmits, to the management server 3 (12-3) covering the adjacent region 3 (110-3), a notification containing region connection information indicating that the mobile object (50) transmitting the abnormal flow has connected to the self-covered region 2 (110-2) (step S421). In step S421, the management server 2 (12-2) may notify the management server 3 (12-3) about the region 2 (110-2) connected to the mobile object (50) transmitting the abnormal flow in an identifiable manner based on the base station ID of the base station 3 (10-3) and the port ID of the communication node 2 (11-2) connected to the mobile object (50), as well as the region ID of the region 2 (110-2) connected to the mobile object (50) transmitting the abnormal flow. For example, the notification in step S421 may contain the previous region ID (1007) "R1" and the current region ID (1008) "R2" in the disconnection setting management data 2 (623-2) described below.

The management server 3 (12-3) registers the region connection information (connection to region 2 (110-2)) contained in the notification from the management server 2 (12-2) (step S422).

When the mobile object (50) subsequently moves and wirelessly connects via the base station 4 (10-4), the communication node 2 (11-2) detects reception of the abnormal flow from the mobile object (50) transmitting the abnormal flow via a port different from the previous port (step S423).

The communication node 2 (11-2) transmits, to the management server 2 (12-2), a notification about reception of the abnormal flow from the mobile object (50) transmitting the abnormal flow via the port different from the previous port (notification containing port connection information indicating port ID of different port) (step S424).

The communication node 2 (11-2) having transmitted the above notification to the management server 2 (12-2) executes disconnection of the received abnormal flow (step S425).

The management server 2 (12-2) specifies the port ID of the communication node 2 (11-2) receiving the abnormal flow based on the port connection information contained in the notification from the communication node 2 (11-2), and updates registration (step S426). For example, the connection port ID (1009) in not-shown disconnection setting management data 3 is herein updated to the port ID indicated in the port connection information contained in the notification.

Figure 5:
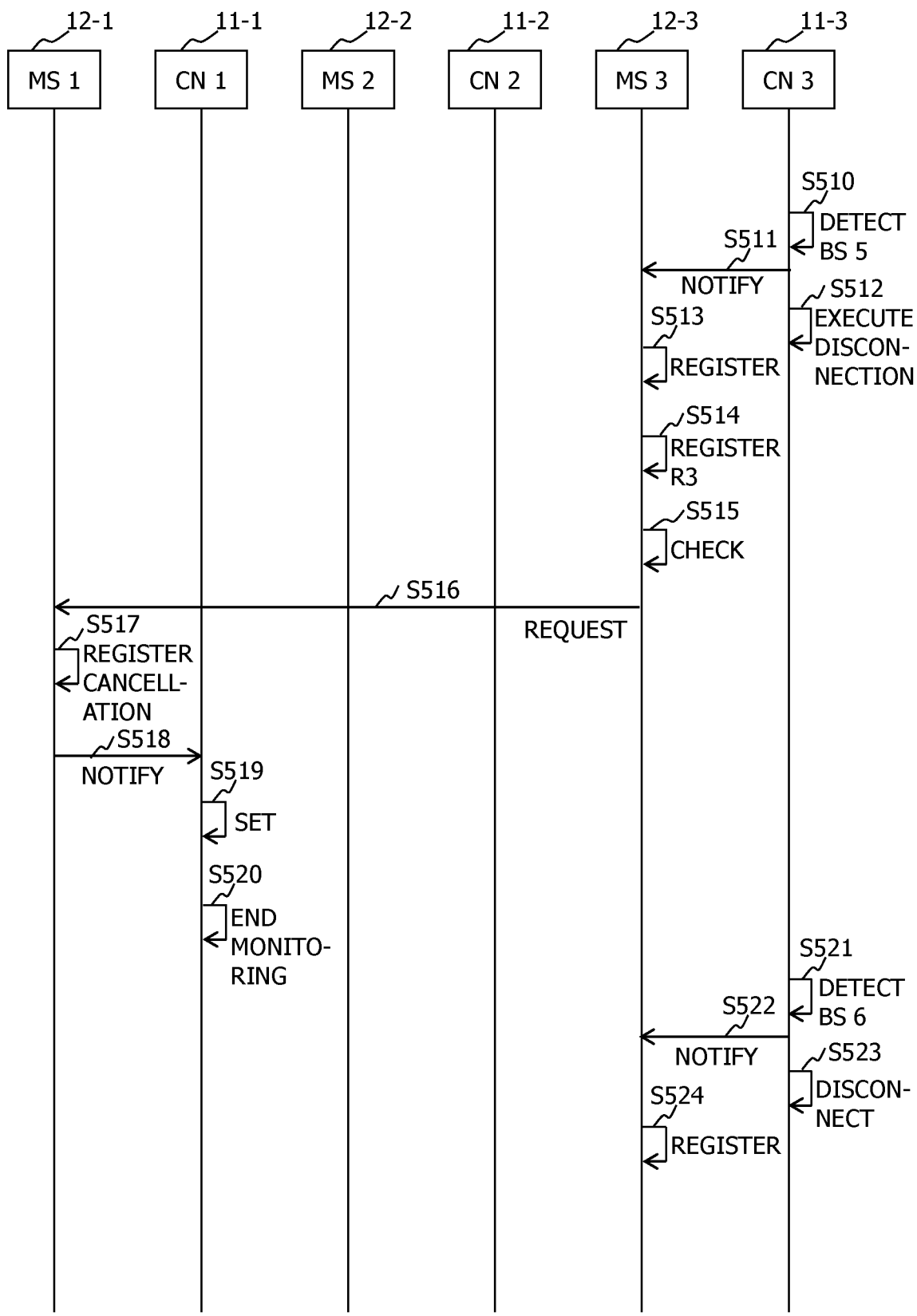
FIG. 5 is an example of a disconnection cancellation sequence diagram according to the first embodiment.

FIG. 5 is an example of a disconnection cancellation sequence diagram according to the first embodiment.

When the mobile object (50) subsequently moves and wirelessly connects via the base station 5 (10-5), the communication node 3 (11-3) detects reception of the abnormal flow from the mobile object (50) transmitting the abnormal flow (step S510).

The communication node 3 (11-3) transmits, to the management server 3 (12-3), a notification about reception of the abnormal flow from the mobile object (50) transmitting the abnormal flow (notification containing port connection information indicating ID of connected port) (step S511).

The communication node 3 (11-3) having transmitted the above notification to the management server 3 (12-3) executes disconnection of the received abnormal flow (step S512).

The management server 3 (12-3) specifies and registers a port ID of the communication node 3 (11-3) associated with the base station 5 (10-5) receiving the abnormal flow based on the port connection information contained in the notification from the communication node 3 (11-3) (step S513). For example, the connection port ID (1009) in the not-shown disconnection setting management data 3 is herein updated to the port ID indicated by the port connection information contained in the notification.

The management server 3 (12-3) having received the above notification from the communication node 3 (11-3) registers connection to the self-region 3 (110-3) by the mobile object (50) transmitting the abnormal flow (step S514). For example, "R3" corresponding to an ID of the self-region 3 (110-3) is herein registered in the not-shown disconnection setting management data 3 as the current region ID (1008).

The management server 3 (12-3) executes processing in step S515. More specifically, the management server 3 (12-3) checks whether or not connection to the self-region 3 (110-3) by the mobile object (50) transmitting the abnormal flow is first connection. The management server 3 (12-3) further checks whether or not the communication node (11) for which abnormal flow disconnection needs to be set, and the adjacent management server (12) for which disconnection needs to be requested are present. The management server 3 (12-3) further checks whether or not the adjacent management server (12) for which abnormal flow disconnection cancellation needs to be requested is present. According to the present embodiment, notification about the abnormal flow disconnection has been already issued to the communication node 3 (11-3) within the self-covered region 3 (110-3) in step S418 in FIG. 4. Accordingly, the notification need not be repeatedly issued. Moreover, disconnection setting for the adjacent region 2 (110-2) has been already executed in step S421, wherefore the management server 3 (12-3) need not repeatedly request disconnection setting for the adjacent region 2.

When determining that the adjacent management server 1 (12-1) which needs to request cancellation of abnormal flow disconnection for the region 1 (110-1) adjacent to the region 2 (110-2) adjacent to the self-covered region 3 (110-3) is present, the management server 3 (12-3) transmits a disconnection cancellation request, which is a request for cancelling abnormal flow disconnection cancellation setting, to the management server 1 (12-1) managing the region 1 (110-1) for which cancellation of abnormal flow disconnection setting is needed (step S516). The disconnection cancellation request transmitted from the management server (12) to the different management server (12) is an example of a first disconnection cancellation request. For example, the disconnection cancellation request contains disconnection cancellation request data described below (FIG. 15). It may be determined herein that the management server 1 (12-1) for which the abnormal flow disconnection cancellation needs to be requested is present when a following condition (x1) is met. However, it is preferable to determine that the management server 1 (12-1) for which the abnormal flow disconnection cancellation needs to be requested is present when the following condition (x1) and a following condition (x2) are both met. These conditions are established to avoid a request for cancellation of abnormal flow disconnection setting for the management server 1 (12-1) in a state that disconnection setting has not been executed for the region 1 (110-1).

(x1) The ID "R1" of the region 1 (110-1) has been registered as a secondary adjacent region ID (904) in adjacent region management data 3 (622-3) described below.

(x2) The request in step S416 in FIG. 4, or the notification in step S421 in FIG. 4 contains the previous region ID (1007) "R2."

The management server 1 (12-1) executes cancellation of the abnormal flow disconnection setting (cancellation registration) in response to the disconnection cancellation request received from the management server 3 (12-3) (step S517). For example, information corresponding to the abnormal flow is herein deleted from the disconnection setting management data 1 (623-1) (see FIG. 10A).

The management server 1 (12-1) having received the disconnection cancellation request from the management server 2 (12-2) transmits a disconnection cancellation request, which is a request for cancelling abnormal flow disconnection, to the communication node 1 (11-1) connecting the self-covered region 1 (110-1) (step S518). The disconnection cancellation request transmitted from the management server (12) to the communication node (11) is an example of a second disconnection cancellation request.

The communication node 1 (11-1) executes abnormal flow disconnection cancellation in response to the disconnection cancellation request received from the management server 1 (12-1) (step S519). For example, abnormal flow disconnection setting information corresponding to the abnormal flow is herein deleted from the communication node 1 (11-1).

The communication node 1 (11-1) ends monitoring of whether or not data has been received from the mobile object (50) transmitting the abnormal flow for which disconnection cancellation has been set (step S520).

When the mobile object (50) subsequently moves and wirelessly connects via the base station 6 (10-6), the communication node 3 (11-3) detects reception of the abnormal flow from the mobile object (50) transmitting the abnormal flow (step S521).

The communication node 3 (11-3) transmits, to the management server 3 (12-3) connected to the communication node 3 (11-3), a notification about reception of the abnormal flow from the mobile object (50) transmitting the abnormal flow (notification containing port connection information indicating ID of connected port) (step S522).

The communication node 3 (11-3) having transmitted the above notification to the management server 3 (12-3) executes disconnection of the received abnormal flow (step S523).

The management server 3 (12-3) specifies and registers the port ID of the communication node 3 (11-3) associated with the base station 6 (10-6) receiving the abnormal flow based on the port connection information contained in the notification from the communication node 3 (11-3) (step S524).

Figure 6:
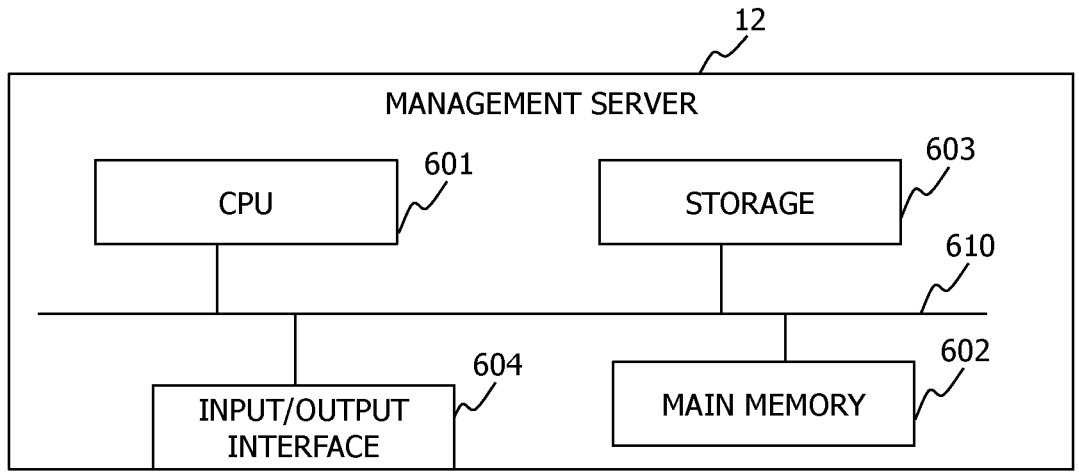
FIG. 6 illustrates a configuration example of a management server according to the first embodiment.

FIG. 6 is a diagram illustrating a configuration example of the management server (12) according to the first embodiment.

As illustrated in the figure, the management server (12) includes a central processing unit (CPU) (601) as an example of a processor unit (processing device), a main memory (602) and a storage (603) as an example of a storage unit, and an input/output interface (604) which is an example of an interface unit, and transmits and receive data via a network. The respective components are connected to each other via a bus (610). The management server 12 may further include a not-shown input/output device, such as a keyboard and an image display device. The CPU (601) controls respective units of the management server (12), loads programs stored in the storage (603) into the main memory (602) and executes the programs to perform various types of functions. The main memory (602) stores an abnormal flow disconnection management program executed by the CPU (601), and work data necessary for execution of the programs (region management data, adjacent region management data, and disconnection setting management data). The storage (603) may be a large-volume storage device, such as a solid state drive (SSD) and a hard disk drive (HDD). Particularly according to the present embodiment, the abnormal flow disconnection management program is stored in the storage (603).

Figure 7:
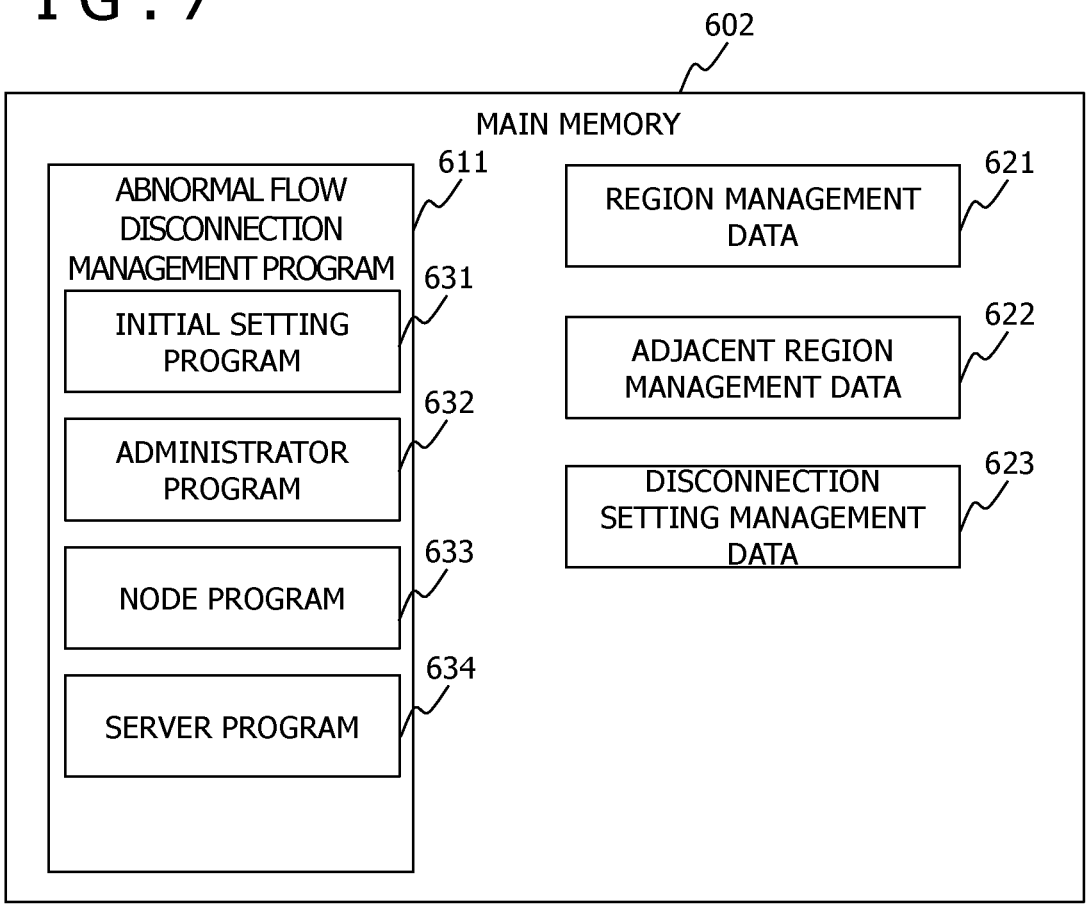
FIG. 7 is a diagram illustrating an example of data retained in a memory within the management server according to the first embodiment.

FIG. 7 is a diagram illustrating an example of data and programs retained in the main memory (602) within the management server (12) according to the first embodiment.

The abnormal flow disconnection management program (611) is loaded into and executed at the main memory (602). For example, the abnormal flow disconnection management program (611) contains an initial setting program (631) for initial setting, an administrator program (632) for processing information input from the administrator, a node program (633) for processing information input from the communication node (11), and a server program (634) for processing information input from the different management server (12). After execution of the initial setting program (631), the administrator program (632), the node program (633), and the server program (634) may be executed in parallel.

Further retained are region management data (621) necessary for execution of the abnormal flow disconnection management program (611), adjacent region management data (622), and disconnection setting management data (623). The abnormal flow disconnection management program (611) will be described below with reference to FIG. 12. The region management data (621) will be described below with reference to FIGS. 8A to 8C. The adjacent region management data (622) will be described below with reference to FIGS. 9A to 9C. The disconnection setting management data (623) will be described below with reference to FIGS. 10A and 10B.

FIG. 8A is a diagram illustrating an example of region management data 1 (621-1) for the management server 1 (12-1) according to the first embodiment. FIG. 8B is a diagram illustrating an example of region management data 2 (621-2) for the management server 2 (12-2) according to the first embodiment. FIG. 8C is a diagram illustrating an example of region management data 3 (621-3) for the management server 3 (12-3) according to the first embodiment. Described hereinafter is a configuration of the region management data 1 (621-1) presented by way of example of the region management data (621).

The region management data 1 (621-1) illustrated in FIG. 8A is constituted by a self-region ID (801) indicating an identifier (ID) of the self-region 1 (110-1) covered by the management server 1 (12-1), abase station ID (802) indicating IDs of the base stations 1 (10-1) and 2 (10-2) present within the corresponding region 1 (110-1), a communication node ID (803) indicating IDs of the communication node 1 (11-1) connected to the base stations 1 (10-1) and 2 (10-2), and a port ID (804) indicating IDs of ports connected to the communication nodes 1 (11-1) and 2 (11-2). As indicated in rows (811) and (812), the management server 1 (12-1) covers the region 1 (110-1) (self-region ID (801): "R1"). As indicated in the row (811), the base station 1 (10-1) (base station ID (802): "B1") is connected to the region 1 (110-1). The communication node 1 (11-1) (communication node ID (803): "Ni") receives data from the base station 1 (10-1) via the port "P11" (port ID (804): "P11"). As indicated in the row (812), the base station 2 (10-2) (base station ID (802): "B2") is connected to the region 1 (110-1). The communication node 1 (11-1) receives data from the base station 2 (10-2) via the port "P12" (port ID (804): "P12").

FIG. 9A is a diagram illustrating an example of the adjacent region management data 1 (622-1) for the management server 1 (12-1) according to the first embodiment. FIG. 9B is a diagram illustrating an example of the adjacent region management data 2 (622-2) for the management server 2 (12-2) according to the first embodiment. FIG. 9C is a diagram illustrating an example of the adjacent region management data 3 (622-3) for the management server 3 (12-3) according to the first embodiment. Described hereinafter is a configuration of the adjacent region management data 1 (622-1) presented by way of example of the adjacent region management data (622).

The adjacent region management data 1 (622-1) illustrated in FIG. 9A is constituted by respective fields of a self-region ID (901) indicating an ID of the self-region 1 (110-1) covered by the management server 1 (12-1), a primary adjacent region ID (902) indicating an ID of the region 2 (110-2) adjacent to the self-region 1 (110-1), a management server ID (903) indicating an ID of the management server 2 (12-2) covering the primary adjacent region 2 (110-2), a secondary adjacent region ID (904) indicating IDs of the regions 3 (110-3) and 1 (110-1) adjacent to the adjacent region 2 (110-2), and a management server ID (905) indicating IDs of the management servers 3 (12-3) and 1 (12-1) covering the secondary adjacent regions 3 (110-3) and 1 (110-1), respectively. As indicated in rows (911) and (912), the management server 1 (12-1) covers the region 1 (110-1). The region 2 (110-2) (primary adjacent region ID (902): "R2") is disposed adjacent to the region 1 (110-1). The primary adjacent region 2 (110-2) is covered by the management server 2 (12-2) (management server ID (903): "SV2"). As indicated in the row (911), the secondary adjacent region 1 (110-1) (secondary adjacent region ID (904): "R1") is present for the primary adjacent region 2 (110-2). The secondary adjacent region 1 (110-1) is covered by the management server 1 (12-1) (management server ID (905): "SV1"). As indicated in the row (912), the secondary adjacent region 3 (110-3) (secondary adjacent region ID (904): "R3") is present for the primary adjacent region 2 (110-2). The secondary adjacent region 3 (110-3) is covered by the management server 3 (management server ID (905): "SV3").

FIG. 10A is a diagram illustrating an example of the disconnection setting management data 1 (623-1) for the management server 1 (12-1) according to the first embodiment. FIG. 10B is a diagram illustrating an example of the disconnection setting management data 2 (623-2) for the management server 2 (12-2) according to the first embodiment. Described hereinafter is a configuration of the disconnection setting management data 1 (623-1) presented by way of example of the disconnection setting management data (623).

The disconnection setting management data 1 (623-1) illustrated in FIG. 10A is constituted by respective fields of a disconnection flow ID (1001) indicating an ID which specifies a disconnection flow (abnormal flow of disconnection target), a transmission source IP address (1002) indicating an IP address of a transmission source, a transmission destination IP address (1003) indicating an IP address of a transmission destination, a transmission source port number (1004) indicating a number given to a port of the transmission source, a transmission destination port number (1005) indicating a number given to a port of the transmission destination, a protocol number (1006) indicating a number given to a protocol for transmission and reception, a previous region ID (1007) indicating an ID of the region (110) connected to the mobile object (50) transmitting the disconnection flow before movement to the self-region 1 (110-1), a current region ID (1008) indicating movement to the self-region 1 (110-1) by the mobile object (50) transmitting the disconnection flow, and a connection port ID (1009) indicating an ID of a port of the communication node 1 (11-1) receiving the disconnection flow in the self-region 1 (110-1). Data characterizing the disconnection flow may be any one or a combination of the data (1002) to (1006), or other data such as a media access control (MAC) address. According to the example illustrated in the figure, the disconnection flow ID (1001) is "F1," the transmission source IP address (1002) of the disconnection flow (abnormal flow) is "s1," the transmission destination IP address (1003) is "d1," the transmission source port number (1004) is "sp1," the transmission destination port number (1005) is "dp1," and the protocol number (1006) is "pr1" The previous region ID (1007) indicates an invalid value "-." In this case, there exists no previous region to which the mobile object (50) transmitting the disconnection flow "F1" has been connected. Accordingly, the disconnection flow "F1" is flow of first registration. The current region ID (1008) is "R1," indicating that the mobile object (50) transmitting the disconnection flow "F1" connects to the region 1 (110-1), and transmits and receives data via the connection port "P11" of the communication node 1 (11-1). When the disconnection flow "F1" connects to the region 1 (110-1) via the port "P11," the management server 1 (12-1) refers to the region management data 1 (621-1) in FIG. 8A and the adjacent region management data 1 (622-1) in FIG. 9A, and executes disconnection setting for the ports of the communication nodes 1 (11-1) and 2 (11-2) connected to all the base stations 1 (10-1) to 4 (10-4) contained in the self-covered region (110-1) and the adjacent region 2 (110-2).

Figure 11:
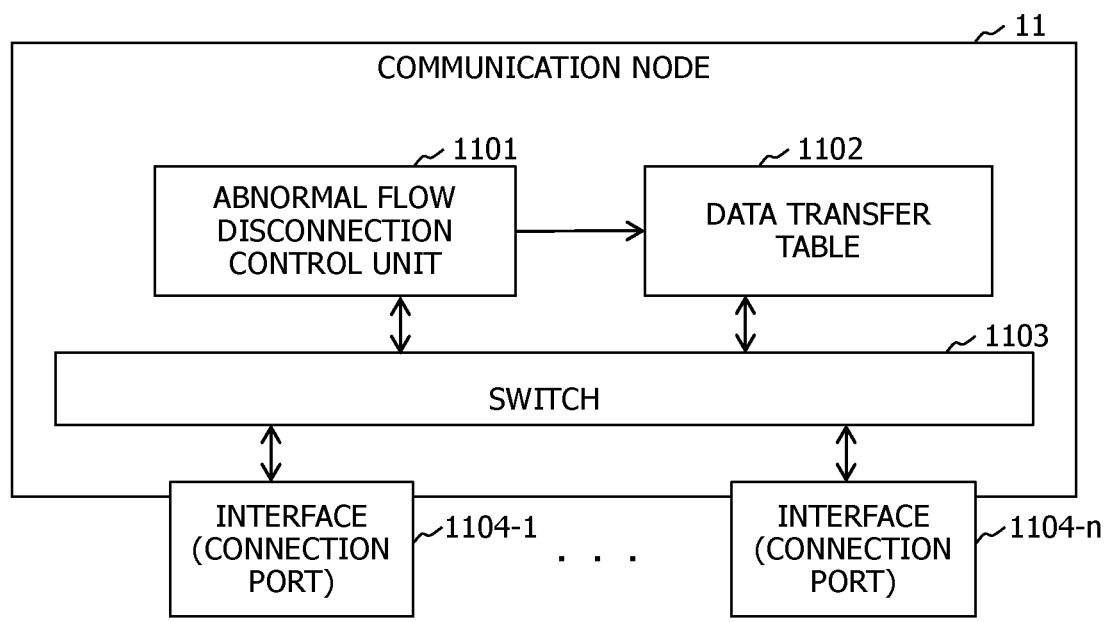
FIG. 11 is a diagram illustrating a configuration example of a communication node according to the first embodiment.

FIG. 11 is a diagram illustrating a configuration example of the communication node (11) according to the first embodiment.

The communication node (11) includes network interfaces (1104-1 to 1104-*n*) functioning as connection ports, a switch (1103), an abnormal flow disconnection control unit (1101), and a data transfer table (1102). According to a physical configuration of the communication node illustrated in the figure, the abnormal flow disconnection control unit (1101) implements determined processes in cooperation with other hardware under programs stored in a not-shown storage device and executed by a not-shown processor.

The data transfer table (1102) is a table for detecting whether or not a flow characterized by the data (1002) to (1006) illustrated in FIGS. 10A and 10B has been received, and for executing disconnection. The data transfer table (1102) is also a table for the switch (1103) for transferring data from an input/output interface for reception to an input/output interface for transmission based on a different transmission destination IP address of received dataflow.

When receiving packet data (abnormal flow setting data) addressed to the self-communication node (11), the switch (1103) transfers the packet data to the abnormal flow disconnection control unit (1101). The abnormal flow disconnection control unit (1101) having received the abnormal flow setting data enters the characteristic data (1002) to (1006), which indicates the abnormal flow to be disconnected, in the data transfer table (1102). The switch (1103) having received the abnormal flow entered in the data transfer table (1102) refers to the data transfer table (1102), notifies the abnormal flow disconnection control unit (1101) about reception of the entered abnormal flow, and discards the received abnormal flow data. When detecting reception of the entered abnormal flow, the abnormal flow disconnection control unit (1101) notifies the management server (12) about connection by the mobile object (50) transmitting the entered abnormal flow.

According to the present embodiment, various types of programs may be installed into respective computers from a program distribution server, or a storage medium readable by the computers. In this case, the program distribution server includes a processor and a storage resource. The storage resource further stores a distribution program and programs corresponding to distribution targets. The processor of the program distribution server executes the distribution program to distribute the programs corresponding to the distribution targets to the different computers. Functions equivalent to functions constituted by software in the embodiment may be implemented by hardware, such as field programmable gate array (FPGA), and application specific integrated circuit (ASIC). These modes are included in the scope of the present invention. The same is applicable to the management server (12) illustrated in FIG. 6.

Figure 12:
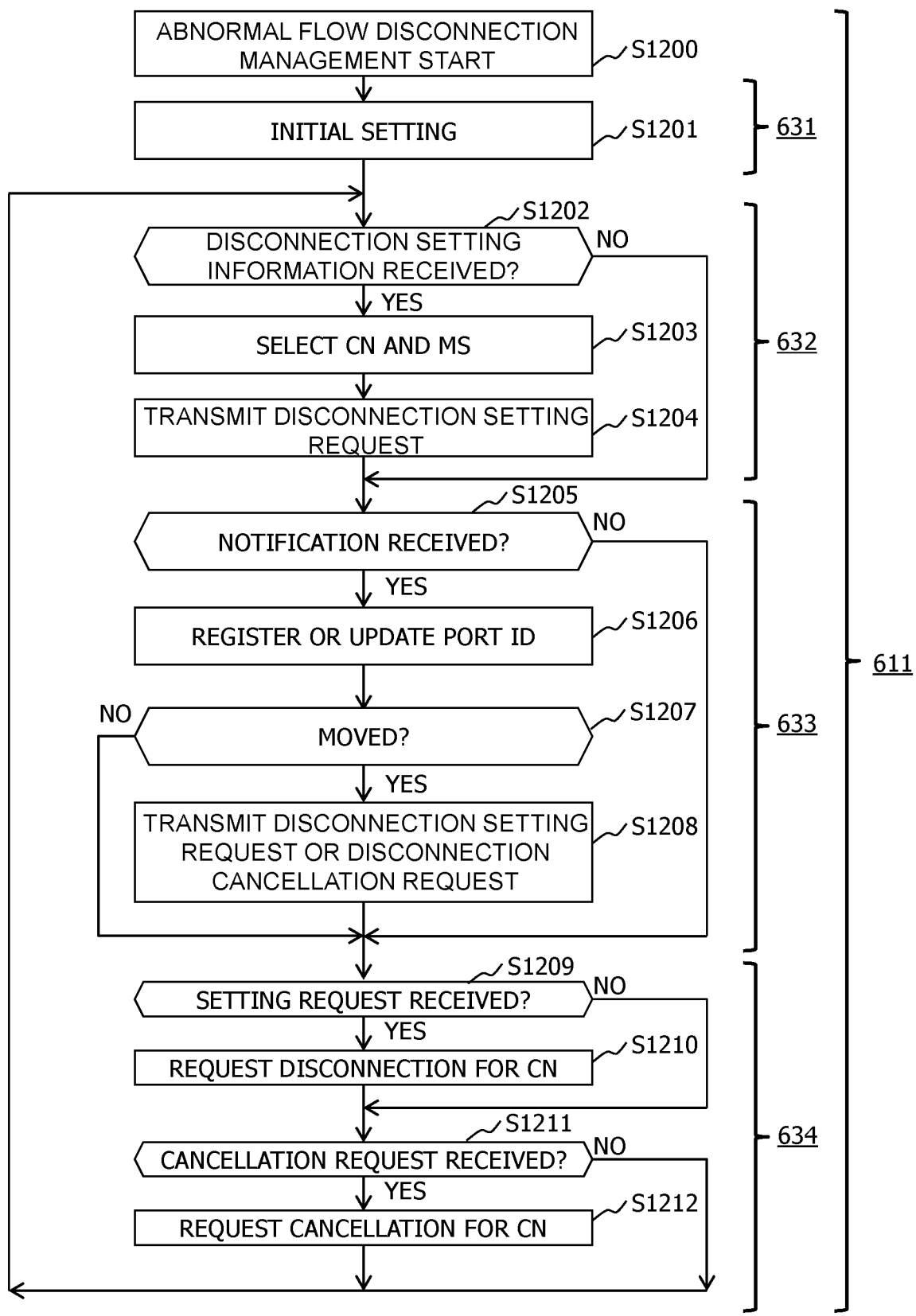
FIG. 12 is an example of a flowchart showing abnormal flow disconnection management by the management server according to the first embodiment.

FIG. 12 is an example of a flowchart showing abnormal flow disconnection management performed by the management server (12) according to the first embodiment. Processing in step S1201 is executed under the initial setting program (631). A first process corresponding to processing in steps S1202 to S1204 is executed under the administrator program (632). A second process corresponding to processing in steps S1205 to S1208 is executed under the node program (633). A third process corresponding to processing in steps S1209 to S1212 is executed under the server program (634). Two or more of the first through third processes may be sequentially executed as illustrated in FIG. 12, or may be executed in parallel as described above.

The CPU (601) of the management server (12) loads the abnormal flow disconnection management program (611) stored in the storage (603) into the main memory (602), and starts abnormal flow disconnection management (step S1200).

The initial setting program (631) executes initial setting for data concerning the self-covered region (110), the region adjacent to the covered region (110) (primary adjacent region) (110), the region adjacent to the primary adjacent region (110) (secondary adjacent region) (110) based on input from the network system administrator (step S1201). Setting of the region management data (621) and the adjacent region management data (622) is thus completed.

The administrator program (632) determines whether or not abnormal flow information (information concerning abnormal flow (disconnection flow)) has been received from the network system administrator (step S1202).

When determining in step S1202 that the abnormal flow information has been received, the administrator program (632) checks a configuration of the primary adjacent region (110), and selects the communication node (11) and the management server (12) for which notification about abnormal flow disconnection setting needs to be issued (step S1203).

The administrator program (632) transmits a disconnection setting request to the selected communication node (11) and management server (12) (step S1204), and executes processing in step S1205.

When the administrator program (632) determines in step S1202 that the abnormal flow information has not been received, processing in step S1205 is executed.

The node program (633) determines whether or not a notification containing port connection information indicating port connection by the mobile object (50) transmitting the abnormal flow has been received from the communication node (11) (step S1205).

When the node program (633) determines in step S1205 that the notification has not been received from the communication node (11), processing in step S1209 is executed.

When determining in step S1205 that the notification has been received from the communication node (11), the node program (633) registers the port ID of the communication node (11) connected to the mobile object (50) transmitting the abnormal flow (port ID indicated in port connection information contained in notification), or updates the registered port ID (step S1206). The port ID registered or updated in step S1206 is a connection port ID (1009) in the disconnection setting management data (623).

The node program (633) determines whether or not the mobile object (50) transmitting the abnormal flow has moved between the regions (110) (moved from region (110) to adjacent region (110)) (step S1207).

When determining in step S1207 that the mobile object (50) transmitting the abnormal flow has moved between the regions (110), the node program (633) selects the management server (12) corresponding to a transmission destination of a disconnection setting request or a disconnection cancellation request, and transmits the disconnection setting request or disconnection cancellation request to the selected management server (12) (step S1208).

When the node program (633) determines in step S1207 that the mobile object (50) transmitting the abnormal flow has not moved between the regions (110), processing in step S1209 is executed.

The server program (634) determines whether or not a disconnection setting request has been received from the different management server (12) (step S1209).

When determining in step S1209 that a disconnection setting request has been received from the different management server (12), the server program (634) transmits a disconnection setting request to the self-managed communication node (11) based on disconnection setting request data contained in the received disconnection setting request (step S1210). Data (1602) to (1607) (see FIG. 16) included in the disconnection setting request data contained in the disconnection setting request issued to the communication node (11) is identical to the data (1402) to (1407) (see FIG. 14) included in the disconnection setting request data contained in the disconnection setting request from the different management server (12).

When determining in step S1209 that a disconnection setting request has not been received from the different management server (12), the server program (634) determines whether or not a disconnection cancellation request has been received from the different management server (12) (step S1211).

When determining in step S1211 that a disconnection cancellation request has been received from the different management server (12), the server program (634) transmits a disconnection cancellation request to the self-managed communication node (11) based on disconnection cancellation request data contained in the received disconnection cancellation request (step S1212). Data (1702) (see FIG. 17) included in the disconnection cancellation request data contained in the disconnection cancellation request issued to the communication node (11) is identical to the data (1502) (see FIG. 15) included in the disconnection cancellation request data contained in the disconnection cancellation request from the different management server (12).

When it is determined in step S1211 that a disconnection cancellation request has not been received from the different management server (12), processing in step S1202 is executed.

The abnormal flow information may be registered in the disconnection setting management data (623) in the first process (step S1202 to step S1204), and may be registered in the respective fields accordingly. At least a part of the abnormal flow information may be transmitted from the system having detected the abnormal flow (e.g., base station (10) or communication node (11)), rather than from the administrator. The "abnormal flow" is a dataflow which is different from an allowed flow (normal flow), and meets a predetermined condition (e.g., dataflow containing larger volume of data transmitted per unit time than predetermined volume). A reference for determining abnormal dataflow may be established based on any conditions or by the administrator.

Figure 13:
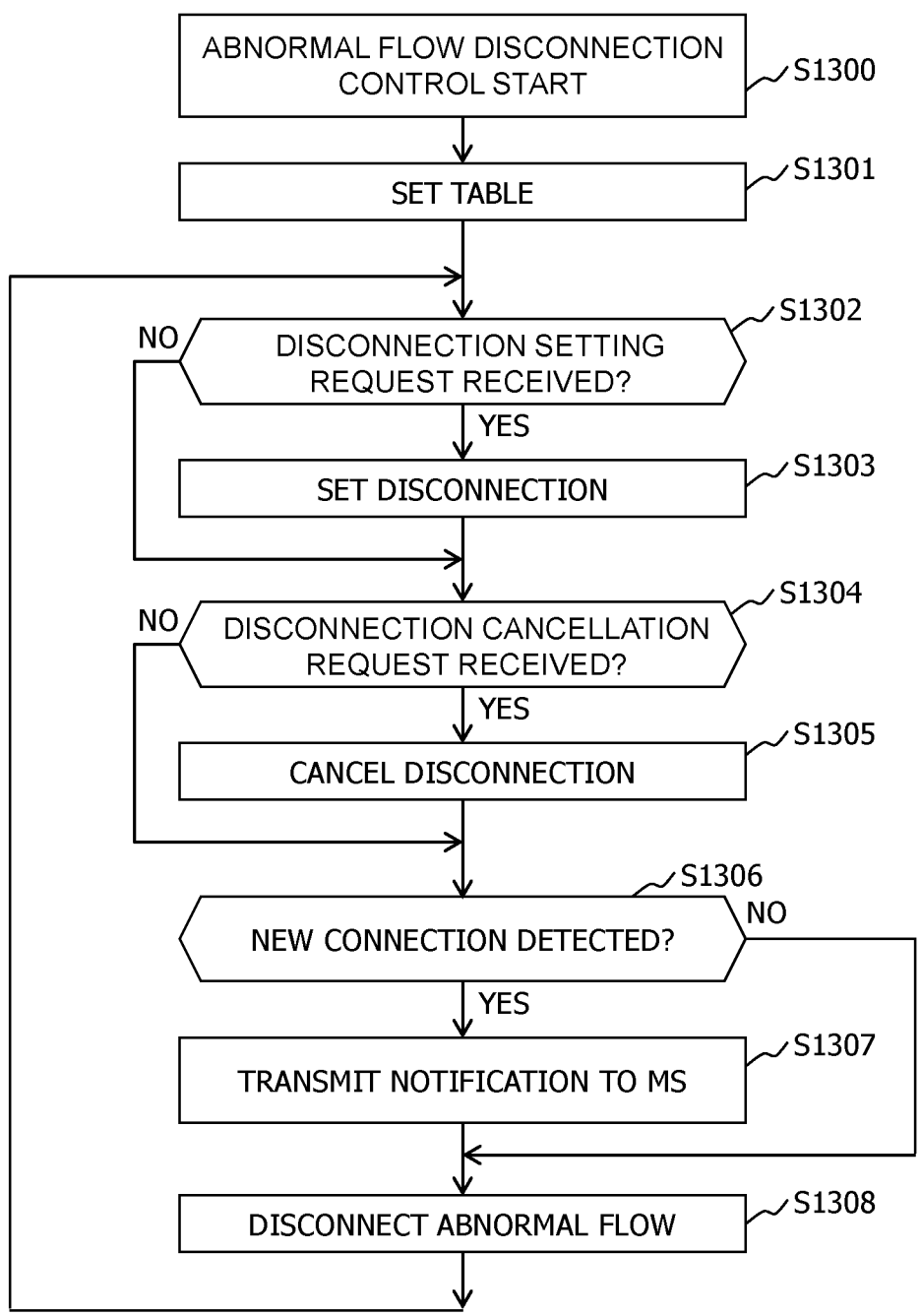
FIG. 13 is an example of a flowchart showing abnormal flow disconnection management by the communication node according to the first embodiment.

FIG. 13 is an example of a flowchart showing abnormal flow disconnection management performed by the communication node (11) according to the first embodiment. A first process corresponding to processing in step S1302 and step S1303, a second process corresponding to processing in step S1304 and step S1305, and a third process corresponding to processing in steps S1306 to S1308 may be sequentially executed as illustrated in FIG. 12, or may be executed in parallel.

The abnormal flow disconnection control unit (1101) of the communication node (11) causes a not-shown processor to execute an abnormal flow disconnection control program stored in a not-shown storage device to start an abnormal flow disconnection control process (step S1300).

The abnormal flow disconnection control unit (1101) receives the data transfer table (1102) set by the administrator of the communication node (11) to transfer data to the different communication node (11) or the like (step S1301).

The abnormal flow disconnection control unit (1101) determines whether or not an abnormal flow disconnection setting request has been received from the management server (12) (step S1302).

When determining in step S1302 that an abnormal flow disconnection setting request has been received from the management server (12), the abnormal flow disconnection control unit (1101) detects an abnormal flow and executes disconnection setting in response to the received disconnection setting request (step S1303), and then executes processing in step S1304.

When determining in step S1302 that an abnormal flow disconnection setting request has not been received from the management server (12), the abnormal flow disconnection control unit (1101) executes processing in step S1304.

The abnormal flow disconnection control unit (1101) determines whether or not an abnormal flow disconnection cancellation request has been received from the management server (12) (step S1204).

When determining in step S1204 that an abnormal flow disconnection cancellation request has been received from the management server (12), the abnormal flow disconnection control unit (1101) detects an abnormal flow and cancels disconnection setting in response to the received disconnection cancellation request (step S1305), and then executes processing in step S1306.

When determining in step S1304 that an abnormal flow disconnection cancellation request has not been received from the management server (12), the abnormal flow disconnection control unit (1101) executes processing in step S1306.

The abnormal flow disconnection control unit (1101) determines whether or not connection by the mobile object (50) transmitting abnormal flow (dataflow set as abnormal flow) has been newly detected (step S1306).

When determining in step S1306 that connection by the mobile object (50) transmitting abnormal flow has not been newly detected, the abnormal flow disconnection control unit (1101) executes processing in step S1308.

When determining in step S1306 that connection by the mobile object (50) transmitting abnormal flow has been newly detected, the abnormal flow disconnection control unit (1101) transmits, to the management server (12), a notification containing port connection information indicating an ID of a port connected to the mobile object (50) transmitting the abnormal flow (step S1307).

The abnormal flow disconnection control unit (1101) having transmitted the notification to the management server (12) executes disconnection of the received abnormal flow (step S1308), and executes step S1302.

FIG. 14 is a diagram illustrating an example of disconnection setting request data handled between the management servers (12) according to the first embodiment.

Disconnection setting request data illustrated in the figure is data contained in the foregoing disconnection setting request issued between the management servers (12). The disconnection setting request data is constituted by respective fields of a control ID (1401) indicating a type of control, a disconnection flow ID (1402), a transmission source IP address (1403), a transmission destination IP address (1404), a transmission source port number (1405), a transmission destination port number (1406), a protocol number (1407), and a previous region ID (1408). According to the example illustrated in the figure, the control ID (1401) is "1" indicating a request for setting disconnection, while data (1402) to (1408) is identical to the data (1001) to (1007) illustrated in FIG. 10B. The management server (12) having received the request data executes abnormal flow disconnection setting based on data contained in the request data.

FIG. 15 is a diagram illustrating an example of disconnection cancellation request data handled between the management servers (12) according to the first embodiment.

Disconnection cancellation request data illustrated in the figure is data contained in the foregoing disconnection cancellation request issued between the management servers (12). The disconnection cancellation request data is constituted by respective fields of a control ID (1501) and a disconnection flow ID (1502). According to the example illustrated in the figure, the control ID (1501) is "2" indicating a request for cancellation of disconnection setting, while the disconnection flow ID (1502) is identical to the data (1001) illustrated in FIG. 10A. The management server (12) having received the request data executes cancellation of abnormal flow disconnection setting based on data contained in the request data.

FIG. 16 is a diagram illustrating an example of disconnection setting request data from the management server (12) to the communication node (11) according to the first embodiment.

Disconnection setting request data illustrated in the figure is data contained in the foregoing disconnection setting request issued from the management server (12) to the communication node (11). The disconnection setting request data is constituted by respective fields of a control ID (1601), a disconnection flow ID (1602), a transmission source IP address (1603), a transmission destination IP address (1604), a transmission source port number (1605), a transmission destination port number (1606), and a protocol number (1607). According to the example illustrated in the figure, the control ID (1601) is "11" indicating a request for setting disconnection, while data (1602) to (1607) is identical to the data (1001) to (1006) illustrated in FIG. 10A. The communication node (11) having received the request data executes abnormal flow disconnection setting based on data contained in the request data.

FIG. 17 is a diagram illustrating an example of disconnection cancellation request data from the management server (12) to the communication node (11) according to the first embodiment.

Disconnection cancellation request data illustrated in the figure is data contained in the foregoing disconnection cancellation request issued from the management server (12) to the communication node (11). The disconnection cancellation request data is constituted by respective fields of a control ID (1701) and a disconnection flow ID (1702). According to the example illustrated in the figure, the control ID (1701) is "12" indicating a request for cancellation of disconnection setting, while the disconnection flow ID (1702) is identical to the data (1001) illustrated in FIG. 10A. The communication node (11) having received the request data executes cancellation of abnormal flow disconnection setting based on data contained in the request data.

FIG. 18 is a diagram illustrating an example of abnormal flow connection notification data from the communication node (11) to the management server (12) according to the first embodiment.

The abnormal flow connection notification data is constituted by respective fields of a control ID (1801), a disconnection flow ID (1802), and a connection port ID (1803) indicating an ID of a port having received a disconnection flow. According to the example illustrated in the figure, the control ID (1801) is "15" indicating a request for connection of the disconnection flow, while the disconnection flow ID (1802) is identical to the data (1001) illustrated in FIG. 10A. The connection port ID (1803) is "21" indicating reception of the disconnection flow via a port "21."

As described above, the plurality of areas (100) are combined into the region (110). The management server (12) is provided for each of the regions (110). Frequent disconnection setting for the communication node (11) is therefore avoidable by executing abnormal flow disconnection in units of region. Moreover, the management server (12) manages abnormal flow disconnection for the self-covered region (110) and the primary adjacent region (110), and cancellation of disconnection flow for the secondary adjacent region. In this case, management for other regions is unnecessary. Accordingly, expansion to a large-scale network system, and disconnection of abnormal flow are achievable. Furthermore, reduction of network resource consumption is achievable by setting abnormal flow disconnection for the region (110) to which the mobile object (50) transmitting abnormal flow is likely to move, and cancelling abnormal flow disconnection setting for the region (110) to which the mobile object (50) is unlikely to move. Concerning services to be provided and used via the network (30), services requiring normal movement without transmitting abnormal flow become available by disconnecting an abnormal flow on the network (30). Accordingly, services are continuously offerable. The configuration described herein specifies abnormal flow based on an identifier such as an IP address in abnormal flow control. Accordingly, control is achievable for not only an abnormal flow but also a flow specified based on an identifier.

Second Embodiment

According to the first embodiment, the one management server (12) manages the one region (110). According to a second embodiment, however, a plurality of the management servers (12) manage the one region (110). More specifically, an example of the server unit according to the first embodiment is constituted by the one management server (12). However, an example of the server unit according to the second embodiment is constituted by a plurality of the management servers (12). The second embodiment is hereinafter described with reference to FIGS. 19 to 22. Differences from the first embodiment are chiefly described, and points common to the first embodiment are not repeatedly described or only simply described.

Figure 19:
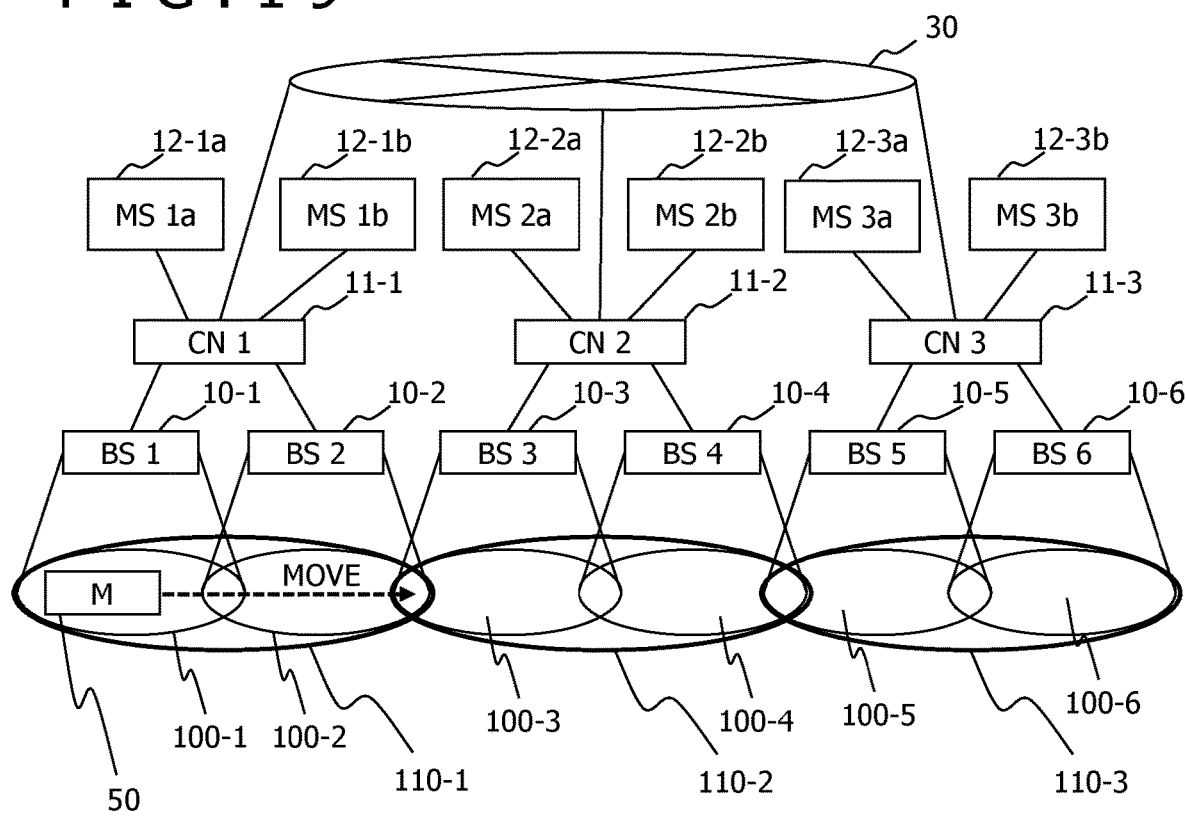
FIG. 19 is an example of a network system configuration diagram according to a second embodiment.

FIG. 19 is an example of a network system configuration diagram according to the second embodiment.

As illustrated in FIG. 19, the management servers (12) in the network system according to the present embodiment include a management server 1a (12-1a), a management server 1b (12-1b), a management server 2a (12-2a), a management server 2b (12-2b), a management server 3a (12-3a), and a management server 3b (12-3b). The region 1 (110-1) is covered by the management server 1a (12-1a) and the management server 1b (12-1b) connected to the communication node 1 (11-1). The region 2 (110-2) is covered by the management server 2a (12-2a) and the management server 2b (12-2b) connected to the communication node 2 (11-2). The region 3 (110-3) is covered by the management server 3a (12-3a) and the management server 3b (12-3b) connected to the communication node 3 (11-3).

According to the present embodiment, a correlation between an abnormal flow from the mobile object (50) and the management server (12) managing the abnormal flow is established based on determination of whether a final value of a transmission source IP address of the mobile object (50) is an odd number or even number. More specifically, for example, the management server 1a (12-1a) connects to the region 1 (110-1), and manages disconnection of an abnormal flow having an odd final value in a transmission source IP address. The management server 1b (12-1b) connects to the region 1 (110-1), and manages disconnection of an abnormal flow having an even final value in a transmission source IP address. The communication node 1 (11-1) notifies the management server 1a (12-1a) about reception of an abnormal flow received via the base station 1 (10-1) and the base station 2 (10-2) when a final value in a transmission source IP address is an odd number. On the other hand, the communication node 1 (11-1) notifies the management server 1b (12-1b) about reception of an abnormal flow when a final value in a transmission source IP address is an even number.

According to the present embodiment, the two management servers (12) are provided for each of the regions (110) so that management of an abnormal flow is shared by the two management servers (12) based on determination of whether a final value of a transmission source IP address of abnormal flow is an odd number or even number. Alternatively, N (N: 2 or larger integer) management servers may be provided for each of the regions (110) so that the management server (12) managing an abnormal flow is determined based on a remainder obtained by dividing an ID (e.g., number) for identifying the abnormal flow by N.

When the two or more management servers for managing each of the regions (110) are provided, management is achievable even for the one or more mobile objects (50) each transmitting a plurality of (e.g., a large number of) abnormal flows to the corresponding region (110).

FIG. 20A is a diagram illustrating an example of adjacent region management data 1a (622-1a) for the management server 1a (12-1a) according to the second embodiment. FIG. 20B is a diagram illustrating an example of adjacent region management data 2a (622-2a) for the management server 2a (12-2a) according to the second embodiment. FIG. 20C is a diagram illustrating an example of adjacent region management data 3a (622-3a) for the management server 3a (12-3a) according to the second embodiment. FIG. 21A is a diagram illustrating an example of adjacent region management data 1b (622-1b) for the management server 1b (12-1b) according to the second embodiment. FIG. 21B is a diagram illustrating an example of adjacent region management data 2b (622-2b) for the management server 2b (12-2b) according to the second embodiment. FIG. 21C is a diagram illustrating an example of adjacent region management data 3b (622-3b) for the management server 3b (12-3b) according to the second embodiment. The adjacent region management data (622) illustrated in each of FIGS. 20A to 20C and FIGS. 21A to 21C expresses the configuration of FIG. 19. As can be seen from these figures, the configuration of the adjacent region management data (622) is identical to the corresponding configuration according to the first embodiment.

Figure 22:
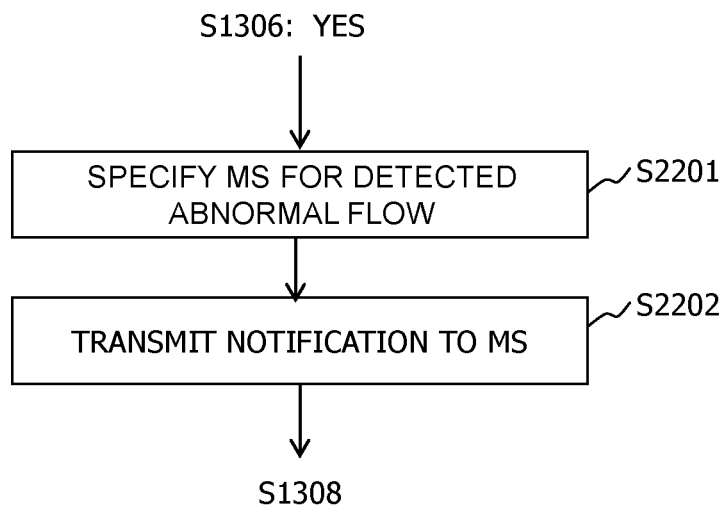
FIG. 22 is an example of a flowchart showing abnormal flow disconnection management by a communication node according to the second embodiment.

FIG. 22 is an example of a flowchart showing abnormal flow disconnection management performed by the communication node (11) according to the second embodiment. Differences from FIG. 13 are chiefly described.

When it is determined in step S1306 that connection by the mobile object transmitting an abnormal flow has been newly detected by the communication node, step S2201 and step S2202 are executed instead of step S1307. More specifically, the abnormal flow disconnection control unit (1101) specifies the management server (12) corresponding to a transmission destination of a notification of port connection information indicating an ID of a port connected to the mobile object (50) transmitting the abnormal flow based on determination of whether a final value of a transmission source IP address of the abnormal flow is an odd number or even number (step S2201).

The abnormal flow disconnection control unit (1101) transmits the notification to the management server (12) specified in step S2201 (step S2202).

As described above, the one region (110) is managed by the plurality of management servers (12). Accordingly, disconnection of an abnormal flow is achievable even when there exists the one or more mobile objects (50) each transmitting a plurality of (e.g., large number of) abnormal flows to each of the regions (110).

Third Embodiment

According to the second embodiment, whether or not the mobile object (50) transmitting an abnormal flow has been newly connected is detected in units of communication node. According to a third embodiment, however, the mobile object (50) transmitting abnormal flow is detected for each port connected to the base station (10). Moreover, a moving speed of the mobile object (50) between the base stations (10) is detected based on a detected connection time for each of the base stations (10). Abnormal flow disconnection is preferentially executed for the mobile object (50) moving at a high moving speed. The third embodiment is hereinafter described with reference to FIGS. 23 to 26. Differences from the second embodiment (and first embodiment) are chiefly described, and points common to the second embodiment (and first embodiment) are not repeatedly described or only simply described.

Figure 23:
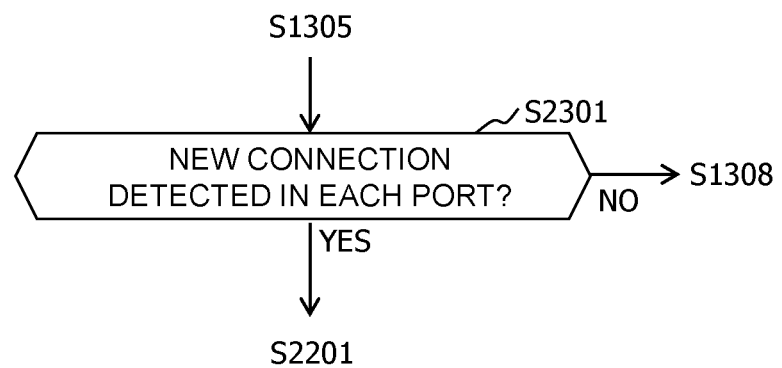
FIG. 23 is an example of a flowchart showing abnormal flow disconnection management by a communication node according to a third embodiment.

FIG. 23 is an example of a flowchart showing abnormal flow disconnection management performed by the communication node (11) according to the third embodiment. Differences from FIGS. 13 and 22 are chiefly described.

After step S1305, step S2301 is executed instead of step S1306. More specifically, the abnormal flow disconnection control unit (1101) determines whether or not connection by the mobile object (50) transmitting an abnormal flow has been newly detected in units of port of the communication node (11) (step S2301). In other words, the abnormal flow disconnection control unit (1101) determines whether or not the port connected to the mobile object (50) transmitting abnormal flow (port of communication node (11)) is a port newly connected to the mobile object (50).

When determining in step S2301 that the connection port of the mobile object (50) transmitting the abnormal flow is a new port for the mobile object (50), the abnormal flow disconnection control unit (1101) executes step S2201.

Figure 24:
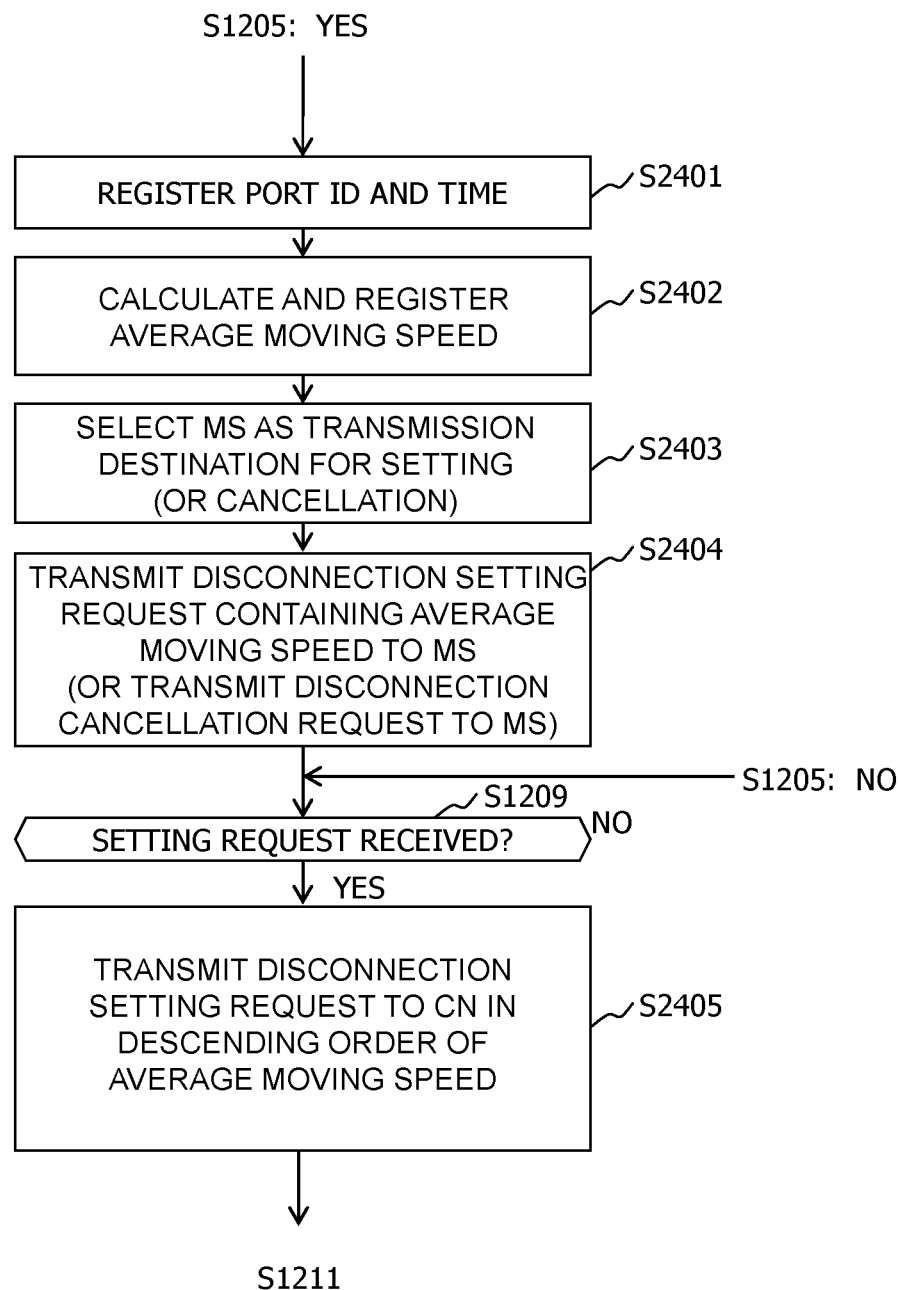
FIG. 24 is an example of a flowchart showing abnormal flow disconnection management by a management server according to the third embodiment.

FIG. 24 is an example of a flowchart showing abnormal flow disconnection management performed by the management server (12) according to the third embodiment. Differences from FIG. 12 are chiefly described.

The node program (633) having received, from the communication node, connection information indicating connection by the mobile object (50) transmitting an abnormal flow (step S1205: YES) executes step S2401 to step S2404 instead of step S1206 to step S1208.

More specifically, the node program (633) registers, in disconnection setting management data (2500) described below, a port ID of a port connected to the mobile object (50) transmitting the abnormal flow (port of communication node (11)), and a time of connection to the port (see FIGS. 25A and 25B) (step S2401).

The node program (633) checks presence or absence of previous registration of a port ID and a connection time of the same mobile object (50). When it is determined that the port ID and connection time of the same mobile object (50) have been registered, the node program (633) calculates an average moving speed based on a distance and a time of movement of the mobile object between connection ports (movement between base stations), and registers the average moving speed in the disconnection setting management data (2500) described below (step S2402). The average moving speed is an example of the moving speed. The moving speed may be other types of moving speed, such as a maximum moving speed.

When the mobile object (50) transmitting the abnormal flow moves between the regions (110), the node program (633) selects the management server (12) as a transmission destination of a disconnection setting request or a disconnection cancellation request (step S2403).

The node program (633) transmits, to the selected management server (12), a disconnection setting request containing disconnection setting request data including the average moving speed of the mobile object (50) transmitting the abnormal flow. The node program (633) also transmits an abnormal flow disconnection cancellation request to the management server (12) managing the region (110) for which disconnection setting is not needed (step S2404).

The server program (634) determines whether or not an abnormal flow disconnection setting request has been received from the different management server (12) (step S1209).

When determining in step S1209 that an abnormal flow disconnection setting request has been received from the different management server (12), the server program (634) executes step S2405 instead of step S1210. More specifically, the server program (634) transmits a disconnection setting request to the communication node (11) in a descending order of the average moving speed of the mobile object (50) (step S2405).

As described above, when it is detected that the plurality of mobile objects (50) each transmitting a plurality of abnormal flows to the communication node (11) have connected to the management server (12) executing the server program (634), the server program (634) transmits, to the communication node (11), a disconnection setting request for disconnecting the abnormal flows transmitted from the corresponding mobile object (50) such that the request is issued in the descending order of the average moving speed of the mobile object (50). As a result, abnormal flow disconnection setting is first performed for the mobile object moving at the highest speed.

FIG. 25A is a diagram illustrating an example of disconnection setting management data 1a (2500-1a) for the management server 1a (12-1a) according to the third embodiment. FIG. 25B is a diagram illustrating an example of disconnection setting management data 2a (2500-2a) for the management server 2a (12-2a) according to the third embodiment. Described hereinafter is a configuration of the disconnection setting management data 1a (2500-1a) presented by way of example of the disconnection setting management data (2500). Differences from the configuration of the disconnection setting management data 1 (623-1) illustrated in FIG. 10A are chiefly described.

The disconnection setting management data 1a (2500-1a) includes respective fields of a connection region ID (2501) indicating an ID of the region (110) connected to the mobile object (50), a connection port ID (2502) indicating an ID of a port connected to the mobile object (50) (port of communication node (11)), a connection time (2503) indicating a time of connection to the port by the mobile object (50), and an average moving speed (2504) indicating a calculated average moving speed of the mobile object (50), instead of (or in addition to) the respective fields of the data (1007) to (1009). A row (2511) indicates that the mobile object (50) transmitting an abnormal flow has connected to a port "11" (base station 1 (10-1)) of the communication node 1 (11-1) in the region 1 (110-1) at a time "T1." However, an average moving speed of the mobile object (50) is not registered in this stage. A row (2512) indicates that the mobile object (50) has moved and connected to a port "12" (base station 2 (10-2)) of the communication node at a time "T2." In this stage, an average moving speed "48" (km/h) of the mobile object (50) is recorded based on a distance and a connection time difference between the connection ports (base stations (10)).

FIG. 26A is a diagram illustrating an example of base station distance management data 1a (2600-1a) for the management server 1a (12-1a) according to the third embodiment. FIG. 26B is a diagram illustrating an example of base station distance management data 2a (2600-2a) for the management server 2a (12-2a) according to the third embodiment. FIG. 26C is a diagram illustrating an example of base station distance management data 3a (2600-3a) for the management server 3a (12-3a) according to the third embodiment. Described hereinafter is a configuration of the base station distance management data 1a (2600-1a) presented by way of example of the base station distance management data (2600).

Concerning the respective regions (110), at least one of the plurality of management servers (12) covering the corresponding regions (110) stores the base station distance management data (2600) in the main memory (602), for example. For example, the base station distance management data 1a (2600-1a) illustrated in FIG. 26A is constituted by respective fields of a self-region ID (2601) indicating an ID of the region 1 (110-1) covered by the management server 1 (12-1), a base station ID(a) (2602) indicating an ID of the first base station (10), a port ID(a) (2603) indicating an ID of a port connected to the first base station (10) (port of communication node (11)), a base station ID(b) (2604) indicating an ID of the second base station (10), a port ID(b) (2605) indicating an ID of a port connected to the second base station (10) (port of communication node (11)), and a base station distance (2606) indicating a distance between the first and second base stations. According to an example illustrated in a row (2611), the first base station 1 (10-1) (base station ID(a) (2602): "B1") is connected to a port "P11," the second base station 2 (10-2) (base station ID(b) (2604): "B2") is connected to a port "P12," and the distance between the first and second base stations is "10 km."

As described above, priority of disconnection setting is controlled in accordance with the speed of the mobile object (50). Accordingly, rapid disconnection setting is achievable for the mobile object (50) moving at a high moving speed.

Fourth Embodiment

According to the present embodiment, the one management server (12) manages a plurality of the regions (110). The fourth embodiment is hereinafter described with reference to FIGS. 27 to 30. Differences from the first embodiment are chiefly described, and points common to the first embodiment are not repeatedly described or only simply described.

Figure 27:
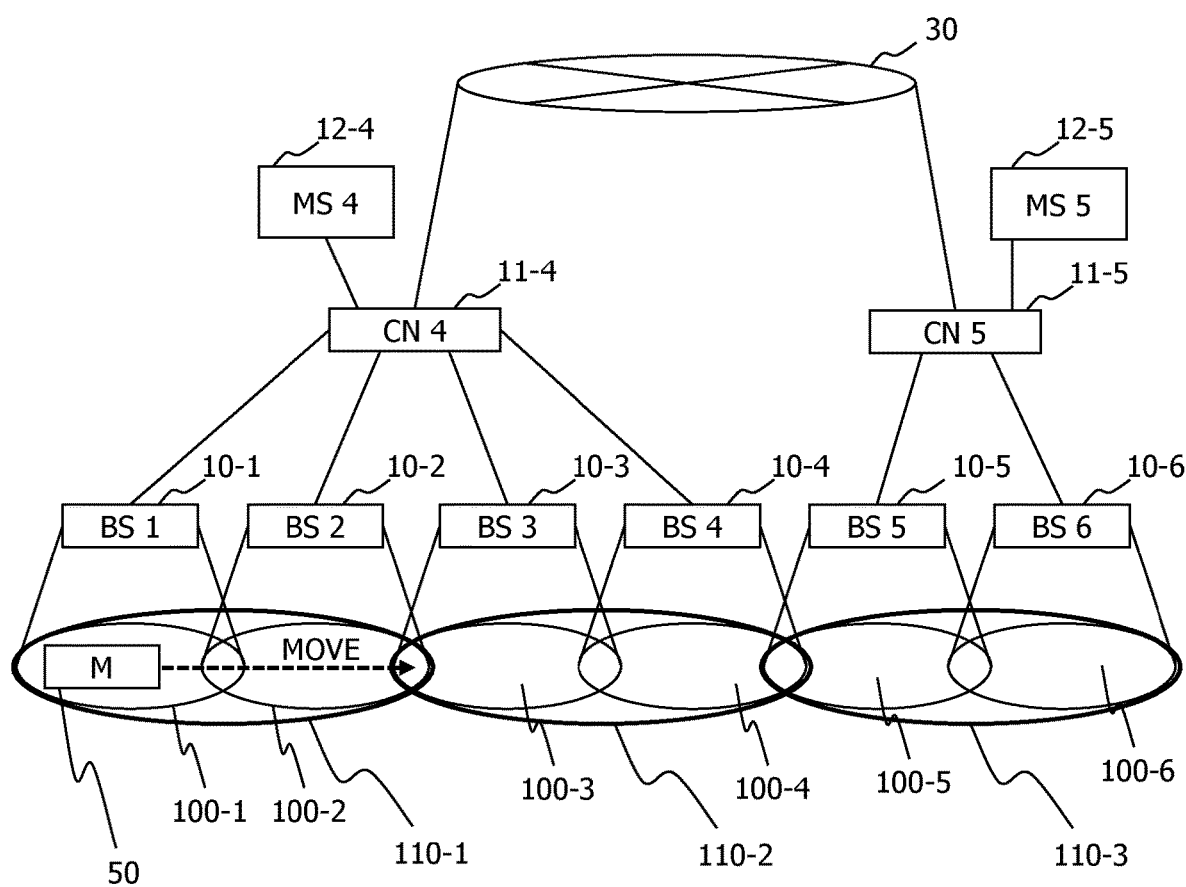
FIG. 27 is an example of a network system configuration diagram according to a fourth embodiment.

FIG. 27 is an example of a network system configuration diagram according to the fourth embodiment.

According to the first embodiment, the one communication node (11) receives data from the one region (110). According to the fourth embodiment, however, the one communication node (11) receives data from a plurality of (e.g., two) the regions (110). More specifically, as illustrated in FIG. 27, for example, a management server 4 (12-4) and a management server 5 (12-5) are present instead of the management servers 1 (12-1) to 3 (12-3), while a communication node 4 (11-4) and a communication node 5 (11-5) are present instead of the communication nodes 1 (11-1) to 3 (11-3). The communication node 4 (11-4) is connected to the base station 1 (10-1) and the base station 2 (10-2) constituting the region 1 (110-1), and is further connected to the base station 3 (10-3) and the base station 4 (10-4) constituting the region 2 (110-2). On the other hand, the communication node 5 (11-5) is connected to the base station 5 (10-5) and the base station 6 (10-6) constituting the region 3 (110-3). The management server 4 (12-4) manages disconnection of the mobile object connected to the region 1 (110-1) and the region 2 (110-2) via the communication node 4 (11-4). The management server 5 (12-5) manages disconnection of the mobile object connected to the region 3 (110-3) via the communication node 5 (11-5).

FIG. 28A is a diagram illustrating an example of region management data 4 (621-4) for the management server 4 (12-4) according to the fourth embodiment. FIG. 28B is a diagram illustrating an example of region management data 5 (621-5) for the management server 5 (12-5) according to the fourth embodiment.

As illustrated in these figures, a configuration of the region management data (621) is identical to the configuration of the region management data (621) illustrated in FIGS. 8A to 8C. However, in case of the present embodiment, as described above, the management server 4 (12-4) covers the plurality of regions 1 (110-1) and 2 (110-2). Accordingly, an ID "R1" of the region 1 (110-1) and an ID "R2" of the region 2 (110-2) are registered in a field of a self-region ID (801) in the region management data 4 (621-4).

FIG. 29A is a diagram illustrating an example of adjacent region management data 4 (622-4) for the management server 4 according to the fourth embodiment. FIG. 29B is a diagram illustrating an example of adjacent region management data 5 (622-5) for the management server 5 according to the fourth embodiment.

As illustrated in these figures, a configuration of the adjacent region management data (622) is identical to the configuration of the adjacent region management data (622) illustrated in FIGS. 9A to 9C. However, in case of the present embodiment, as described above, the management server 4 (12-4) covers the plurality of regions 1 (110-1) and 2 (110-2). Accordingly, the ID "R1" of the region 1 (110-1) and the ID "R2" of the region 2 (110-2) are registered in a field of a self-region ID (901).

FIG. 30A is a diagram illustrating an example of disconnection setting management data 4 (3000-4) for the management server 4 according to the fourth embodiment. FIG. 30B is a diagram illustrating an example of disconnection setting management data 5 (3000-5) for the management server 5 according to the fourth embodiment.

As illustrated in these figures, the disconnection setting management data (3000) includes the respective fields (fields of data (1001) to (1009)) contained in the disconnection setting management data (623) illustrated in FIGS. 10A and 10B, and further includes a field of a currently disconnected region ID (3010) indicating an ID of a region for which disconnection has been currently set.

According to the example illustrated in FIG. 30A, the mobile object (50) transmitting an abnormal flow (disconnection flow) "F1" is currently contained in the region 2 (110-2), while disconnection setting is executed for the region 1 (110-1), region 2 (110-2), and region 3 (110-3).

According to the example illustrated in FIG. 30B, the mobile object (50) transmitting the abnormal flow (disconnection flow) "F1" is currently contained in the region 3 (110-3), while disconnection setting is executed for the region 2 (110-2) and region 3 (110-3). When detecting that the mobile object (50) transmitting the abnormal flow "F1" has connected to the region 3 (110-3) via the region 2 (110-2), the management server 5 (12-5) requests cancellation of disconnection setting for the region 1 (110-1) corresponding to the secondary adjacent region. As a result, the ID "R1" of the region 1 (110-1) has not been currently registered in the currently disconnected region ID (3010).

As described above, the one management server (12) manages the plurality of regions (110). Accordingly, management of an abnormal flow in a wide range is achievable by a small number of the management servers (12) when only a small number of the mobile objects (50) are present in the respective regions (110) and impose not heavy management loads. Furthermore, reduction of the number of the communication nodes (11) is expectable.

Fifth Embodiment

According to the present embodiment, the number of the management servers (12) is changeable with high flexibility in accordance with a flow management load in each of the regions (110). A fifth embodiment is hereinafter described with reference to FIGS. 31 to 40. Differences from the first embodiment are chiefly described, and points common to the first embodiment are not repeatedly described or only simply described.

Figure 31:
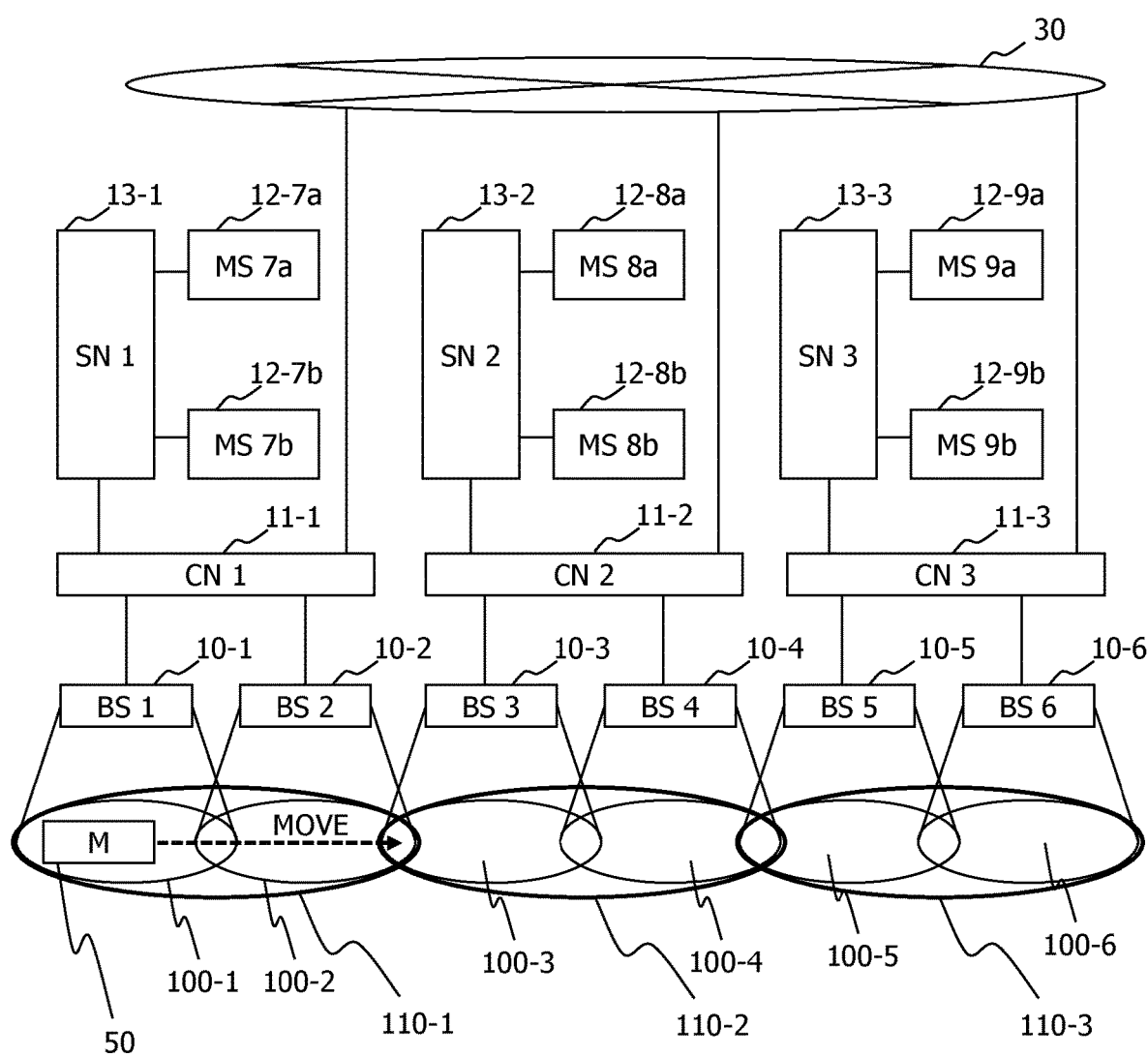
FIG. 31 is an example of a network system configuration diagram according to a fifth embodiment.

FIG. 31 is an example of a network system configuration diagram according to the fifth embodiment. A sorting node is expressed as "SN" in the figure.

According to a network system of the present embodiment, as illustrated in FIG. 31, a management server 7a (12-7a), a management server 7b (12-7b), a management server 8a (12-8a), a management server 8b (12-8b), a management server 9a (12-9a), and a management server 9b (12-9b) are provided instead of the management servers 1

(12-1) to 3 (12-3). Sorting nodes 1 (13-1) to 3 (13-3) are connected to the communication nodes 1 (11-1) to 3 (11-3), respectively. The management servers 7a (12-7a) and 7b (12-7b) covering the region 1 (110-1) are connected to the sorting node 1 (13-1). The management servers 8a (12-8a) and 8b (12-8b) covering the region 2 (110-2) are connected to the sorting node 2 (13-2). The management servers 9a (12-9a) and 9b (12-9b) covering the region 3 (110-3) are connected to the sorting node 3 (13-3). Each of the sorting nodes (13) includes an interface unit, a storage unit, and a processor unit connected to the interface unit and the storage unit. The management server (12) and the communication node (11) are connected to the interface unit.

Based on abnormal flow information contained in received abnormal flow disconnection setting request, disconnection cancellation request, and abnormal flow connection notification, the sorting node (13) transfers the received request and notification to the management server (12) managing a corresponding flow. The management server (12) performs disconnection setting, or disconnection cancellation for the communication node (11) connected to the self-covered region (110) in response to the disconnection setting request, disconnection cancellation request, and abnormal flow connection notification of the received abnormal flow. The management server (12) further checks a configuration of the adjacent region (110), and transmits disconnection setting for disconnecting the abnormal flow to the sorting node (13) connected to the adjacent region (110).

According to the first embodiment, an example of the server unit is constituted by the management server (12). However, in the fifth embodiment, an example of the server unit is constituted by the one or more (typically a plurality of) management servers (12) and the sorting nodes (13).

Figure 32:
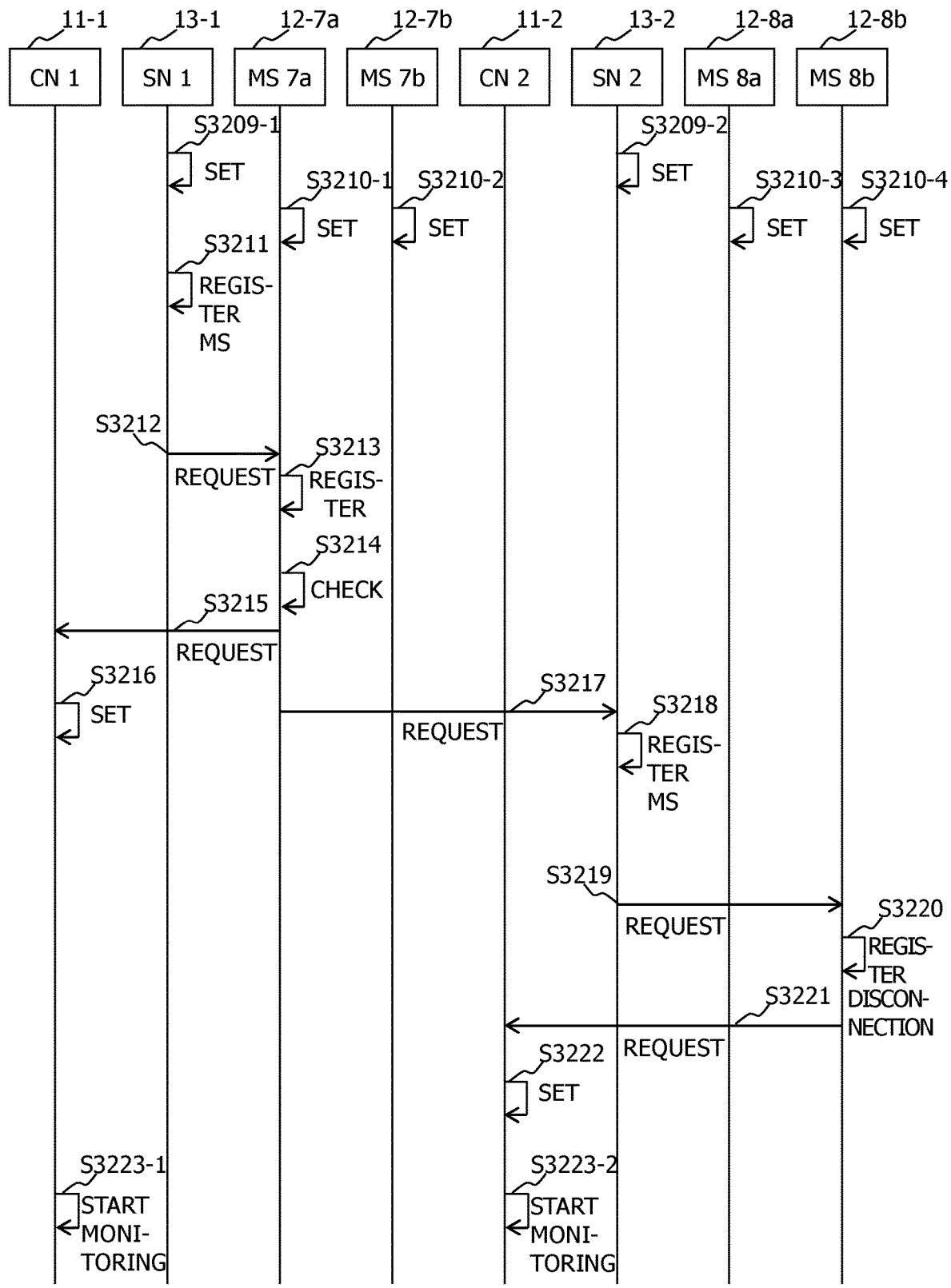
FIG. 32 is an example of an initial setting sequence diagram according to the fifth embodiment.

FIG. 32 is an example of an initial setting sequence diagram according to the fifth embodiment.

The sorting node 1 (13-1) registers transmission destination information concerning all the management servers (12) corresponding to data transfer destinations based on input from the administrator. More specifically, for example, the sorting node 1 (13-1) registers transmission destination IP addresses of the management server 7a (12-7a) and the management server 7b (12-7b) (step S3209-1). The sorting node 2 (13-2) performs similar processing (step S3209-2). The not-shown sorting node 3 (13-3) performs similar processing.

The management server 7a (12-7a) registers, as initial settings, information concerning the self-covered region (110), information concerning the adjacent region (primary adjacent region) (110) disposed adjacently and the region adjacent to the primary adjacent region (110) (secondary adjacent region) (110), and information concerning the sorting node (13) connected to the management server (12) covering the primary adjacent region (110) and the secondary adjacent region (110), based on input from the administrator (step S3210-1). Each of the management servers 7b (12-7b), 8a (12-8a), and 8b (12-8b) performs similar processing (S3210-2 to S3210-4). Each of not-shown management servers 9a (12-9a) and 9b (12-9b) performs similar processing. A relationship between the regions (110) and the base stations (10) included in the regions (110) is defined by input from the administrator of the network system. However, this relationship may be described in a file for setting and read from the file.

The sorting node 1 (13-1) executes setting of an abnormal flow to be disconnected based on input from the administrator (step S3211). More specifically, for example, the sorting node 1 (13-1) registers an abnormal flow ID, and a transmission source IP address of the mobile object (50) transmitting the abnormal flow. According to the present embodiment, the sorting node 1 (13-1) registers the transmission source IP address of the mobile object (50) transmitting the abnormal flow as a characteristic of the abnormal flow. However, instead of or in addition to the transmission source IP address, a different item selected from a transmission destination IP address, a transmission source port number, a transmission destination port number, and a protocol number for data transfer, or a combination of these items may be registered as a characteristic of the abnormal flow. The sorting node 1 (13-1) also selects the one management server (12) managing the registered abnormal flow from a list of all the management servers registered in step S3209 in consideration of balance of processing loads imposed on the respective management servers (12), and registers an IP address of the selected management server (12) as a transmission destination. FIG. 32 illustrates an example of selection and registration of the management server 7a (12-7a).

The sorting node 1 (13-1) transmits a disconnection setting request for disconnecting the registered abnormal flow to the registered management server 7a (12-7a) (step S3212).

The management server 7a (12-7a) executes setting for disconnecting the abnormal flow in response to the disconnection setting request from the sorting node 1 (13-1) (step S3213).

The management server 7a (12-7a) checks a configuration of the region (110), and selects the communication node 1 (11) and the region (110) for which abnormal flow disconnection is requested (step S3214).

The management server 7a (12-7a) transmits a disconnection setting request for disconnecting the abnormal flow to the selected communication node 1 (11-1) (step S3215).

The communication node 1 (11-1) executes setting for disconnecting the abnormal flow in response to the disconnection setting request received from the management server 7a (12-7a) (step S3216).

The management server 7a (12-7a) specifies the sorting node (13) which executes data sorting to the management server (12) covering the region (110) selected in step S3214, and transmits a disconnection setting request for disconnecting the abnormal flow to the specified node (13) (step S3217).

The sorting node 2 (13-2) registers an abnormal flow ID, and a transmission source IP address of the mobile object (50) transmitting the abnormal flow in response to the disconnection setting request received from the management server 7a (12-7a). The sorting node 2 (13-2) further selects and registers a transmission destination IP address of the management server (12) managing the registered abnormal flow (step S3218). FIG. 32 illustrates an example of selection and registration of the management server 8b (12-8b).

The sorting node 1 (13-1) transmits a disconnection setting request for disconnecting the registered abnormal flow to the registered management server 8b (12-8b) (step S3219).

The management server 8b (12-8b) registers setting for disconnecting the abnormal flow in response to the disconnection setting request from the sorting node 2 (13-2) (step S3220).

The management server 8b (12-8b) transmits a disconnection setting request for disconnecting the abnormal flow to the communication node 2 (11-2) connected to the self-covered region (110) (step S3221).

The communication node 2 (11-2) executes setting for disconnecting the abnormal flow in response to the notification about abnormal flow disconnection from the management server 8b (12-8b) (step S3222).

The communication node 1 (11-1) and the communication node 2 (11-2) start monitoring whether or not data has been received from the mobile object transmitting the abnormal flow for which disconnection has been set (step S3223-1 to S3223-2).

Figure 33:
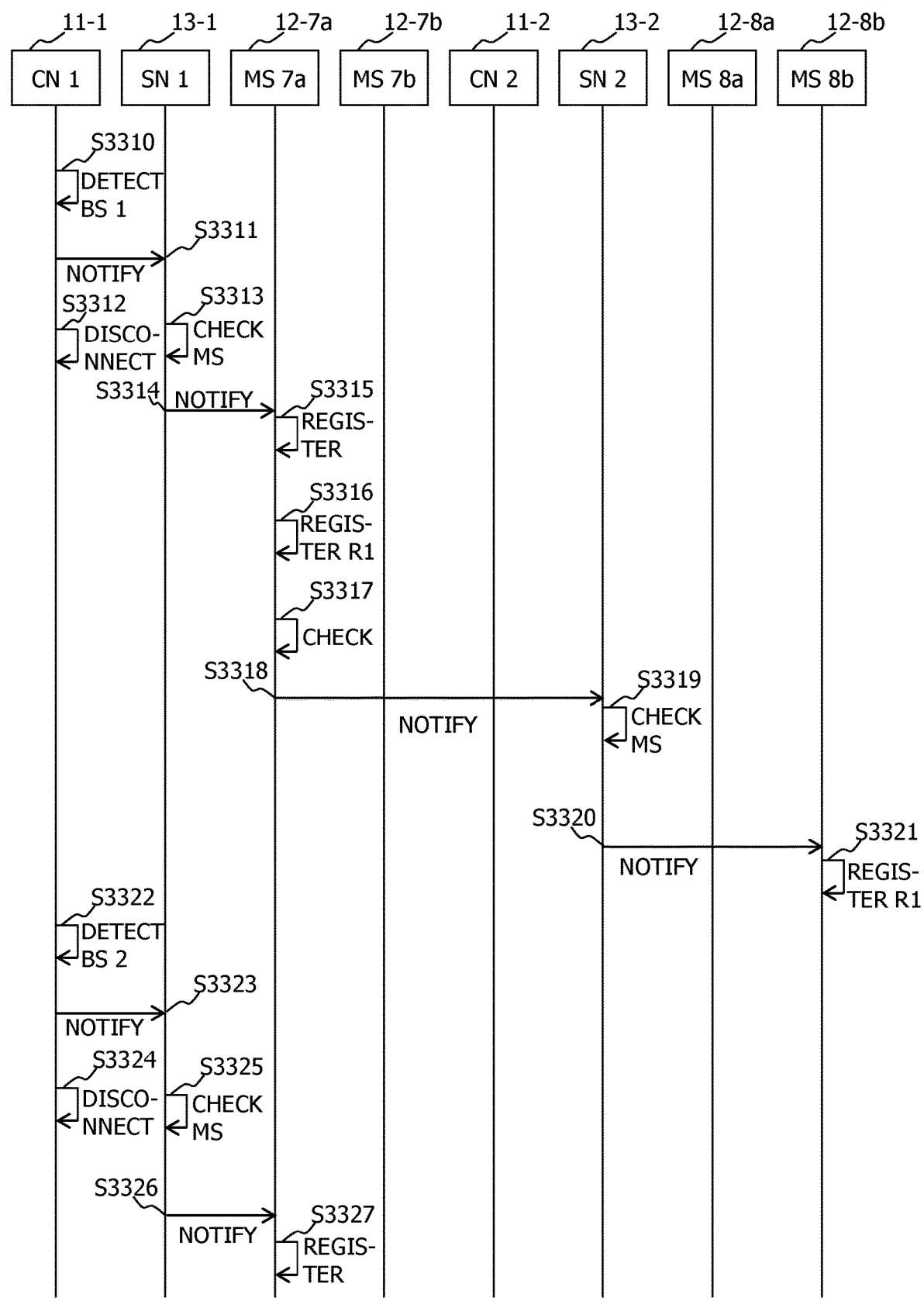
FIG. 33 is an example of abnormal flow disconnection sequence diagram according to the fifth embodiment.

FIG. 33 is an example of abnormal flow disconnection sequence diagram according to the fifth embodiment.

When the mobile object (50) transmitting an abnormal flow wirelessly connects via the base station 1 (10-1) and transmits the abnormal flow, the communication node 1 (11-1) detects connection to the base station 1 (10-1) by the mobile object (50) transmitting the abnormal flow (step S3310).

The communication node 1 (11-1) having detected connection to the base station 1 (10-1) by the mobile object (50) transmitting the abnormal flow transmits, to the sorting node 1 (13-1), a notification which contains connection information indicating connection to the base station 1 (10-1) by the mobile object (50) transmitting the abnormal flow (step S3311).

The communication node 1 (11-1) having transmitted the notification to the sorting node 1 (13-1) executes disconnection of the received abnormal flow (step S3312).

The sorting node 1 (13-1) checks the management server (12) which manages the abnormal flow based on the connection information indicating connection to the base station 1 (10-1) and contained in the notification from the communication node 1 (11-1) (step S3313). More specifically, the management server 7a (12-7a) registered in step S3211 in FIG. 32 is checked.

The sorting node 1 (13-1) transmits, to the management server 7a (12-7a) checked in step S3313, a notification which contains connection information indicating connection to the base station 1 (10-1) by the mobile object (50) and contained in the notification from the communication node 1 (11-1) (step S3314).

The management server 7a (12-7a) registers the connection information indicating connection to the base station 1 (10-1) and contained in the notification from the sorting node 1 (13-1) (step S3315).

The management server 7a (12-7a) registers connection to the region 1 (110-1) based on the connection information indicating connection to the base station 1 (10-1) by the mobile object (50) transmitting the abnormal flow (step S3316).

The management server 7a (12-7a) checks whether or not connection to the region 1 (110-1) by the mobile object (50) transmitting the abnormal flow is first connection. In case of first connection, the management server 7a (12-7a) checks the adjacent region (110) to which a connection notification needs to be transmitted, and further checks the sorting node (13) connected to the management server (12) covering the corresponding adjacent region (110) (step S3317).

When connection to the region 1 (110-1) by the mobile object (50) transmitting the abnormal flow is first connection, the management server 7a (12-7a) transmits, to the sorting node 2 (13-2) checked in step S3317, a notification containing region connection information indicating connection to the region 1 (110-1) by the mobile object (50) (step S3318).

The sorting node 2 (13-2) checks the management server (12) which manages the abnormal flow based on the region connection information contained in the notification from the management server 7a (12-7a) (step S3319). More specifically, the management server 8b (12-8b) registered in step S3218 in FIG. 32 is checked.

The sorting node 2 (13-2) transmits, to the management server 8b (12-8b) checked in step S3319, a notification containing the region connection information received from the management server 7a (12-7a) and indicating connection to the region 1 (110-1) by the mobile object (50) transmitting the abnormal flow (step S3320).

The management server 8b (12-8b) registers the region connection information contained in the notification from the sorting node 2 (13-2) (step S3321).

When the mobile object (50) transmitting the abnormal flow wirelessly connects via the base station 2 (10-2) and transmits the abnormal flow, the communication node 1 (11-1) detects connection to the base station 2 (10-2) by the mobile object (50) transmitting the abnormal flow (step S3322).

The communication node 1 (11-1) having detected connection to the base station 2 (10-2) by the mobile object (50) transmitting the abnormal flow transmits, to the sorting node 1 (13-1), a notification which contains connection information indicating connection to the base station 2 (10-2) by the mobile object (50) transmitting the abnormal flow (step S3323).

The communication node 1 (11-1) having transmitted the notification to the sorting node 1 (13-1) executes disconnection of the received abnormal flow (step S3324).

The sorting node 1 (13-1) checks the management server (12) which manages the abnormal flow based on the connection information indicating connection to the base station 2 (10-2) and contained in the notification from the communication node 1 (11-1) (step S3325). More specifically, the management server 7a (12-7a) registered in step S3211 in FIG. 32 is checked.

The sorting node 1 (13-1) transmits, to the management server 7a (12-7a) checked in step S3325, a notification which contains the connection information indicating connection to the base station 2 (10-2) contained in the notification from the communication node 1 (11-1) (step S3326).

The management server 7a (12-7a) registers the connection information indicating connection to the base station 2 (10-2) contained in the notification from the sorting node 1 (13-1) (step S3327).

Figure 34:
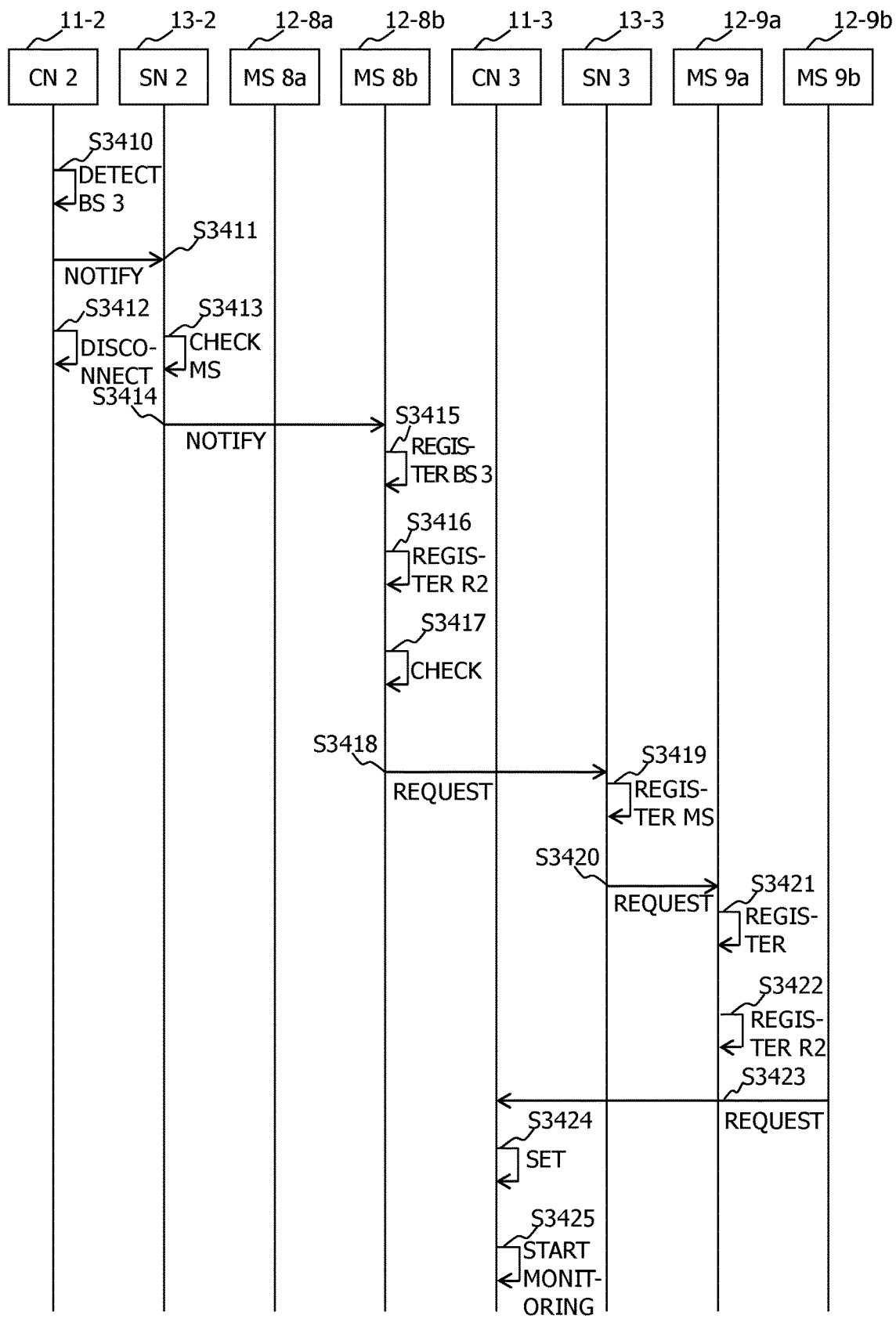
FIG. 34 is an example of a region movement control sequence diagram according to the fifth embodiment.

FIG. 34 is an example of a region movement control sequence diagram according to the fifth embodiment.

When the mobile object (50) transmitting an abnormal flow wirelessly connects via the base station 3 (10-3) and transmits the abnormal flow, the communication node 2 (11-2) detects connection to the base station 3 (10-3) by the mobile object (50) transmitting the abnormal flow (step S3410).

The communication node 2 (11-2) having detected connection to the base station 3 (10-3) by the mobile object transmitting the abnormal flow transmits, to the sorting node 2 (13-2), a notification which contains connection information indicating connection to the base station 3 (10-3) by the mobile object transmitting the abnormal flow (step S3411).

The communication node 2 (11-2) having transmitted the notification to the sorting node 2 (13-2) executes disconnection of the received abnormal flow (step S3412).

The sorting node 2 (13-2) checks the management server (12) which manages the abnormal flow based on the connection information indicating connection to the base station 3 (10-3) and contained in the notification from the communication node 2 (11-2) (step S3413). More specifically, the management server 8*b* (12-8*b*) registered in step S3218 in FIG. 32 is checked.

The sorting node 2 (13-2) issues, to the management server 8*b* (12-8*b*) checked in step S3413, a notification which contains the connection information indicating connection to the base station 3 (10-3) contained in the notification from the communication node 2 (11-2) (step S3414).

The management server 8*b* (12-8*b*) registers the connection information indicating connection to the base station 3 (10-3) and contained in the notification from the sorting node 2 (13-2) (step S3415).

The management server 8*b* (12-8*b*) registers connection to the region 2 (110-2) based on the connection information indicating connection to the base station 3 (10-3) by the mobile object (50) transmitting the abnormal flow (step S3416).

The management server 8*b* (12-8*b*) checks whether or not connection to the region 2 (110-2) by the mobile object (50) transmitting the abnormal flow is first connection. In case of first connection, the management server 8*b* (12-8*b*) checks the adjacent region (110) to which a connection notification needs to be transmitted, and further checks the sorting node (13) connected to the management server (12) covering the corresponding adjacent region (110) (step S3417).

When connection to the region 2 (110-2) by the mobile object (50) transmitting the abnormal flow is first connection, the management server 8*b* (12-8*b*) transmits, to the sorting node 3 (13-3) checked in step S3417, a disconnection setting request containing information indicating connection to the region 2 (110-2) by the mobile object (50) (step S3418).

The sorting node 3 (13-3) registers an abnormal flow ID, and a transmission source IP address of the mobile object (50) transmitting the abnormal flow in response to the disconnection setting request received from the management server 8*b* (12-8*b*). The sorting node 3 (13-3) also selects the one management server (12) managing the registered abnormal flow from a list of all the management servers registered in an initial setting stage in consideration of balance of processing loads imposed on the respective management servers (12), and registers an IP address of the selected management server (12) as a transmission destination (step S3419). FIG. 34 illustrates an example of selection and registration of the management server 9*a* (12-9*a*).

The sorting node 3 (13-3) transmits, to the management server 9*a* (12-9*a*) registered in step S3419, a disconnection setting request which contains information indicating connection to the region 2 (110-2) by the mobile object (50) (step S3420).

The management server 9*a* (12-9*a*) registers setting for disconnecting the abnormal flow in response to the disconnection setting request from the sorting node 3 (13-3) (step S3421).

The management server 9*a* (12-9*a*) registers connection to the region 2 (110-2) by the mobile object (50) transmitting the abnormal flow (step S3422).

The management server 9*a* (12-9*a*) transmits a disconnection setting request for disconnecting the abnormal flow to the communication node 3 (11-3) connected to the self-covered region 3 (110-3) (step S3423).

The communication node 3 (11-3) executes setting for disconnecting the abnormal flow in response to the disconnection setting request received from the management server 9*a* (12-9*a*) (step S3424).

The communication node 3 (11-3) starts monitoring whether or not data has been received from the mobile object (50) transmitting the abnormal flow for which disconnection has been set (step S3425).

Figure 35:
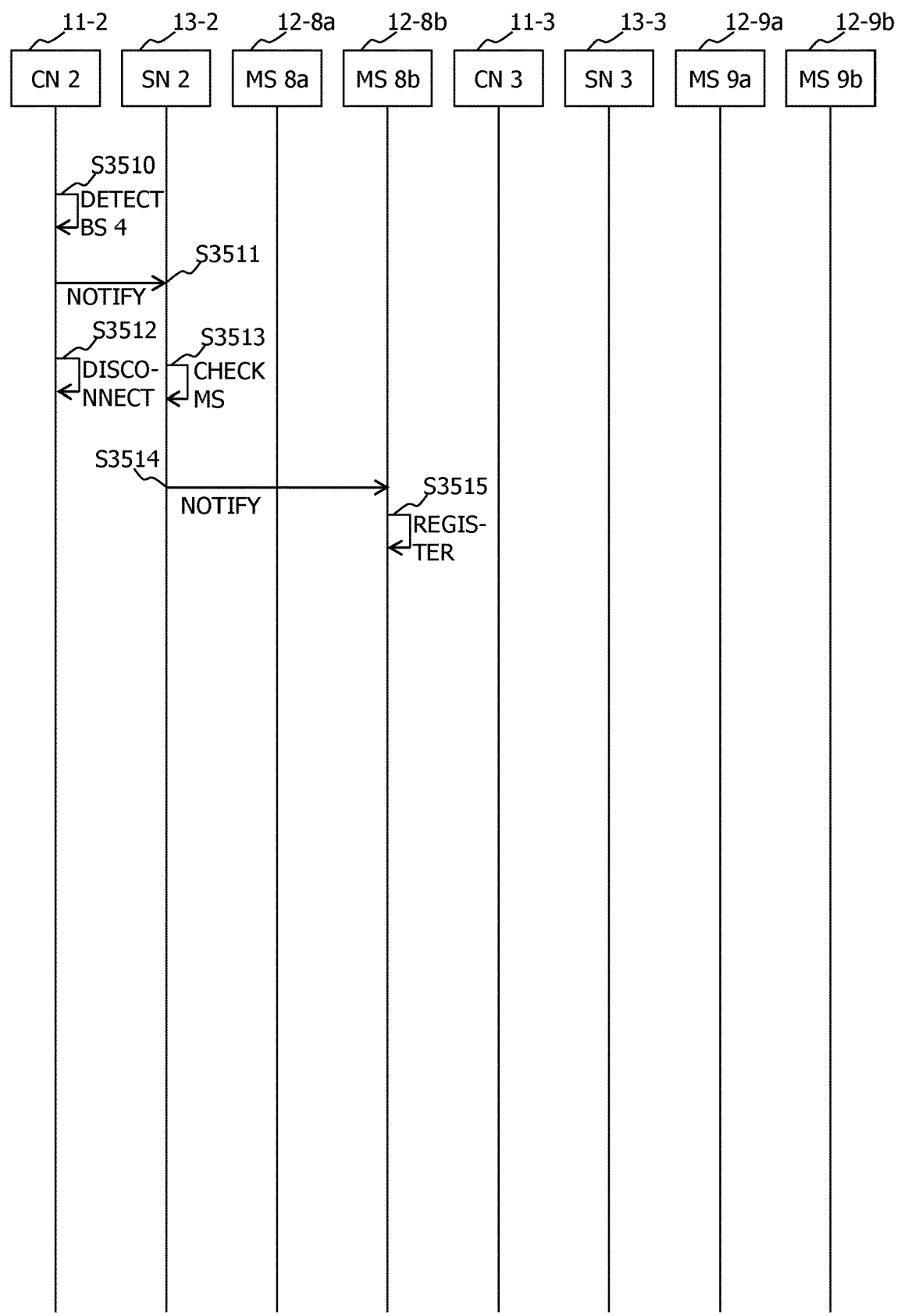
FIG. 35 is an example of a base station movement control sequence diagram according to the fifth embodiment.

FIG. 35 is an example of a base station movement control sequence diagram according to the fifth embodiment.

When the mobile object (50) transmitting an abnormal flow wirelessly connects via the base station 4 (10-4) and transmits the abnormal flow, the communication node 2 (11-2) detects connection to the base station 4 (10-4) by the mobile object (50) transmitting the abnormal flow (step S3510).

The communication node 2 (11-2) having detected connection to the base station 4 (10-4) by the mobile object (50) transmitting the abnormal flow transmits, to the sorting node 2 (13-2), a notification which contains connection information indicating connection to the base station 4 (10-4) by the mobile object (50) transmitting the abnormal flow (step S3511).

The communication node 2 (11-2) having transmitted the notification to the sorting node 2 (13-2) executes disconnection of the received abnormal flow (step S3512).

The sorting node 2 (13-2) checks the management server (12) managing the abnormal flow based on the connection information indicating connection to the base station 4 (10-4) and contained in the notification from the communication node 2 (11-2) (step S3513). More specifically, the management server 8*b* (12-8*b*) registered in step S3218 in FIG. 32 is checked.

The sorting node 2 (13-2) transmits, to the management server 8*b* (12-8*b*) checked in step S3513, a notification which contains the connection information indicating connection to the base station 4 (10-4) and contained in the notification from the communication node 2 (11-2) (step S3514).

The management server 8*b* (12-8*b*) registers the connection information indicating connection to the base station 4 (10-4) and contained in the notification from the sorting node 2 (13-2) (step S3515).

Figure 36:
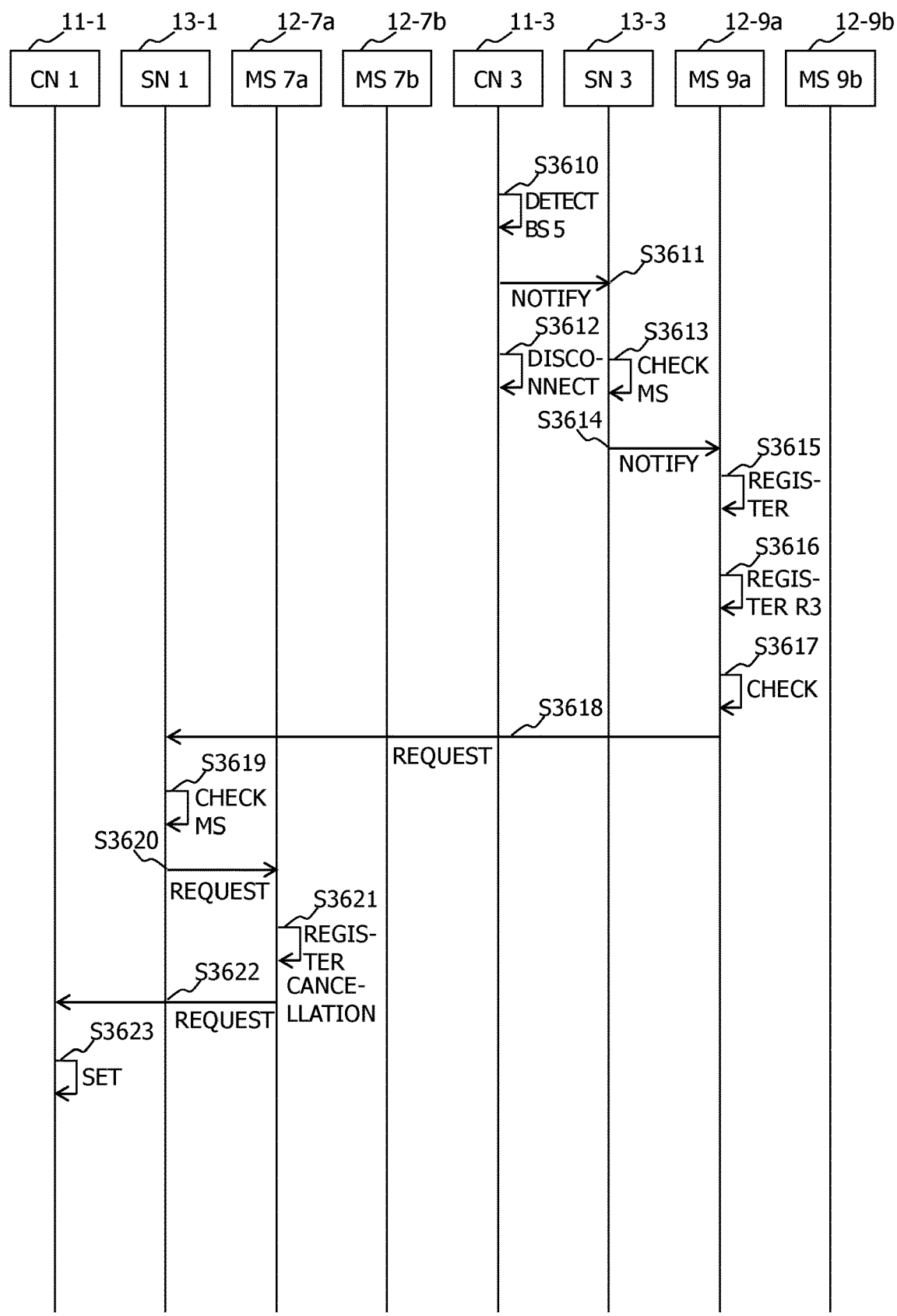
FIG. 36 is an example of a region movement control sequence diagram according to the fifth embodiment.

FIG. 36 is an example of a region movement control sequence diagram according to the fifth embodiment.

When the mobile object (50) transmitting an abnormal flow wirelessly connects via the base station 5 (10-5) and transmits the abnormal flow, the communication node 3 (11-3) detects connection to the base station 5 (10-5) by the mobile object (50) transmitting the abnormal flow (step S3610).

The communication node 3 (11-3) having detected connection to the base station 5 (10-5) by the mobile object (50) transmitting the abnormal flow transmits, to the sorting node 3 (13-3), a notification which contains connection information indicating connection to the base station 5 (10-5) by the mobile object (50) transmitting the abnormal flow (step S3611).

The communication node 3 (11-3) having transmitted the notification to the sorting node 3 (13-3) executes disconnection of the received abnormal flow (step S3612).

The sorting node 3 (13-3) checks the management server (12) managing the abnormal flow based on the connection information indicating connection to the base station 5 (10-5) by the mobile object (50) and contained in the notification from the communication node 3 (11-3) (step S3613). More specifically, the management server 9*a* (12-9*a*) registered in step S3419 in FIG. 34 is checked.

The sorting node 3 (13-3) transmits, to the management server 9*a* (12-9*a*) checked in step S3613, a notification which contains the connection information indicating connection to the base station 5 (10-5) contained in the notification from the communication node 3 (11-3) (step S3614).

The management server 9a (12-9a) registers the connection information indicating connection to the base station 5 (10-5) and contained in the notification from the sorting node 3 (13-3) (step S3615).

The management server 9a (12-9a) registers connection to the region 3 (110-3) based on the connection information indicating connection to the base station 5 (10-5) by the mobile object (50) transmitting the abnormal flow (step S3616).

The management server 9a (12-9a) checks whether or not connection to the region 3 (110-3) by the mobile object (50) transmitting the abnormal flow is first connection. In case of first connection, the management server 9a (12-9a) checks the adjacent region (110) to which a connection notification needs to be transmitted, and further checks the sorting node (13) connected to the management server (12) covering the corresponding adjacent region (110) (step S3617).

When connection to the region 3 (110-3) by the mobile object (50) transmitting the abnormal flow is first connection, the management server 9a (12-9a) transmits, to the sorting node 1 (13-1) checked in step S3617, a disconnection cancellation request for cancelling disconnection of the abnormal flow (step S3618).

The sorting node 1 (13-1) cancels registration of the abnormal flow ID, and the transmission source IP address of the mobile object (50) transmitting the abnormal flow in response to the disconnection cancellation request received from the management server 9a (12-9a), and also checks the management server (12) which manages the registered abnormal flow (step S3619). More specifically, the management server 7a (12-7a) is checked.

The sorting node 1 (13-1) transmits a disconnection cancellation request for cancelling disconnection of the abnormal flow to the management server 7a (12-7a) checked in step S3619 (step S3620).

The management server 7a (12-7a) cancels setting for disconnecting the abnormal flow in response to the disconnection cancellation request from the sorting node 1 (13-1) (step S3621).

The management server 7a (12-7a) transmits a disconnection cancellation request for cancelling disconnection of the abnormal flow to the communication node 1 (11-1) connected to the self-covered region 1 (110-1) (step S3622).

The communication node 1 (11-1) cancels setting for disconnecting the abnormal flow in response to the disconnection cancellation request received from the management server 7a (12-7a) (step S3623).

Figure 37:
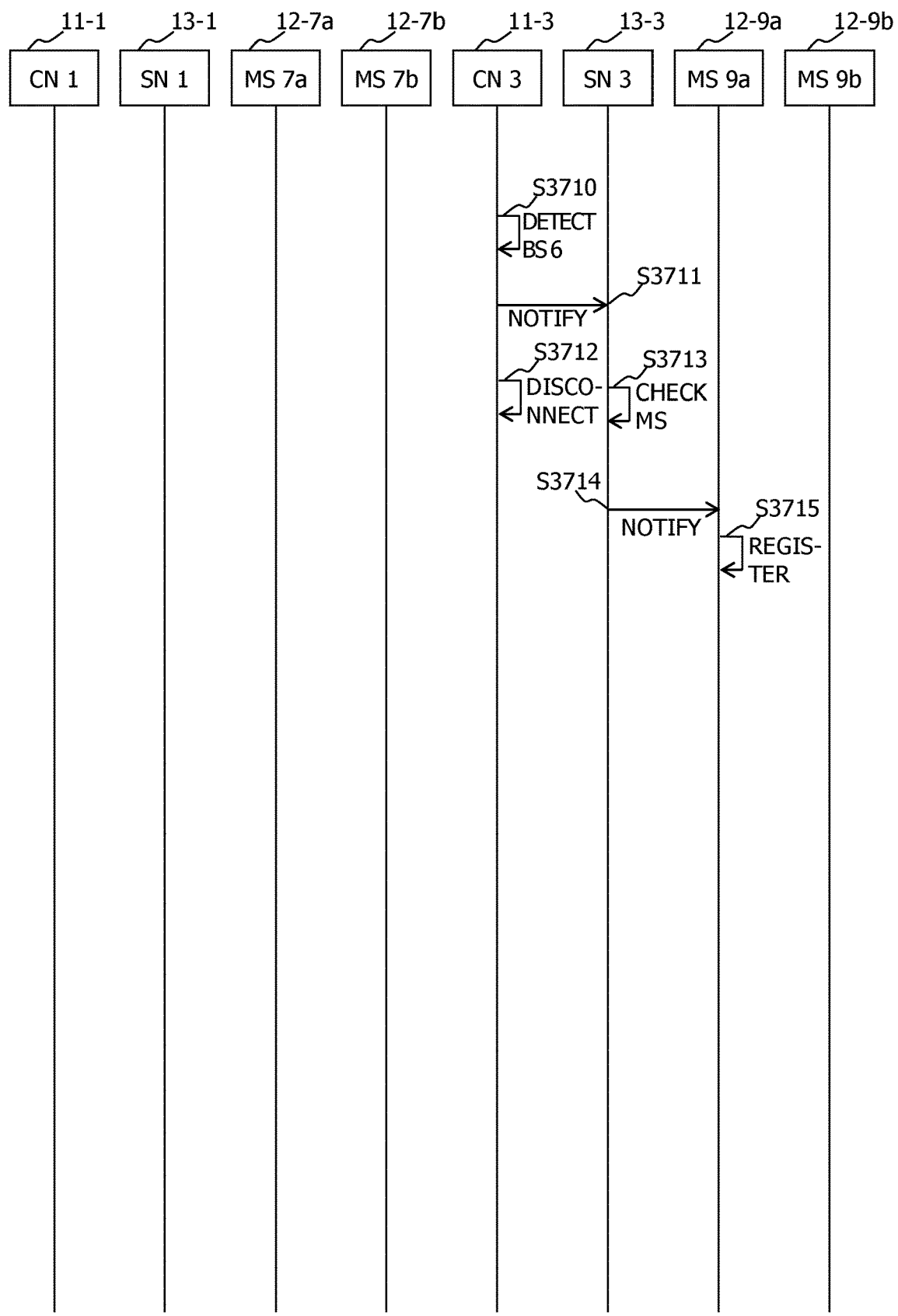
FIG. 37 is an example of a region movement control sequence diagram according to the fifth embodiment.

FIG. 37 is an example of a region movement control sequence diagram according to the fifth embodiment.

When the mobile object (50) transmitting an abnormal flow wirelessly connects via the base station 6 (10-6) and transmits the abnormal flow, the communication node 3 (11-3) detects connection to the base station 6 (10-6) by the mobile object (50) transmitting the abnormal flow (step S3710).

The communication node 3 (11-3) having detected connection to the base station 6 (10-6) by the mobile object (50) transmitting the abnormal flow transmits, to the sorting node 3 (13-3), a notification which contains connection information indicating connection to the base station 6 (10-6) by the mobile object (50) transmitting the abnormal flow (step S3711).

The communication node 3 (11-3) having transmitted the notification to the sorting node 3 (13-3) executes disconnection of the received abnormal flow (step S3712).

The sorting node 3 (13-3) checks the management server (12) managing the abnormal flow based on the connection information indicating connection to the base station 6 (10-6) and contained in the notification from the communication node 3 (11-3) (step S3713). More specifically, the management server 9a (12-9a) registered in step S3419 in FIG. 34 is checked.

The sorting node 3 (13-3) transmits, to the management server 9a (12-9a) checked in step S3713, a notification which contains the connection information indicating connection to the base station 6 (10-6) contained in the notification from the communication node 3 (11-3) (step S3714).

The management server 9a (12-9a) registers the connection information indicating connection to the base station 6 (10-6) and contained in the notification from the sorting node 3 (13-3) (step S3715).

Figure 38A:
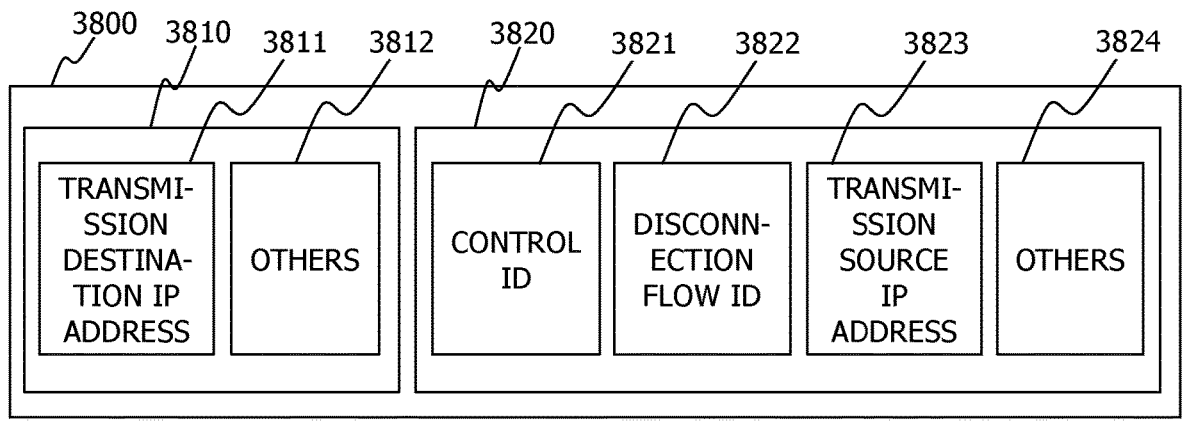
FIG. 38A is a diagram illustrating an example of a setting/cancellation request data format of data for notification about disconnection setting or setting cancellation of abnormal flow according to the fifth embodiment.
Figure 38B:
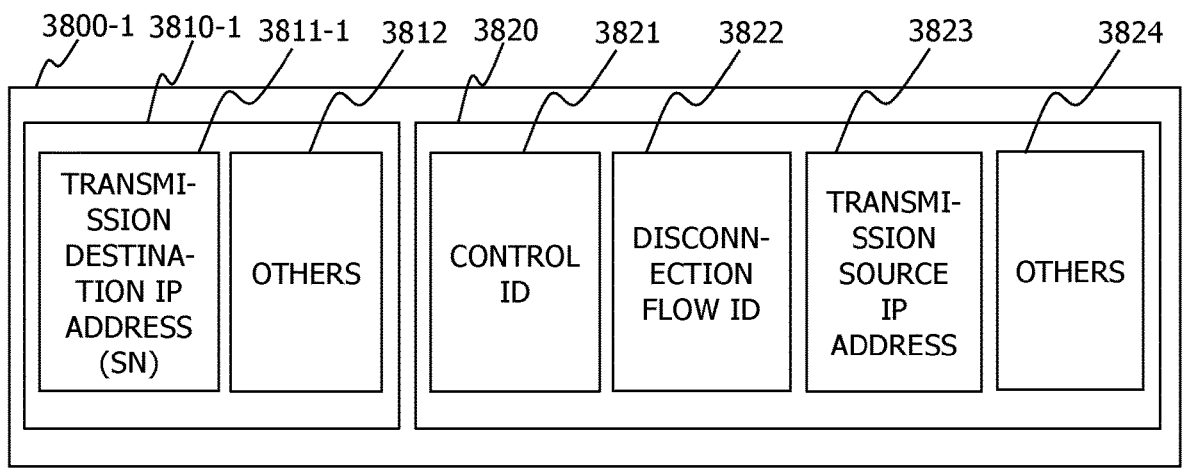
FIG. 38B is a diagram illustrating an example of a data format of setting/cancellation request data from a management server to a sorting node according to the fifth embodiment.
Figure 38C:
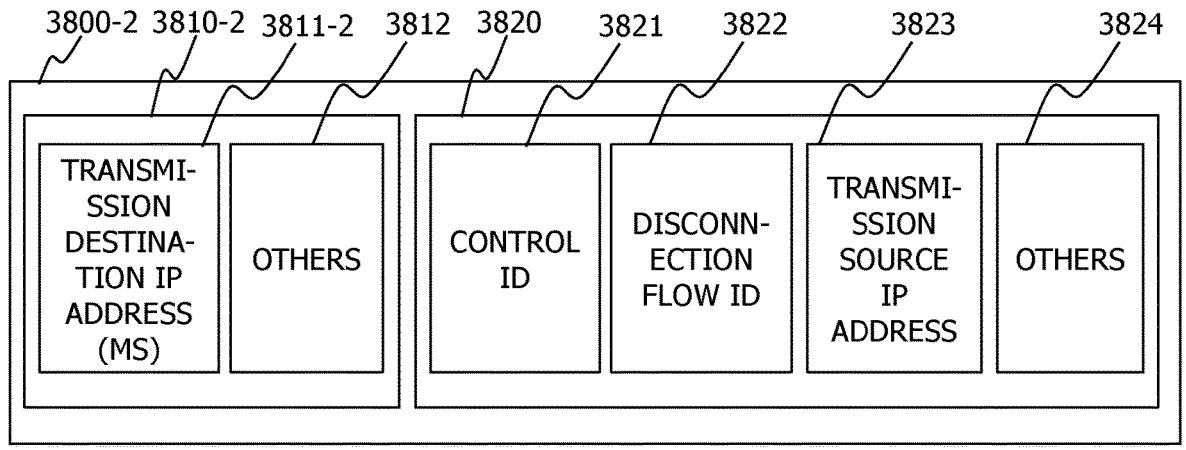
FIG. 38C is a diagram illustrating an example of a data format of setting/cancellation request data from the sorting node to the management server according to the fifth embodiment.

FIG. 38A is a diagram illustrating an example of a setting/cancellation request data format of data for notification about disconnection setting and setting cancellation of an abnormal flow according to the fifth embodiment. FIG. 38B is a diagram illustrating an example of a data format of setting/cancellation request data from the management server (12) to the sorting node (13) according to the fifth embodiment. FIG. 38C is a diagram illustrating an example of a data format of setting/cancellation request data from the sorting node (13) to the management server (12) according to the fifth embodiment.

The setting/cancellation request data (hereinafter referred to as internet protocol (IP) packet) (3800) illustrated in FIG. 38A is an example of a packet, and is constituted by an IP header (3810) and an IP payload (3820). A configuration of the IP packet (3800) is applicable to both the disconnection setting request (e.g., particularly disconnection setting request transmitted to sorting node (13) in step S3217), and the disconnection cancellation request (e.g., particularly disconnection cancellation request transmitted to sorting node (13) in step S3168). The IP header (3810) of this data is an example of a header, and is constituted by a transmission destination IP address (3811) and other IP header data (3812). The IP payload (3820) is an example of a payload, and is constituted by a control ID (3821) for identifying processing for abnormal flow, a disconnection flow (abnormal flow) ID (3022), a transmission source IP address (3823) of the mobile object (50) transmitting abnormal flow, and other IP payload data (3824) such as transmission control protocol (TCP) header. The control ID (3821) indicates a value "1" in case of request for disconnection setting for an abnormal flow, and a value "2" in case of cancellation of disconnection. The disconnection flow ID (3822) has a numerical value for identifying a disconnection flow.

The IP packet (3800-1) illustrated in FIG. 38B is transmitted from the management server (12) to the sorting node (13), wherefore the transmission destination IP address (3811-1) of the IP header (3810) indicates an IP address of the sorting node (13). The sorting node (13) having received the IP packet (3800-1) checks the transmission source IP address (3823) associated with the abnormal flow in the IP payload (3820), changes the transmission destination IP address of the IP packet (3800-1) to the IP address of the management server (12) managing the abnormal flow, and transmits the IP packet (3800-1) to the management server (12) managing the abnormal flow.

The IP packet (3800-2) illustrated in FIG. 38C is transmitted from the sorting node (13) to the management server (12), wherefore the transmission destination IP address (3811-2) of the IP header (3810) indicates the IP address of the management server (12). The management server (12)

having received the IP packet (3800-2) executes, for the communication node (11) connected to the self-covered region (110), disconnection setting or disconnection cancellation of the abnormal flow designated by the disconnection flow ID (3822) and the transmission source IP address (3823) indicating the abnormal flow in accordance with processing designated by the control ID (3821) (disconnection setting or disconnection cancellation). When issuing a notification about the abnormal flow to the different region (110), the management server (12) transmits the IP packet (3800-1) illustrated in FIG. 38B to the sorting node (13) connected to the different region (110).

According to the present embodiment, the sorting node (13) executes data sorting to the management server (12) concerning disconnection setting or cancellation of an abnormal flow. However, the function of the sorting node (13) may be performed by the communication node (11). In case of the communication node (11) functioning as the sorting node (13), the sorting node (13) may be eliminated.

Figure 39:
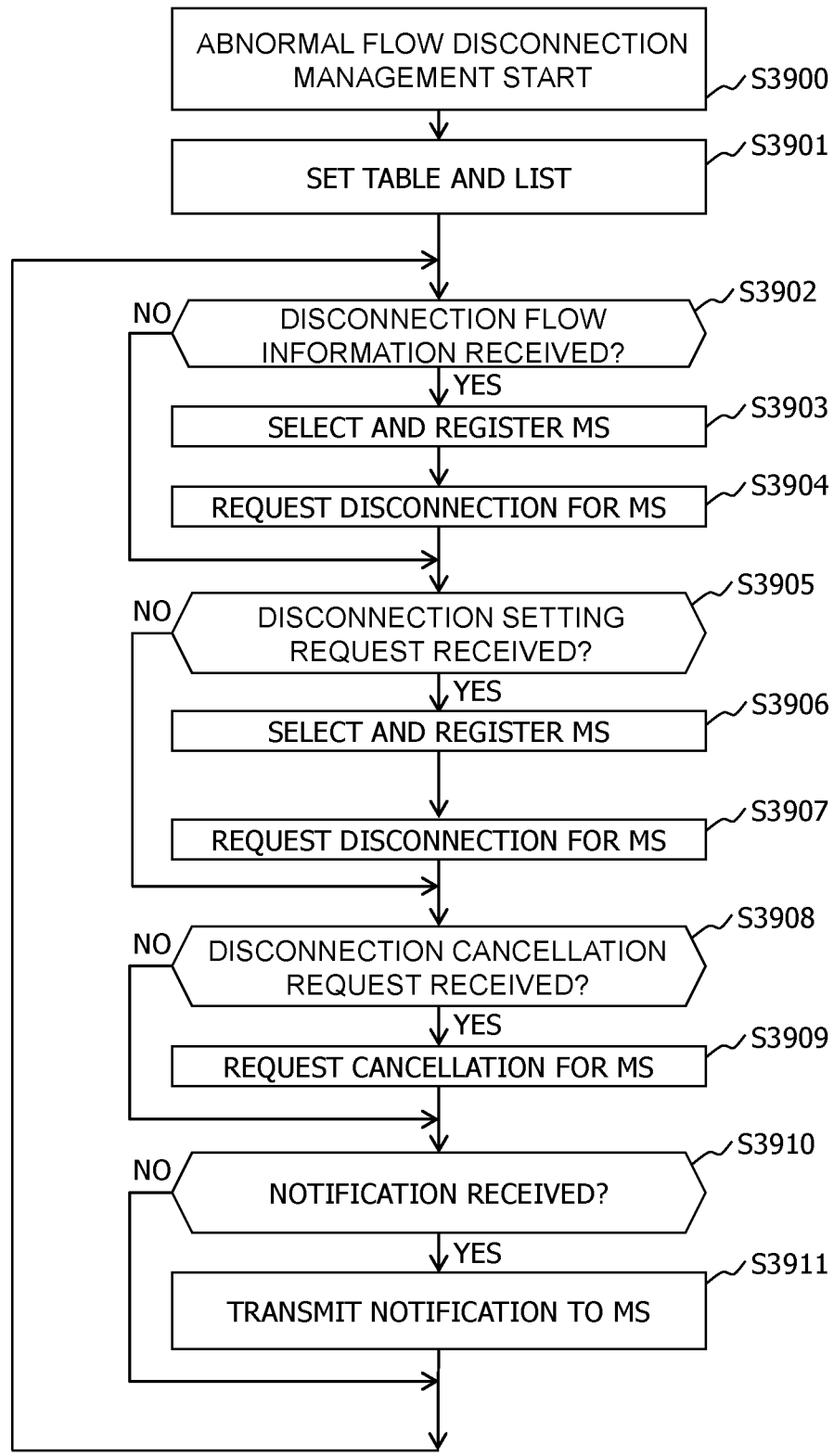
FIG. 39 is an example of a flowchart showing abnormal flow disconnection management by the sorting node according to the fifth embodiment.

FIG. 39 is an example of a flowchart showing abnormal flow disconnection management performed by the sorting node (13) according to the fifth embodiment.

For example, the abnormal flow disconnection management performed by the sorting node (13) causes a not-shown processor to execute an abnormal flow disconnection management program stored in a not-shown storage device to start the abnormal flow disconnection management (step S3900). A first process corresponding to processing in step S3902 and step S3904, a second process corresponding to processing in step S3905 and step S3907, a third process corresponding to processing in step S3908 and S3909, and a fourth process corresponding to processing in step S3910 and S3911 may be sequentially executed as illustrated in FIG. 39, or may be executed in parallel.

The sorting node (13) receives a data transfer table and a management server list of the connected management servers (12) set by the administrator of the sorting node (13), and retain the table and list to transfer data to the different sorting node (13) or the like (step S3901).

The sorting node (13) determines whether or not abnormal flow information (disconnection flow information) has been received from the administrator (step S3902).

When determining in step S3902 that abnormal flow information has been received from the administrator, the sorting node (13) selects the one management server (12) managing the registered abnormal flow from a list registering the management servers (12) in consideration of balance of processing loads imposed on the respective management servers (12) based on the received abnormal flow information, and registers a transmission destination IP address for disconnecting the selected management server (12), and disconnection setting for disconnecting the abnormal flow (step S3903). It is assumed herein that the management server 7a (12-7a) has been selected.

The sorting node (13) transmits a disconnection setting request for disconnecting the abnormal flow to the registered management server 7a (12-7a) (step S3904).

When determining in step S3902 that the abnormal flow information has not been received from the administrator, the sorting node (13) executes processing in step S3905.

The sorting node (13) determines whether or not a disconnection setting request for disconnecting the abnormal flow has been received from the management server (12) (step S3905).

When determining in step S3905 that a disconnection setting request for disconnecting the abnormal flow has been received from the management server (12), the sorting node (13) selects the one management server (12) managing the registered abnormal flow from a list of the management servers (12) based on the received disconnection setting request in consideration of balance of processing loads imposed on the respective management servers (12), and registers a transmission destination IP address of the selected management server (12), and disconnection setting for the abnormal flow (step S3906).

The sorting node (13) transmits a disconnection setting request for disconnecting the abnormal flow to the registered management server (12) (step S3907).

When determining in step S3905 that a disconnection setting request for disconnecting the abnormal flow has not been received from the management server (12), the sorting node (13) executes processing in step S3908.

The sorting node (13) determines whether or not a disconnection cancellation request for cancelling disconnection of the abnormal flow has been received from the management server (12) (step S3908).

When determining in step S3908 that a disconnection cancellation request for cancelling disconnection of the abnormal flow has been received from the management server (12), the sorting node (13) transmits a disconnection cancellation request for cancelling disconnection of the abnormal flow to the management server (12) covering the corresponding abnormal flow (step S3909).

When determining in step S3908 that a disconnection cancellation request for cancelling disconnection of the abnormal flow has not been received from the management server (12), the sorting node (13) executes processing in step S3910.

The sorting node (13) determines whether or not a notification containing connection information indicating connection by the mobile object (50) transmitting the abnormal flow has been received from the communication node (11) (step S3910).

When determining in step S3910 that a notification which contains connection information indicating connection by the mobile object (50) transmitting abnormal flow has been received, the sorting node (13) transmits, to the management server (12) covering the abnormal flow, a notification containing the connection information indicating connection by the mobile object (50) transmitting the abnormal flow (step S3911).

When determining in step S3910 that a notification which contains the connection information indicating connection by the mobile object (50) transmitting the abnormal flow has not been received, the processing in step S3902 is executed.

Figure 40:
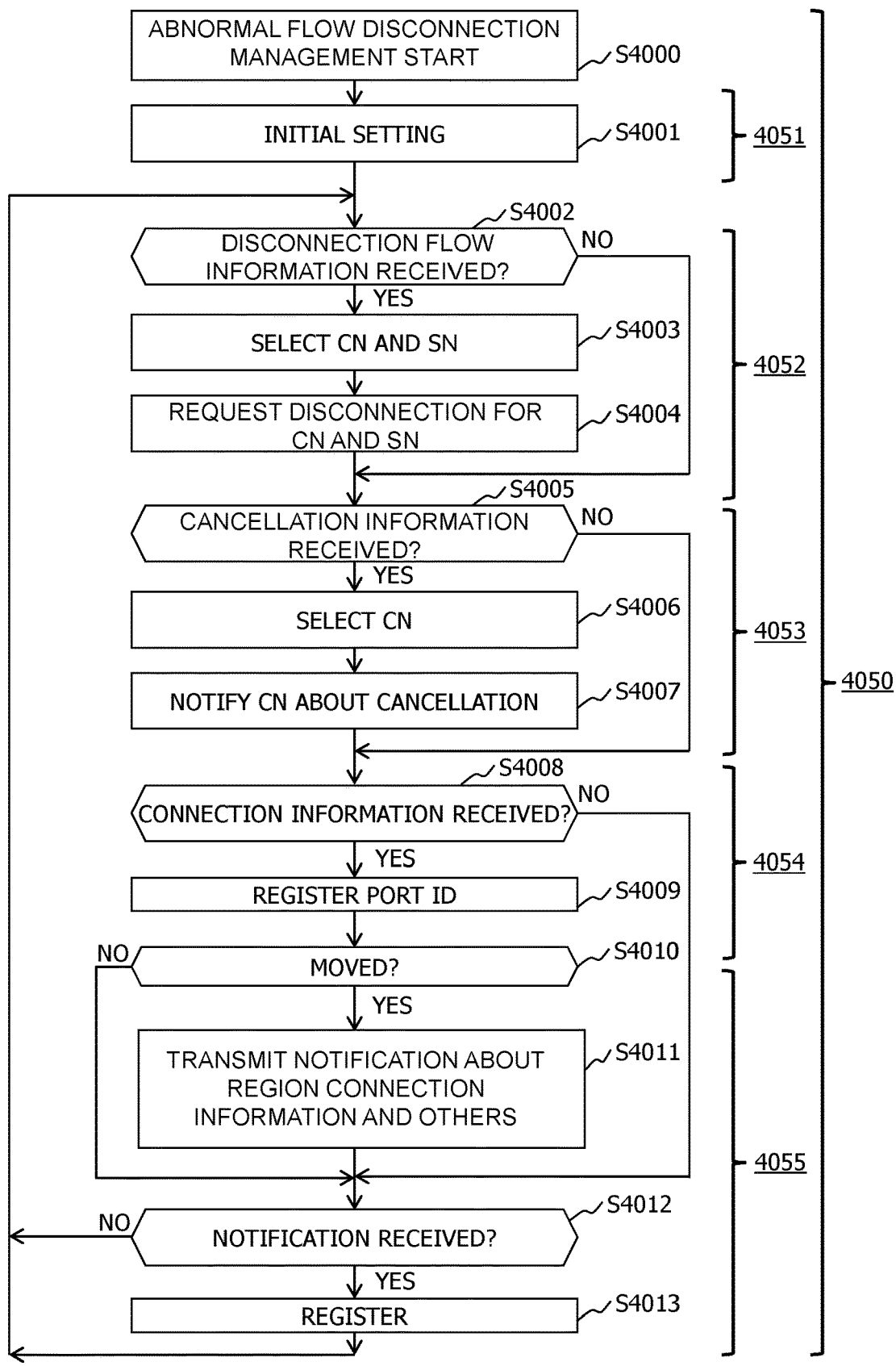
FIG. 40 is an example of a flowchart showing abnormal flow disconnection management by the management server according to the fifth embodiment.

FIG. 40 is an example of a flowchart showing abnormal flow disconnection management performed by the management server (12) according to the fifth embodiment.

The CPU (601) of the management server (12) loads an abnormal flow disconnection management program (4050) stored in the storage (603) into the main memory (602), and starts abnormal flow disconnection management (step S4000). According to the present embodiment, therefore, the abnormal flow disconnection management program (4050) is executed instead of the abnormal flow disconnection management program (611). The abnormal flow disconnection management program (4050) includes an initial setting program (4051) which executes a first process corresponding to processing in step S4001, a disconnection control program (4052) which executes a second process corresponding to processing in step S4002 to step S4004, a cancellation control program (4053) which executes a third process corresponding to processing in step S4005 to step S4007, a connection information processing program (4054)

which executes a fourth process corresponding to processing in step S4008 to step S4011, and a region processing program (4055) which executes a fifth process corresponding to processing in step S4012 and step S4013. Two or more of the first through fifth processes may be sequentially executed as illustrated in FIG. 40, or may be executed in parallel as described above.

The initial setting program (4051) registers, as initial settings, data concerning the self-covered region (110), the region adjacent to the covered region (110) (primary adjacent region) (110), and the region adjacent to the primary adjacent region (110) (secondary adjacent region) (110), and data concerning the sorting node (13) connected to the management server (12) managing the primary adjacent region (110) and the secondary adjacent region (110), based on input from the administrator (step S4001).

The disconnection control program (4052) determines whether or not a request for disconnecting the abnormal flow has been received from the sorting node (13) (step S4002).

When determining in step S4002 that a disconnection setting request for disconnecting the abnormal flow has been received from the sorting node (13), the disconnection control program (4052) registers information concerning the abnormal flow for which disconnection has been requested, checks a region configuration, and selects the communication node (11) connected to the self-region (110) for which abnormal flow disconnection is to be set, and the sorting node (13) connected to the region (110) for which abnormal flow disconnection is to be requested (step S4003).

The disconnection control program (4052) transmits a disconnection setting request for disconnecting the abnormal flow to the selected communication node (11), and transmits a disconnection setting request for disconnecting the abnormal flow to the selected sorting node (13) (step S4004).

When the disconnection control program (4052) determines in step S4002 that a disconnection setting request for disconnecting the abnormal flow has not been received from the sorting node, processing in step S4005 is executed.

The cancellation control program (4053) determines whether or not a disconnection cancellation request for cancelling disconnection of abnormal flow has been received from the sorting node (13) (step S4005).

When determining in step S4005 that a disconnection cancellation request for cancelling disconnection of the abnormal flow has been received from the sorting node, the cancellation control program (4053) selects the communication node (11) connected to the self-region (110) (step S4006).

The cancellation control program (4053) transmits a disconnection cancellation request for cancelling disconnection of the abnormal flow to the selected communication node (11) (step S4007).

When the cancellation control program (4053) determines in step S4005 that disconnection cancellation information indicating disconnection cancellation of the abnormal flow has not been received from the sorting node (13), processing in step S4008 is executed.

The connection information processing program (4054) determines whether or not a notification which contains connection information indicating connection to the communication node (11) by the mobile object (50) transmitting the abnormal flow has been received from the sorting node (13) (step S4008).

When the connection information processing program (4054) determines in step S4008 that a notification which contains connection information indicating connection to the communication node (11) by the mobile object (50) transmitting the abnormal flow has not received from the sorting node (13), processing in step S4012 is executed.

When determining in step S4008 that a notification which contains connection information indicating connection to the communication node (11) by the mobile object (50) transmitting the abnormal flow has been received from the sorting node (13), the connection information processing program (4054) registers a port ID (port ID specified based on received connection information) of the connected communication node (11) (step S4009).

The connection information processing program (4054) determines whether or not the mobile object (50) transmitting the abnormal flow has moved between the regions (110) (moved from region (110) to adjacent region (110)) (step S4010).

When the connection information processing program (4054) determines in step S4010 that the mobile object (50) transmitting the abnormal flow has not moved between the regions (110), processing in step S4012 is executed.

When determining in step S4010 that the mobile object (50) transmitting the abnormal flow has moved between the regions (110), the connection information processing program (4054) executes processing in step S4011. More specifically, the connection information processing program (4054) transmits a notification which contains region connection information concerning the region (110) newly connected by movement (i.e., adjacent region (110)) to the sorting node (13) connected to the corresponding adjacent region (110). The connection information processing program (4054) further transmits a disconnection setting request for disconnecting the abnormal flow to the adjacent sorting node (13) for which disconnection of the abnormal flow needs to be executed. The connection information processing program (4054) further transmits a disconnection cancellation request for cancelling disconnection of the abnormal flow to the adjacent sorting node (13) for which disconnection of the abnormal flow needs to be cancelled.

The region processing program (4055) determines whether or not a notification which contains region connection information indicating region connection by the mobile object (50) transmitting the abnormal flow has been received from the sorting node (13) (step S4012).

When the region processing program (4055) determines in step S4012 that a notification which contains region connection information indicating region connection by the mobile object (50) transmitting the abnormal flow has not been received, processing in step S4002 is executed.

When determining in step S4012 that a notification which contains region connection information indicating region connection by the mobile object (50) transmitting abnormal flow has been received, the region processing program (4055) registers information concerning the mobile object (50) transmitting the abnormal flow, and information concerning the region (110) connected to the mobile object (50) (i.e., received region connection information) (step S4013).

As described above, the sorting node (13) dynamically selects the management server (12) managing an abnormal flow to achieve management of the abnormal flow. Accordingly, the management server is easily added or reduced in accordance with the scale of the mobile object (50) connected to the region (110).

As described above, the function of the sorting node (13) may be performed by the communication node (11) also functioning as the sorting node (13). However, when sorting based on the IP header (3810) and sorting based on the IP payload (3820) are divided into different layers in a manner described in the present embodiment, an entity performing sorting based on the IP header (3810) (physical or virtual device as communication node (11)) and an entity performing sorting based on the IP payload (3820) (physical or virtual device as sorting node (13)) are allowed to be separately provided. In this case, processing efficiency is expected to increase. Sorting based on the IP header (3810) is typically sorting based on the transmission destination IP address (3811). Sorting based on the IP payload (3820) is sorting based on the disconnection flow ID (3822). However, this sorting may be sorting based on other data (e.g., transmission source IP address (3823)) instead of or in addition to the disconnection flow ID (3822).

Sort destinations may differ for each of the sorting nodes (13). For example, the disconnection flow ID (3822) sorted to the management server 7a (12-7a) by the sorting node 1 (13-1) may be sorted to the management server 8b (12-8b) by the sorting node 2 (13-2).

The number of the management servers (12) to be connected may differ for each of the sorting nodes (13). Each of the sorting nodes (13) may update the data transfer table retained by the corresponding sorting node (13) in accordance with addition and reduction of the management server (12) to be connected. The data transfer table may be a table showing a correlation between attributes of the IP payload (3820) (e.g., disconnection flow ID (3822)) and IP addresses of the management servers (12) corresponding to sort destinations. The communication node (11) transfers the IP packet (3800) illustrated in FIG. 38B by way of example to the sorting node (13) at the transmission destination IP address (3810-1) indicated in the IP header (3810-1) of the corresponding IP packet (3800-1). The sorting node (13) specifies the management server (12) corresponding to the attribute of the IP payload (3820) contained in the received IP packet (3800-1) based on the data transfer table, and transmits, to the specified management server (12), the IP packet (3800-2) which contains the corresponding IP payload (3820) and the IP head (3810-2) containing the IP address of the management server (12). At least one of the sorting nodes (13) may perform dynamic sorting without using the data transfer table, instead of or in addition to static sorting using the data transfer table. Accordingly, the management server (12) corresponding to the sort destination may differ for each of the IP payloads (3820) even having the same attribute. More specifically, either static sorting or dynamic sorting may be executed as long as processing loads imposed on all the management servers (12) connected to the sorting nodes (13) are balanced, for example. In case of dynamic sorting, the sorting node (13) registers, in the data transfer table, the IP address of the management server (12) corresponding to the sort destination, and the disconnection flow ID contained in the sorted packet. (Based on the registration, the management server (12) corresponding to the disconnection flow ID contained in a disconnection cancellation request (i.e., management server (12) corresponding to sort destination of corresponding request) can be specified when the disconnection cancellation request is received later). In case of static allocation, N (N: 1 or larger integer) management servers may be provided for the sorting node (13), and the management server (12) managing the abnormal flow may be determined in accordance with a remainder obtained by dividing the abnormal flow ID by N. The abnormal flow ID may be a serial number, for example.

Sixth Embodiment

According to the present embodiment, the regions (110) are two-dimensionally disposed. A sixth embodiment is hereinafter described with reference to FIG. 41. Differences from the first embodiment are chiefly described, and points common to the first embodiment are not repeatedly described or only simply described.

Figure 41:
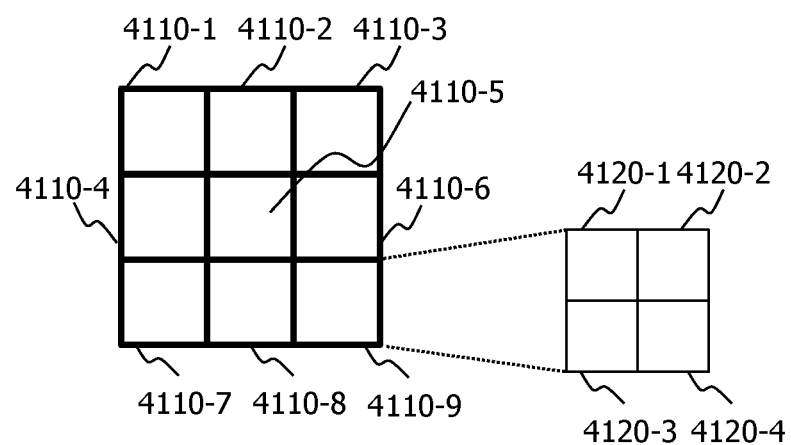
FIG. 41 is a diagram illustrating a configuration example of regions according to a sixth embodiment.

FIG. 41 is a diagram illustrating a configuration example of the regions according to a sixth embodiment.

According to the first embodiment, each of the regions (110) has a one-dimensional configuration (more specifically, region (110) of first embodiment is constituted by a plurality of the areas (100) sequentially arranged, and a plurality of the regions (110) are one-dimensionally arranged. According to the present embodiment, however, each of regions (4110) has a two-dimensional configuration, and a plurality of the regions (4110) are two-dimensionally arranged. Regions (4110-1) to (4110-9) are two-dimensionally arranged in FIG. 41. The region (4110-9) is constituted by a plurality of areas (4120-1) to (4120-4) two-dimensionally arranged. Accordingly, the region 4110-9 has a two-dimensional configuration. Each of the regions (4110-1) to (4110-8) is constituted by not-shown four areas similarly to the region (4110-9). At least one of the regions (4110-1) to (4110-9) two-dimensionally arranged may have a one-dimensional configuration similarly to the first embodiment. While not illustrated in FIG. 41, the communication nodes (11) are connected to the respective regions (4110) as described in the first embodiment. The base stations (10) providing wireless connection to the respective areas (4120), and the management servers (12) are connected to the communication nodes (11). As described in the first embodiment, disconnection of an abnormal flow is managed in units of region. When the mobile object (50) transmitting an abnormal flow connects to the self-covered region (4110), the management server (12) manages abnormal flow disconnection for the self-covered region (4110) and the adjacent region (primary adjacent region). For example, when the management server (12) covers the region (4110-9), the management server (12) manages an abnormal flow disconnection request for the primary adjacent regions (4110-5), (4110-6), and (4110-8). The management server (12) manages cancellation of abnormal flow disconnection for the regions (secondary adjacent regions) (4110-1) to (4110-4) and (4110-7) adjacent to the primary adjacent regions (4110-5), (4110-6), and (4110-8).

As described above, abnormal flow disconnection management for regions having a two-dimensional configuration or disposed two-dimensionally is achievable by managing setting and cancellation of abnormal flow disconnection in the foregoing manner. Similarly, abnormal flow disconnection management is achievable for regions having a three-dimensional configuration or arranged three-dimensionally.

While several embodiments according to the present invention have been described herein, it is not intended that the scope of the present invention be limited to these specific embodiments presented only by way of example. The present invention may be practiced in various different modes.

For example, a different embodiment is expected to be practiced by combining any two or more of the first through sixth embodiments. More specifically, for example, the sixth embodiment is applicable to any one of the first through fifth embodiments. In addition, for example, a combination of the first embodiment and the fifth embodiment may be adopted. More specifically, there may coexist the region (110) covered by the management server (12) connected to the communication node (11) via the sorting node (13), and the region (110) covered by the management server (12) connected to the communication node (11) not via the sorting node (13).

For example, at least one of the management servers (12) may be software (application) executed on foundations of cloud computing (one or more computers). Alternatively, for example, at least one of the sorting nodes (13) may be software (application) executed on foundations of cloud computing (one or more computers).

Although the present disclosure has been described with reference to example embodiments, those skilled in the art will recognize that various changes and modifications may be made in form and detail without departing from the spirit and scope of the claimed subject matter.

What is claimed is:

1. A network management system comprising a plurality of server units connected to a plurality of communication nodes, the communication nodes connected to a network and a plurality of base stations each of which covers corresponding one of a plurality of communication areas, wherein:
    each of the plurality of server units includes one or more management servers;
    for a self-covered region that is a region included in a plurality of regions and covered by a first management server included in a first server unit, and for one or more primary adjacent regions that are one or more regions adjacent to the self-covered region, in order for disconnecting an abnormal flow transmitted from a mobile object that has moved to one of the self-covered region and one or more regions adjacent to the self-covered region, the first management server transmits a first disconnection setting request for disconnecting the abnormal flow to a communication node connected to the self-covered region, and transmits a second disconnection setting request for disconnecting the abnormal flow to each of one or more second server units that cover the one or more primary adjacent regions;
    a second server of the second server unit having received the second disconnection setting request executes disconnection setting for disconnecting the abnormal flow, and transmits a first disconnection setting request for disconnecting the abnormal flow to a communication node connected to the corresponding second server unit;
    the communication node having received the first disconnection setting request executes disconnection setting for disconnecting the abnormal flow; and
    each of the plurality of regions includes two or more communication areas each of which is covered by corresponding one of two or more base stations connected to an identical communication node.

2. The network management system according to claim 1, wherein the first management server detects connection to the self-covered region by the mobile object that transmits the abnormal flow, and transmits the second disconnection setting request for disconnecting the abnormal flow to the second server unit when the second server unit covers the primary adjacent region for which disconnection setting for disconnecting the abnormal flow is not executed at a time of the detection.

3. The network management system according to claim 1, wherein:
    the first management server transmits a first disconnection cancellation request for canceling disconnection of the abnormal flow to one or more third server units that cover one or more secondary adjacent regions adjacent to the one or more primary adjacent regions when connection to the self-covered region by the mobile object that transmits the abnormal flow is detected;
    a third management server included in the one or more third server units and having received the first disconnection cancellation request cancels setting for disconnecting the abnormal flow, and transmits a second disconnection cancellation request for canceling disconnection of the abnormal flow to a communication node connected to the corresponding third server unit; and
    the communication node having received the second disconnection cancellation request cancels setting for disconnecting the abnormal flow.

4. The network management system according to claim 2, wherein the second server unit corresponding to a transmission destination of the second disconnection setting request is a server unit that includes a management server that covers a region contained in a first region list that includes the self-covered region and the one or more primary adjacent regions, but not contained in a second region list that includes a pre-movement region connected to the mobile object that transmits the abnormal flow before the mobile object moves to the self-covered region, and one or more primary adjacent regions adjacent to the pre-movement region.

5. The network management system according to claim 3, wherein the third server unit corresponding to a transmission destination of the first disconnection cancellation request is a server unit that includes a management server that covers a region not contained in a first region list that includes the self-covered region and the one or more primary adjacent regions, but contained in a second region list that includes a pre-movement region connected to the mobile object that transmits the abnormal flow before the mobile object moves to the self-covered region, and one or more primary adjacent regions adjacent to the pre-movement region.

6. The network management system according to claim 1, wherein at least one of the plurality of server units includes a sorting node that is a device disposed between the communication node and two or more management servers, and configured to perform sorting to the two or more management servers.

7. The network management system according to claim 6, wherein:
    each of the second disconnection setting requests contains a header and a payload;
    the communication node connected to the sorting node transfers the second disconnection setting request to the sorting node based on the header contained in the second disconnection setting request; and
    the sorting node having received the second disconnection setting request selects a management server corresponding to a sort destination from a plurality of management servers connected to the corresponding sorting node based on the payload contained in the second disconnection setting request.

8. The network management system according to claim 7, wherein:
    the header contains an internet protocol (IP) address of the sorting node; and
    the payload contains an identifier (ID) of the abnormal flow.

9. The network management system according to claim 1, wherein the second disconnection setting request transmitted from the first management server to each of the one or more second server units contains contents indicating control of the abnormal flow.

10. The network management system according to claim 1, wherein:

at least one server unit included in the plurality of server units includes two or more management servers; and the management server included in the at least one server unit and configured to execute disconnection setting for disconnecting the abnormal flow is a management server corresponding to a remainder obtained by dividing an identifier (ID) of the abnormal flow by a number of management servers present in the corresponding server unit.

11. The network management system according to claim 6, wherein:

when the sorting node receives the second disconnection request for disconnecting a new abnormal flow, a management server that manages the new abnormal flow is selected from two or more management server connected to the corresponding sorting node;

a disconnection setting request is transmitted to the selected management server; and a relationship between an ID of the abnormal flow and the selected management server is registered.

12. The network management system according to claim 1, wherein each of the plurality of server units includes two or more management servers connected to an identical communication node.

13. The network management system according to claim 1, wherein, at a time of detection of connection to the communication node connected to the first server unit by a plurality of mobile objects each of which transmits a plurality of abnormal flows, the first management server transmits, to the corresponding communication node, the first disconnection setting request for disconnecting the abnormal flows transmitted from the mobile objects in a descending order of moving speeds of the mobile objects.

14. The network management system according to claim 1, wherein each of two or more regions constituting a part of the plurality of regions is a self-region of each of the management servers included in at least one of the plurality of server units.

15. A network management method performed by a first server unit connected to a first communication node included in a plurality of communication nodes, the communication nodes connected to a network and a plurality of base stations each of which covers corresponding one of a plurality of communication areas, the method comprising:

for disconnecting an abnormal flow from each of a self-covered region that is a region covered by a management server included in the first server unit, and one or more primary adjacent regions that are one or more regions adjacent to the self-covered region in a state that a mobile object that transmits the abnormal flow has moved to the corresponding region, transmitting a first disconnection setting request for disconnecting the abnormal flow to the communication node connected to the self-covered region; and transmitting a second disconnection setting request for disconnecting the abnormal flow to each of one or more second server units that cover the one or more primary adjacent regions, wherein each of the plurality of regions includes two or more communication areas each of which is covered by corresponding one of two or more base stations connected to an identical communication node.

16. A non-transitory computer-readable medium storing a computer program executed by a computer that functions as a management server included in a first server unit connected to a first communication node included in a plurality of communication nodes, the communication nodes connected to a network and a plurality of base stations each of which covers corresponding one of a plurality of communication areas, under the program the computer executes:

for disconnecting an abnormal flow from each of a self-covered region that is a region covered by a management server included in the first server unit, and one or more primary adjacent regions that are one or more regions adjacent to the self-covered region in a state that a mobile object that transmits the abnormal flow has moved to the corresponding region, transmitting a first disconnection setting request for disconnecting the abnormal flow to the communication node connected to the self-covered region; and transmitting a second disconnection setting request for disconnecting the abnormal flow to each of one or more second server units that cover the one or more primary adjacent regions, wherein each of the plurality of regions includes two or more communication areas each of which is covered by corresponding one of two or more base stations connected to an identical communication node.

* * * * *